(12) United States Patent
Gilkerson et al.

(10) Patent No.: US 8,874,975 B2
(45) Date of Patent: Oct. 28, 2014

(54) TRACING OF A DATA PROCESSING APPARATUS

(75) Inventors: Paul Anthony Gilkerson, Cambridge (GB); John Michael Horley, Cambridge (GB); Michael John Gibbs, Stapleford (GB)

(73) Assignee: ARM Limited, Cambridge (GB)

( * ) Notice: Subject to any disclaimer, the term of this patent is extended or adjusted under 35 U.S.C. 154(b) by 271 days.

(21) Appl. No.: 13/317,253

(22) Filed: Oct. 13, 2011

(65) Prior Publication Data

US 2012/0185734 A1   Jul. 19, 2012

(30) Foreign Application Priority Data

Jan. 13, 2011   (GB) .................................. 1100505.5
Feb. 4, 2011    (GB) .................................. 1101945.2

(51) Int. Cl.
*G06F 11/00*    (2006.01)
*G06F 9/30*     (2006.01)
*G06F 11/34*    (2006.01)

(52) U.S. Cl.
CPC ........ *G06F 11/3495* (2013.01); *G06F 9/30145* (2013.01); *G06F 9/30094* (2013.01); *G06F 11/348* (2013.01); *G06F 9/30072* (2013.01); *G06F 9/30123* (2013.01); *G06F 9/30101* (2013.01)
USPC .......................................................... 714/45

(58) Field of Classification Search
USPC .......................................................... 714/45
See application file for complete search history.

(56) References Cited

U.S. PATENT DOCUMENTS

| | | | |
|---|---|---|---|
| 5,715,440 | A  | 2/1998  | Ohmura et al. |
| 5,978,902 | A  | 11/1999 | Mann |
| 6,247,146 | B1 | 6/2001  | Wheatley et al. |
| 6,728,949 | B1 | 4/2004  | Bryant et al. |
| 7,100,024 | B2 | 8/2006  | Col |
| 7,707,394 | B2 | 4/2010  | Ashfield et al. |
| 8,286,141 | B2 | 10/2012 | Naruse |
| 8,312,435 | B2 | 11/2012 | Wygodny et al. |

(Continued)

FOREIGN PATENT DOCUMENTS

| | | |
|---|---|---|
| GB | 2459652    | 11/2009 |
| JP | 62-3351    | 1/1987  |
| JP | 2002342114 | 11/2002 |

OTHER PUBLICATIONS

International Search Report and Written Opinion of the International Searching Authority dated Apr. 4, 2012 in PCT/GB2011/052353.

(Continued)

*Primary Examiner* — Michael Maskulinski
(74) *Attorney, Agent, or Firm* — Nixon & Vanderhye P.C.

(57) ABSTRACT

A trace unit, diagnostic apparatus and data processing apparatus are provided for tracing of conditional instructions. The data processing apparatus generates instruction observed indicators indicating execution of conditional instructions and result output indicators indicating output by the data processing apparatus of results of executing respective conditional instructions. The instruction observed indicators and result output indicators are received by a trace unit that is configured to output conditional instruction trace data items and independently output conditional result trace data items enabling separate trace analysis of conditional instructions and corresponding conditional results by a diagnostic apparatus. The instruction observed indicator is received at the trace unit in a first processing cycle of the data processing apparatus while result output indicator is received at in a second different processing cycle.

56 Claims, 27 Drawing Sheets

(56) References Cited

U.S. PATENT DOCUMENTS

| | | | |
|---|---|---|---|
| 2002/0046393 A1 | 4/2002 | Leino et al. | |
| 2003/0033592 A1 | 2/2003 | Tsubata et al. | |
| 2003/0051122 A1 | 3/2003 | Sato | |
| 2004/0030962 A1 | 2/2004 | Swaine et al. | |
| 2004/0064685 A1 | 4/2004 | Nguyen et al. | |
| 2004/0123084 A1 | 6/2004 | DeWitt et al. | |
| 2006/0129999 A1 | 6/2006 | Hiraoka et al. | |
| 2007/0271447 A1* | 11/2007 | Agarwala et al. | 712/227 |
| 2009/0037704 A1* | 2/2009 | Thekkath | 712/227 |
| 2009/0187790 A1* | 7/2009 | Williams et al. | 714/37 |
| 2009/0249302 A1* | 10/2009 | Xu et al. | 717/128 |
| 2010/0257510 A1* | 10/2010 | Horley et al. | 717/128 |
| 2012/0185734 A1 | 7/2012 | Gilkerson et al. | |

OTHER PUBLICATIONS

International Search Report and Written Opinion of the International Searching Authority dated Apr. 4, 2012 in PCT/GB2011/052242.

Office Action mailed Sep. 4, 2012 in co-pending U.S. Appl. No. 13/317,686.

Ip.com more-like-this search Claim 9 search results (NPL-U from U.S. Appl. No. 13/317,686).

Ip.com more-like-this search Claim 11 search results (NPL-V from U.S. Appl. No. 13/317,686).

Ip.com more-like-this search Claim 24 search results (NPL-W from U.S. Appl. No. 13/317,686).

Ip.com more-like-this search US20120185676 search results (NPL-X from U.S. Appl. No. 13/317,686).

UK Search Report for GB Application No. 1101945.2, dated May 24, 2011.

UK Search Report for GB Application No. 1100505.5, dated May 11, 2011.

Office Action mailed Feb. 15, 2013 in U.S. Appl. No. 13/317,686.

\* cited by examiner

CPSR table

| | Z | V | C | N | Key |
|---|---|---|---|---|---|
| CPSR A | 01 | 11 | 00 | 00 | 1 |
| CPSR B | 00 | 00 | 00 | 00 | 0 |
| CPSR C | 00 | 00 | 00 | 00 | 0 |
| CPSR D | 00 | 00 | 00 | 00 | 0 |
| CPSR E | 00 | 00 | 00 | 00 | 0 |
| CPSR F | 00 | 00 | 00 | 00 | 0 |

| Execution | Marker | Trace |
|---|---|---|
| CMP | All bits cleared to 0 | |
| ADDEQ (uses Z flag) | Set Z marker to 1 | CPSR including Z flag |
| ADDNE (uses Z flag) | Unchanged | |
| ADDVS (uses V flag) | Set V marker to 1 (Z flag still set) | CPSR including V flag |

FIG. 3A

| Instructions in decode | Conditional instruction tag | C-Atoms key | Conditional result tag | C-result key | payload |
|---|---|---|---|---|---|
| CMP | | | | | |
| ADDEQ | A | 0 | | | |
| | | | A | 0 | Z flag |
| ADDNE | A | | | | |
| ADDVS | A | 1 | | | |
| | | | A | 1 | V flag |

FIG. 3B

| Instructions in decode | Conditional instruction tag | C-Atoms key | Conditional result tag | C-result key | payload |
|---|---|---|---|---|---|
| CMP | | | | | |
| ADDEQ | A | 0 | | | |
| ADDNE | A | | | | |
| ADDVS | A | 0 | | | |
| | | | A | 0 | Z and V flags |

FIG. 3C

| Instructions in decode | Conditional instruction tag | C-Atoms key | Conditional result tag | C-result key | payload |
|---|---|---|---|---|---|
| CMP | | | | | |
| ADDEQ | A | 0 | | | |
| ADDNE | A | | | | |
| ADDVS | A | 0 | | | |
| CMP | | 1 | | | |
| SUBEQ | B | 1 | | | |
| | | | B | 1 | Z flag |
| | | | A | 0 | Z and V flags |

FIG. 3D

| Instructions in decode | Conditional linstruction tag | C-Atoms key | Conditional result tag | conditional result payload | CPSR table actions |
|---|---|---|---|---|---|
| CMP | | | | | All flag states for tag A set to "not traced" |
| ADDEQ | A | 0 | | | Lookup line for tag A. None are "to be traced" so start a new group. A c-atom is required because the state of flag Z for tag A was "not traced". State of flag Z for tag A is set to "to be traced" |
| ADDNE | A | | | | State of flag Z for tag A is already "to be traced" so no c-atom is required. |
| ADDVS | A | 0 | | | Lookup for tag A. Flag Z is "to be traced" so use the same key and do not start a new group. A c-atom is required because the state of flag V for tag A was "not traced". State of flag V for tag A is set to "to be traced" |
| | | | | | At this point the core indicates that flag Z is valid but flag V is not. We know by looking in the table that we require both Z and V flags so we cannot yet trace the conditional result. |
| | | | A | Z and V flags | Now the core indicates that both flags Z and V are valid. We know by looking in the table that this is all we require (other flag states are "not traced") so we can now trace the conditional result. Set state of flags Z and V for tag A to "traced" |

FIG. 5

| Instructions in decode | Conditional instruction tag | C-Atoms key | Conditional result tag | C-result key |
|---|---|---|---|---|
| CMP | | | | |
| ADDEQ | A | 0 | | |
| Branch | | | | |
| CMP | | | | |
| SUBEQ | B | 1 | | |
| | | | B | 1 |
| The branch was mispredicted so the above two instructions are cancelled. ||||||
| ADDNE | A | 0 (not a new key) | | |
| | | | A | 0 |

FIG. 6A

| Instructions in decode | Conditional instruction tag | C-Atoms key | Conditional result tag | C-result key |
|---|---|---|---|---|
| CMP | | | | |
| ADDEQ | A | 0 | | |
| CMP | | | | |
| Branch | | | | |
| SUB | | | | |
| The branch was mispredicted so the above instruction is cancelled. ||||||
| ADDNE | B | 1 (new key) | | |
| | | | B | 1 |
| | | | A | 0 |

FIG. 6B

| Event | Action |
|---|---|
| C-Atom output in trace | Set the in-flight bit corresponding to the RH tag (c-atom tag) |
| Conditional result received | If the in-flight bit corresponding to the LH tag (c-result tag) is set output the c-result in the trace. Then clear the bit. |

FIG. 6C

| In-flight bit value | Action |
|---|---|
| 0 (not in flight) | Use next trace key value |
| 1 (is in flight) | Use the same trace key value as for the most recent c-atom |

FIG. 6D

| Instructions in decode | Conditional instruction tag | C-Atoms key | Conditional result tag | Comments |
|---|---|---|---|---|
| CMP | | | | |
| ADDEQ | A | 0 | | Lookup in-flight bit for tag A. Result is 0 so start a new group. Set in flight for tag A. |
| ADDNE | | | | |
| ADDVS | A | 0 | | Lookup in-flight bit for tag A. Result is 1 do not start a new group |
| | | | A | Clear in flight for tag A |

FIG. 6E

| E | Waypoint corresponds to a taken branch or a load/store instruction. The trace key incremented by one. |
|---|---|
| N | Waypoint corresponds to a not-taken branch. The trace key incremented by one. |

FIG. 7A

| P0 | Conditional instruction except for conditional branches. The trace key does not change |
|---|---|
| P1 | Conditional instruction except for conditional branches. The trace key incremented by one. |

FIG. 7B

| Waypoint generated | C-atoms generated | Trace output |
|---|---|---|
| E | | |
| E | | |
| E | | |
| | P1 | |
| N | | Output EEEN |
| | P1 | |
| N | | |
| | P1 | Output P111 |
| N | | |
| N | | |
| | P1 | |
| | P1 | |
| | P0 | Output P110 |
| E | | Output NNNE |

FIG. 7C

| Instruction type | Action |
|---|---|
| Branch | Take an E or N from the waypoint queue |
| Load/store | Take an E or N from the waypoint queue |
| Conditional branch | In this implementation these do not have a corresponding c-atom so take an E or N as for a branch |
| Conditional load/store | Take an E from the waypoint queue and also a P0 or P1 from the conditional queue |
| Conditional other | Take a P0 or P1 from the conditional queue |

FIG. 7D

| Waypoint | C-atoms | Trace output |
|---|---|---|
| E | | |
| E | | |
| E | | |
| | P1 | |
| N | | Output EEEN |
| | P1 | |
| Cancel one waypoint i.e. the preceding N | | Cancel 1 |
| N | | |
| | P1 | Output P111 |
| N | | |
| N | | |
| | P1 | |
| | P1 | |
| | P0 | Output P110 |
| E | | Output NNNE |

FIG. 9A

| Waypoint | C-atoms | Trace output |
|---|---|---|
| E | | |
| E | | |
| E | | |
| | P1 | |
| N | | Output EEEN |

| | P1 | |
|---|---|---|
| Cancel one waypoint | | P11, Cancel 1, realignment |
| N | | |
| | P1 | |
| N | | |
| N | | |
| | P1 | |
| | P1 | |
| | P0 | Output P1110 |
| E | | Output NNNE |

FIG. 9B

| Trace received | Waypoint queue | Conditional queue | Action |
|---|---|---|---|
| EEEN | EEEN | | |
| | EEN | | Infer execution up to E |
| | EN | | Infer up to E |
| | N | | Infer up to E |
| | N | | Cannot infer up to N because c-atom not yet received |
| P11 | N | P11 | Process P1 and infer up to N |
| | | P1 | |
| Cancel 1 | | P1 | Cancel everything up to and including last waypoint (the N). |
| realignment | | | Flush the conditional queue (discard P1) |
| P1110 | | P1110 | |
| | | | No waypoints so cannot process c-atoms |
| NNNE | NNNE | | |
| | NNE | P1110 | Infer up to N (no c-atom required) |
| | NE | P110 | Infer up to N, processing a P1 in the process |
| | E | P110 | Infer up to N (no c-atom required) |
| | | | Infer up to E processing P1, P1, P0 in the process |

FIG. 9C

| P1 |
| --- |
| E |
| Cancel 1 |
| Mispredict |
| realignment |
| E |

FIG. 11A

| E |
| --- |
| P1 |
| E |
| Mispredict |
| realignment |
| E |

FIG. 11B

| E |
| --- |
| P1 |
| E |
| Cancel 1 |
| exception |
| realignment |
| E |

FIG. 11C

| c-atom generated but not output | c-atom RH key generated but not output | c-result LH key output | Implied c-atom RH keys |
|---|---|---|---|
| P1 | 0 | | |
| | | 0 | 0 |
| P1 | 1 | | |
| P1 | 2 | | |
| | | 1 | 1 |
| | | 2 | 2 |
| P1 | 3 | | |
| P1 | 4 | | |
| | | 4 | 3, 4 |
| | | 3 | none |

FIG. 12A

| c-atom generated but not output | c-atom RH key | c-result LH key output | Implied c-atom RH keys |
|---|---|---|---|
| P1 | 0 | | |
| | | 0 | 0 |
| P1 | 1 | | |
| | | 1 | 1 |
| P1 | 2 | | |
| | | 2 | 2 |
| P1 | 3 | | |
| | | 3 | 3 |
| P1 | 0 | | |
| P1 | 1 | | |
| P1 | 2 | | |
| At this point a mispredict occurs so that the three preceding c-atoms are not executed and the correspond c-results are never output ||||
| P1 | 3 | | |
| | | 3 | 3 (must not imply 0,1,2) |
| P1 | 0 | | |
| P1 | 1 | | |
| P1 | 2 | | |
| P1 | 3 | | |
| | | 3 | 0,1,2,3 |
| | | 2 | (must not imply 0,1,2) |
| | | 1 | (must not imply 0,1) |
| | | 0 | (must not imply 0) |

FIG. 12B

| c-atom generated but not output | c-atom RH key | c-result LH key output | Implied c-atom RH keys | Explicitly output c-atoms keys | last-c-atom-output-key | last-c-atom-generated-key | Test met? |
|---|---|---|---|---|---|---|---|
| P1 | 0 | | | | 3 | 3 | n/a |
| | | 0 | 0 | | 3 | 0 | yes |
| P1 | 1 | | | | 0 | 0 | n/a |
| | | 1 | 1 | | 0 | 1 | yes |
| P1 | 2 | | | | 1 | 1 | n/a |
| | | 2 | 2 | | 1 | 2 | yes |
| P1 | 3 | | | | 2 | 2 | n/a |
| | | 3 | 3 | | 2 | 3 | yes |
| P1 | 0 | | | | 3 | 3 | n/a |
| P1 | 1 | | | | 3 | 0 | n/a |
| P1 | 2 | | | | 3 | 1 | n/a |
| At this point a mispredict occurs so that the three preceding c-atoms are not executed and the correspond c-results are never output. | | | | | | | |
| | | | | 0, 1, 2 † | 3 | 2 | n/a |
| Output realignment item due to mispredict | | | | | | | |
| P1 | 3 | | | | 2 | 2 | n/a |
| | | 3 | 3* | | 2 | 3 | yes |
| P1 | 0 | | | | 3 | 3 | n/a |
| P1 | 1 | | | | 3 | 0 | n/a |
| P0 | 1 | | | 0,1 †† | 3 | 1 | n/a |
| P1 | 2 | | | | 1 | 1 | n/a |
| P1 | 3 | | | | 1 | 2 | n/a |
| | | 3 | 2,3 | | 1 | 3 | yes |
| | | 2 | ** | | 3 | 3 | no |
| | | 1 | *** | | 3 | 3 | no |

FIG. 13

Condition code suffixes

| Suffix | Flags | Meaning |
|---|---|---|
| EQ | z set | Equal |
| NE | z clear | Not equal |
| CS or HS | c set | Higher or same (unsigned >= ) |
| CC or LO | c clear | Lower (unsigned < ) |
| MI | N set | Negative |
| PL | N clear | Positive or zero |
| VS | v set | Overflow |
| VC | v clear | No overflow |
| HI | c set and z clear | Higher (unsigned >) |
| LS | c clear or z set | Lower or same (unsigned <=) |
| GE | N and v the same | Signed >= |
| LT | N and v differ | Signed < |
| GT | z clear, N and v the same | Signed > |
| LE | z set, N and v differ | Signed <= |
| AL | Any | Always. This suffix is normally omitted. |

FIG. 16

| CPSR identifier | Meaning |
| --- | --- |
| 00 | C set |
| 01 | N set |
| 10 | Z and C set |
| 0011 | N and C set |
| 0111 | no flags set |
| 1011 | Z set |
| 1111 | null |

FIG. 17

| Program instructions | | Trace | Diagnostic interpretation |
|---|---|---|---|
| 1600 | Branch (2000) | Branch taken | go to 2000 |
| 2000 | ⋮<br>CMP | CPSR | use this CPSR for<br>following conditionals |
| 2004 | MOV NE | | determine outcome based<br>on CPSR for 2000 |
| 2008 | MOV EQ | | determine outcome based<br>on CPSR for 2000 |
| 200C | ADD HI | | determine outcome based<br>on CPSR for 2000 |
| 2100 | ⋮<br>CCMP NE | CPSR | determine outcome based<br>on CPSR for 2000<br>use new CPSR for following condition |
| 2104 | ADD EQ | | determine outcome<br>based on CPSR for 2100 |

FIG. 20

⋮
CMP
CMP
CMP
TST
CMP
MOV NE
⋮

FIG. 21

| Program instructions | | Trace | Control flag | Diagnostic interpretation |
|---|---|---|---|---|
| 1600 | Branch (2000) | Branch taken | X | go to 2000 |
| 2000 | CMP | | clear to 0 | |
| 2004 | MOV NE | CPSR | set to 1 | determine processing outcome based on CPSR for 2004 |
| 2008 | MOV EQ | | 1 | determine processing outcome based on CPSR for 2004 |
| 200C | ADD HI | | 1 | determine processing outcome based on CPSR for 2004 |
| ⋮ | | | ⋮ | |
| 2100 | CCMP NE | | clear to 0 | determine processing outcome based on CPSR for 2004 |
| 2104 | ADD EQ | CPSR | set to 1 | determine processing outcome based on CPSR for 2104 |

FIG. 24

| Program instructions | Trace | Control flags | | | | Diagnostic interpretation |
|---|---|---|---|---|---|---|
| | | N | Z | C | V | |
| 1600 Branch (2000) | Branch taken | X | X | X | X | go to 2000 |
| 2000 CMP | | clear to 0 | clear to 0 | clear to 0 | clear to 0 | |
| 2004 MOV NE | CPSR (Z) | 0 | set to 1 | 0 | 0 | determine processing outcome based on CPSR for 2004 |
| 2008 MOV EQ | | 0 | 1 | 0 | 0 | determine processing outcome based on CPSR for 2004 |
| 200C ADD HI | CPSR (C) | 0 | 1 | set to 1 | 0 | determine processing outcome based on CPSR for 2004 and CPSR for 200C |
| 2100 CMP NE | | 0 | clear to 0 | clear to 0 | 0 | determine processing outcome based on CPSR for 2004 |
| 2104 ADD EQ | CPSR (Z) | 0 | set to 1 | 0 | 0 | determine processing outcome based on CPSR for 2104 |

FIG. 27

TRACING OF A DATA PROCESSING APPARATUS

BACKGROUND OF THE INVENTION

1. Field of the Invention

The present invention relates to data processing. More particularly, the present invention relates to tracing of processing activities performed by a data processing apparatus.

2. Description of the Prior Art

It is known to perform tracing of activities of a data processing apparatus in order to verify processor design and to confirm reliable operation of the data processing apparatus when executing program instructions.

It is known to provide a trace unit in association with the data processing apparatus, the trace unit being configured to monitor the processing activities of the data processing apparatus and to generate a sequence of trace data items indicative of those processing activities. An example of such a trace unit is the ARM Embedded Trace Macrocell (ETM) that can be provided either as part of a single System-On-Chip or independently from the processor. The ETM generates trace data for output to the diagnostic apparatus. For modern data processing apparatuses running complex software, the volume of trace data generated during the trace operation is typically very large. Accordingly, it is desirable to provide items of trace data in a compressed form, omitting any information that is expected to be redundant and including data that is only strictly necessary for the particular analysis purpose. U.S. Pat. No. 7,707,394 sets out some techniques for reducing the size of trace data stream.

Tracing of activities of a data processing apparatus can be complex in a data processing apparatus capable of out-of-order execution of program instructions and/or speculative execution. Speculative execution is a technique often employed in data processing apparatuses because it can improve instruction throughput, for example, by preventing pipeline stages of a pipelined data processing apparatus from remaining idle for any significant period of time. However, speculative execution of instructions can present a tracing unit with particular difficulties because, until the speculation is resolved, i.e. until it is known whether a given instruction that was speculatively executed is actually committed by the data processing apparatus, the trace unit is unable to provide a stream of trace data that definitively indicates the actual operation of the data processing apparatus.

Known techniques for dealing with tracing in a data processing apparatus capable of speculative execution are to buffer all of the trace data associated with speculatively executing instructions until the speculation is fully resolved, or to generate and output trace data speculatively and to cancel certain items of the trace data if it is subsequently found that the instructions to which they corresponded were mis-speculated. For example, the Nexus protocol ("The Nexus 5001 Forum-Standard for a Global Embedded Processor Debug Interface", IEEE-ISTO 5001-2003, 23 Dec. 2003) supports cancelling a specified number of trace data items. However, even if data processing apparatus specifically indicates to the trace unit which instructions or groups of instructions should be cancelled, actually identifying the items of trace data that correspond to those cancelled instructions is non-trivial.

In a data processing apparatus capable of out-of-order execution problems can arise in tracing the data processing activities when, for example, dealing with execution of instructions such as load or store instructions, which can take many cycles to complete. Thus, for example, even when in-order processing is performed if a load instruction is executed and a corresponding item of trace data is generated, by the time requested data value has been retrieved from memory system it can be difficult to identify the corresponding item of (previously generated) trace data associated with execution of the load instruction. Thus there can be a problem in correlating data values retrieved from memory with the particular executed load instructions. It will be appreciated that this situation is exacerbated when data transfers such as load instructions can be performed out of program order, which can make it virtually impossible to identify which data values belong to which memory addresses. Some background technical information regarding the tracing of out-of-order processors can be found in the document "The PD Trace Interface and Trace Control Block Specification", 4 Jul. 2005 (available from http://www.mips.com/products/product-materials/processor/mips-architecture) and in the ARM ETM v3 architecture (available from http://infocentre.arm.com).

A particular problem can arise in tracing of conditional instructions because there is typically a delay between decoding of a conditional instruction and resolution of the particular condition attached to execution of the instruction. Many known instruction sets only allow branches to be executed conditionally. However, the ARM architecture uses conditional evaluation hardware that enables a variety of different instructions to contain a condition field that determines whether or not the data processing apparatus will execute the corresponding instruction. Non-executed instructions typically consume only a single processing cycle. The ability to execute a number of different instructions conditionally removes the need for many branch instructions. Branch instructions can stall the pipeline of a data processing apparatus requiring a plurality of cycles to refill the pipeline and conditional instructions allow for dense in-line code without branches. The time penalty of not executing several conditional instructions (where the attached conditions are not satisfied) is frequently less than the overhead of the branch instructions that would otherwise be needed. Accordingly, conditional instructions are very useful in improving the efficiency of data processing.

However, conditional instructions such as conditional non-branch instructions present a particular problem for tracing activity of the data processing apparatus due to the delay between decoding of the instruction and evaluation of the attached condition. The conditional pass/fail information could be traced at the same point as the conditional instruction and hence be traced using a single trace packet, but this requires significant buffering to support such tracing, particularly in an out-of-order processor or processor capable of speculative execution.

Accordingly, there is a requirement to provide a technique that offers more efficient tracing of conditional instructions that is also applicable to the tracing of instruction sequences in a data processing apparatus capable of speculative and/or out of order execution.

SUMMARY OF THE INVENTION

According to a first aspect, the present invention provides a trace unit configured to generate items of trace data indicative of processing activities of a data processing apparatus, said trace unit comprising: a trace input interface for receiving from said data processing apparatus at least one instruction observed indicator indicating observation of a conditional instruction and at least one result output indicator indicating output by said data processing apparatus of a result of executing said at least one conditional instruction; and tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus.

The present invention recognises that providing tracing circuitry capable of independently outputting conditional instruction trace data items and conditional results trace data items provides considerable flexibility and the tracing of conditional instructions that can ameliorate problems associated with known techniques of buffering trace data until a condition associated with a conditionally executed instruction is fully resolved.

It will be appreciated that an instruction observed indicator and a corresponding result output indicator could be output by the data processing apparatus in the same processing cycle. However, in some embodiments, an instruction observed indicator is output by a data processing apparatus and received at a trace input interface of tracing circuitry in a first processing cycle whilst the data processing apparatus is configured to be capable of outputting a result output indicator corresponding to the same conditional instruction in a second different processing cycle. This means that the instruction observed indicator and corresponding result output indicator should also be received at the trace input interface in different processing cycles. This facilitates separate tracing of execution of a conditional instruction and the corresponding subsequently generated conditional result. The ability to independently trace conditional instructions and their corresponding conditional results is useful because in some data processing cores it may not be possible to trace all details of a conditional instruction at the same point in the processing pipeline. Furthermore, conditional instructions may be processed out of order in some data processors. Splitting the tracing of conditional instructions into two-parts according to the present technique directly addresses this issue. This makes tracing of conditional instructions more efficient particularly in a data processing apparatus capable of speculative and/or out-of-order execution.

The temporal separation of tracing of the execution of the conditional instruction and the output of the conditional result means that, for example, in an out-of-order processor, a given execution sequence can be traced in different ways depending on the timing and capabilities of the particular data processing apparatus. In particular, the time frame within which the conditional results become available relative to the decoding of the conditional instruction can vary significantly depending, on the processor capabilities, yet this can be readily accommodated by the data processing apparatus outputting the instruction observed indicator and the result output indicator in different processing cycles.

In some embodiments, said trace unit comprises a result output indicator buffer for storing a plurality of sets of result output indicators received from said data processing apparatus, said trace unit being configured to periodically select a stored set of results for output for processing to said tracing circuitry and in response to one of said instruction observed indicators indicating a conditional instruction referencing a set of result output indicators that said buffer currently store a valid value for, said trace unit is configured to select said currently stored valid set of result output indicators for output such that a new set or result output indicators can be stored.

It may be that the trace unit can accept many result output indicators in a single cycle, however, providing trace circuitry that has the ability to generate that number of conditional result trace data items would be expensive. Thus, it may be advantageous to buffer these results and output them steadily. In this way peaks in the receipt of result output indicators can be smoothed out. Thus, output indicators are output either when execution of a conditional instruction requires a current result output indicator to be evicted or when no items are received and thus, one or more items can be selected for output. As the system is designed to receive the instruction observed indicator in advance of the results output indicator, it can be determined where an instruction is to be executed that requires a storage location to store the results that is currently used and this data from this location can be output and the storage location is then free when the results are received.

In some embodiments said data processing apparatus comprises a plurality of current program status registers configured to store a respective set of condition code flag values that are indicative of how a conditional instruction is processed, said buffer comprising a storage location for storing one set of result output indicators corresponding to each of said plurality of current program status registers, each of said sets of result output indicators comprising at least some of said condition code flag values.

The result output indicators may for example comprise at least some condition code flag values received from CPSR registers. If this is the case, there is a storage location for each CPSR register and these may all be updated in one cycle, and thus, the trace unit must be able to accept that number of inputs. Furthermore, as conditional instructions are executed it can be determined if there is a conditional instruction that corresponds to a status register for which there is already a valid value stored in the buffer. If this is the case then this value can be output and the storage location used to store the new value. By outputting the instruction observed indicator in an earlier cycle the buffer can be cleared in advance of the new values arriving. Furthermore, by having the buffer these input values can be stored and do not all need to be processed at the same time.

It should be noted that if M conditional instruction indicators can be received in a single cycle then the trace unit must be able to evict and output M conditional result indicators in a single cycle to free up the storage locations if required. As noted earlier if there are N status registers, in some embodiments the trace unit should be able to receive N sets of result output indicators in a single cycle. M is typically much smaller than N and thus, the number of result output indicators output in a single cycle to be processed by trace generation logic is relatively small Although the conditions associated with execution of a conditional instruction could be tracked in a number of different ways. In some embodiments, the data processing apparatus comprises at least one current program status register configured to store a respective set of condition code flag marks that are tested to determine whether a conditional instruction should be output as items of trace data and the trace unit comprises a data store for storing a current program status register table listing a state associated with the at least one current program status register at least a subset of the respective set of condition code flag marks. This provides a convenient mechanism via which the trace unit can keep track of whether a given condition code for a given conditional instruction has been resolved or is being traced. It enables efficient tracking of the current status of a plurality of conditionally executed instructions.

In some embodiments, the current program status register table of the trace unit is configured to store three different states in respect of each of the subset of the condition code flags. However, in alternative embodiments different number of states could be stored in respect of each condition code flag as required by the particular requirements of the tracing exercise. In embodiments where three different states are stored for each condition code flag, the three states comprise: traced; to be traced; and not traced. These three states are useful for tracing of conditional non-branch instructions.

In some embodiments the three different states are tracked by maintaining an in-flight table having two states for each flag of each CPSR indicating which flags should be traced when emitted by said data processing apparatus and a current CPSR table storing two states for each flag of a current CPSR indicating whether or not a conditional instruction is to be traced as a conditional instruction trace data item.

It will be appreciated that the tracing circuitry could keep track of the condition code flags associated with a particular conditional instruction in a number of different ways, but in some embodiments the tracing circuitry uses the current program status register table within the trace unit to determine when conditional result trace data items are required/expected and to keep track of which of the set of condition code flags should be traced.

It will be appreciated that the instruction observed indicator and the result output indicator generated by the data processing apparatus and received by the tracing circuitry could be correlated in any one of a number of different ways to link a conditional result that has been evaluated to corresponding conditional instructions. However, in some embodiments, the trace input interface receives from the data processing apparatus an instruction tag corresponding to the instruction observed indicator and a result tag corresponding to the result output indicator.

In some embodiments the instruction tag and the result tag received by the trace unit from the data processing apparatus are output by the trace unit to a diagnostic apparatus. However, in other embodiments the tracing circuitry is configured to perform a tag to key conversion operation in which the instruction tag associated with the instruction observed indicator output by the data processing apparatus is converted to an instruction key corresponding to the conditional instruction trace data item output by the tracing circuitry based on the instruction observed indicator. Similarly the result tag generated by the data processing apparatus and associated with the result output indicator is converted to a result key corresponding to the conditional result trace data item output by the trace unit to the diagnostic apparatus. This tag to key conversion operation is performed depending upon state stored in the current program status register table within the tracing circuitry. This tag to key conversion can be used to generate keys with a known order, for example sequential keys, which allows for improved compression or reduction of the trace and hence reduced trace bandwidth.

It will be appreciated that the tracing circuitry could output conditional instruction trace data items such that there is a one-to-one correspondence between instruction observed indicators received from the data processing apparatus and conditional instruction trace data items output by the diagnostic circuitry. Similarly there could be a one-to-one correspondence between result output indicators output by the data processing apparatus and conditional result trace data items output by the tracing circuitry. However, in some embodiments, the tracing circuitry comprises trace compression circuitry configured to buffer output of at least one of the conditional instruction trace data items corresponding to a received instruction observed indicator. This is likely to be useful where the occurrence of the execution of the conditional instruction (i.e. the existence of the buffered conditional instruction and trace data item) can be inferred by the diagnostic apparatus from output by the trace unit of a corresponding one of the conditional result trace data items with reference to a program image of the program instructions being executed by the data processing apparatus. This provides a convenient mechanism via which to reduce the volume of trace data output by the tracing circuitry and received by the diagnostic apparatus, yet does not result in a loss of any tracing information because the diagnostic apparatus is capable of readily reconstructing (via an image of the executed program instructions) the occurrence of the conditional instruction execution whose trace data item was buffered.

It will be appreciated that the tracing circuitry could buffer output of the results key corresponding to a buffered conditional instruction trace data item, but in some embodiments the tracing circuitry is configured to output at least one of the results keys for a buffered conditional instruction trace data item. The outputted result key is used by the diagnostic circuitry to infer output of the buffered conditional instruction trace data item. This provides a convenient and reliable mechanism via which to infer existence of the buffered conditional instruction trace data item in addition to using the correlation between program image maintained by the diagnostic apparatus and their received conditional result trace data items.

Not all conditional instructions have corresponding conditional instruction trace data items. Some conditional instruction trace data items are not output directly, but instead are inferred by conditional result trace data items. This is a trace protocol feature whereby conditional instruction trace data items are effectively output as part of the packet corresponding to the conditional result trace data item.

It will be appreciated that the tracing circuitry could keep track of which of the conditional instruction executions had associated trace data which was buffered prior to output to the diagnostic circuitry in a number of different ways. However, in some embodiments, the tracing circuitry is configured to monitor and maintain a buffering record indicating which of the received instruction observed indicators had output of a corresponding conditional instruction trace data items by the tracing circuitry buffered.

Buffering of output of a conditional instruction trace data item may be more appropriate for some conditionally executed instructions than for other types of conditionally executed instructions. Maintaining a buffering record indicating for which instruction observed indicators output of a corresponding conditional instruction trace data item were buffered assist the tracing circuitry in managing situations where buffering of conditional instruction trace data items is employed.

It will be appreciated that the buffering record could comprise a variety of different types of information with regard to buffering of conditional trace data items. However, in some embodiments the buffering record comprises a record of a most recently generated conditional instruction trace data item and a most recently output conditional instruction trace data item. This enables that tracing circuitry to determine for each conditional result trace data item, which if any conditional instruction trace data items can be implied from the corresponding conditional result trace data item.

In some embodiments having a buffering record, a conditional instruction trace data item is determined to have been buffered when a key comparison is performed to determine if a key corresponding to the conditional instruction trace data item is greater than a key corresponding to said most recently output conditional instruction trace data item and is less than or equal to a key corresponding to the most recently generated conditional instruction trace data item.

In some such embodiments, the values of the key wrap around when a maximum value is reached and the key comparison observes modulo arithmetic.

In some embodiments where the tag to key conversion operation is employed, this is performed such that when the tracing circuitry (or trace unit) receives one of the instruction observed indicators from a data processing apparatus, the current program status register table within the tracing circuitry is looked up using the instruction tag to identify an appropriate one of the current program status registers storing a relevant subset of condition code flags. This provides a straightforward mapping between the current program status registers and a given conditional instruction in terms of keeping track of which set of condition code flags are relevant to determining whether or not a particular conditional instruction is actually executed.

In some such embodiments where the current program status register table is looked up using the instruction tag, the tracing circuitry performs the tag to key conversion operation by allocating a new key value to any newly generated conditional instruction trace data item when none of the relevant subset condition code marks stored in the current program status register table currently indicate that they are to be traced. On the other hand, a repetitive key value that repeats the most recently allocated key value is allocated to a newly generated conditional instruction trace data item when one or more of the subset condition code marks (i.e. state entries) currently stored in the current program status register table indicate that they are to be traced. This provides a convenient and efficient way of matching conditional trace data items with corresponding result trace data items.

In some such embodiments where the instruction tag is used to look up the current program status register table, the tracing circuitry comprises trace compression circuitry configured to buffer output of at least one of the conditional instruction trace data items having new key values whose occurrence can be inferred by the diagnostic apparatus from output from the trace unit of a corresponding one of the conditional result trace data items. On the other hand, conditional instruction trace data items corresponding to one or more of the repetitive key values are not buffered. This ensures that the use of the keys to perform correlation between conditional instructions and associated conditional results remains reliable. If buffering of output of the conditional instruction trace data items is only used where there can be a unique correspondence between the key values and the particular compressed conditional instruction trace data item this protects against incorrect correlation between received conditional results and inferred conditional instructions.

In some such embodiments, that tracing circuitry is configured to supply the conditional result trace data item to the diagnostic tool together with an indication of whether or not one or more corresponding conditional instruction trace data items are permitted to be inferred by the diagnostic tool. This ensures that the diagnostic tool has clear guidance with regard to where it is permissible to infer the existence of one or more conditional instructions.

In some embodiments that are configured to buffer conditional instruction trace data items yet to output associated result keys corresponding to those buffered conditional instruction trace data items, the tag to key conversion operation performed by the tracing circuitry is modified in the event that a branch mispredict indication is received by the trace unit. This allows the system to accommodate branch mispredict events without comprising the accuracy of the correlation performed between the independently generated conditional instruction trace data items and conditional result trace data items.

In some embodiments the one or more conditional instruction trace data items are permitted to be inferred if a corresponding conditional result key is the same as a conditional instruction key currently buffered by the buffer of the trace compression circuitry.

It will be appreciated that conditional branch instructions could be traced in the same way as conditional non-branch instructions by using the independently output conditional instruction trace data items and conditional result trace data items. However, in some embodiments, the tracing circuitry is configured to receive from the trace input interface of the trace unit trace data relating to conditional or non-conditional branch instructions and load/store instructions and the tracing circuitry is configured to generate a first type of waypoint indicator denoting that a corresponding instruction corresponds to either a taken conditional/non-conditional branch or a load/store instruction and a second type of waypoint indicator denoting that a corresponding instruction corresponds to a not taken conditional branch. The ability to independently trace conditional branches and load/store instructions using "waypoints" and in a different way from the way that conditional non-branch instructions are traced provides additional flexibility in the tracing mechanism.

In some embodiments said trace unit further comprises trace result combining circuitry for receiving said conditional result trace data items generated by said tracing circuitry and for generating a compressed representation of at least some of said conditional result trace data items and storing said compressed representations, and combining at least some of said compressed representations such that multiple compressed representations of trace data items are output as combined trace data items.

It may be advantageous to represent the conditional result trace data items by compressed representations or tokens, where the most common items are represented by the shorter tokens. In this way if there are items that occur often these can be represented by short tokens and as trace data items have a certain size multiple tokens can be combined to be output as a single combined trace data item, thereby reducing the trace data that is output but not the information that is transmitted.

In some embodiments said trace result combining circuitry is configured to generate and store said compressed representations and on receipt of a conditional result trace data item that cannot be compressed by said trace result combining circuitry to output said stored compressed representations of trace data items as combined trace data items and then to output said conditional result trace data item that cannot be compressed.

In order to be able to effectively combine the compressed representations within combined trace data items it is convenient if several of them are stored prior to being output such that a greater choice of which tokens to combine can be made and more efficient combinations made. However, as an order of output needs to be maintained when an item that cannot be represented by a token is received then the stored items need to be output, similarly if the buffer became full it would need to be cleared by outputting the data stored.

In some embodiments the tracing circuitry is configured to receive from the trace input interface, trace data relating to conditional or non-conditional branch instructions and load/store instructions and the tracing circuitry is configured to generate a first type of waypoint indicator denoting that a corresponding instruction corresponds to a conditional branch predicted to be taken, a non-conditional branch predicted to be taken or a load/store instruction and a second type of waypoint indicator denoting that a corresponding instruction is predicted to be a not-taken conditional branch.

In some such embodiments that use waypoint indicators to indicate trace data relating to conditional branch instructions and load/store instructions, the instruction observed indicator is used by the data processing apparatus to indicate execution of conditional instructions other than conditional branch instructions and the tracing circuitry is configured to output a conditional instruction trace data item corresponding to the instruction observed indicator of at least one of the first type of waypoint indicator and the second type of waypoint indicator in the same trace data stream. The output of both the conditional instruction trace data items and waypoint indicators in the same trace data stream provides a convenient mechanism via which to distinguish between conditional non-branch instructions and other conditional instructions. Furthermore, since conditional branch instructions are typically easier to trace than conditional non-branch instructions it makes sense to provide a tailored mechanism for tracing of the conditional branch instructions and a different, more appropriate, mechanism for tracing of conditional non-branch instructions.

In some embodiments the result output indicator is used by the data processing apparatus to indicate execution of a conditional instruction other than a conditional branch instruction and the tracing circuitry is configured to output a conditional result trace data item corresponding to the result output indicator and at least one of the first type of waypoint indicator and the second type of waypoint indicator in the same trace data stream.

In some embodiments the instruction observed indicator is used by said data processing apparatus to indicate execution of a conditional branch instruction and the result output indicator is used by the data processing apparatus to indicate execution of a conditional instruction other than a conditional branch instruction and wherein the tracing circuitry is configured to output a conditional instruction trace data item corresponding to the instruction observed indicator, a conditional result trace data item corresponding to the result output indicator and at least one of the first type of waypoint indicator and the second type of waypoint indicator in the same trace data stream.

In some such embodiments the tracing circuitry is configured to output a first type of conditional instruction trace data item corresponding to conditional instructions other than conditional branches where a corresponding instruction key is the repetitive key value and a second type of conditional instruction trace data item corresponding to conditional instructions other than conditional branches where the corresponding instruction key is a new key value.

In some embodiments the tracing circuitry is configured to output a first type of conditional instruction trace data item corresponding to conditional branches where a corresponding instruction key is the repetitive key value and a second type of conditional instruction trace data corresponding to conditional branches where a corresponding instruction key is the new key value.

It will be appreciated that the first type of waypoint indicator and the second type of waypoint indicator could be independently output by the tracing circuitry in the same way that they are individually generated or any types of waypoint indicators (the same or different) can be concatenated together in any order to form a packet. However, in some embodiments the tracing circuitry is configured to concatenate a plurality of waypoint indicators to form a concatenated waypoint indicator for output to said diagnostic apparatus, said concatenated waypoint indicator comprising one of: a plurality of said first type of waypoint indicators; a plurality of said second type of waypoint indicators; and a combination of different types of waypoint indicators comprising at least one of said first type of waypoint indicator and at least one of said second type of waypoint indicator. This can reduce the trace bandwidth associated with the waypoint indicators without compromising the information content of the trace data stream.

Similarly, in some embodiments the tracing circuitry is configured to concatenate a plurality of conditional instruction trace data items to form a concatenated conditional instruction trace data item and to output the concatenated conditional instruction trace data item to the diagnostic apparatus instead of outputting the plurality of conditional instruction trace data items. Again, this provides for reduction in the volume of trace data output by the tracing circuitry associated with the tracing of conditional instructions without unduly compromising the overall information content of the trace data stream. In some such embodiments, the concatenated conditional instruction trace data item has a reduced trace bandwidth relative to the plurality of conditional instruction trace data items that would otherwise have to be output.

It will be appreciated that the tracing circuitry could output the concatenated conditional instruction trace data items in a completely separate trace data stream from the concatenated waypoint indicators. However, in some embodiments, the tracing circuitry is configured to output at least one concatenated conditional instruction trace data item and at least one concatenated waypoint indicator in the same trace data stream.

It will be appreciated that the tracing circuitry could cope with cancellation of execution of instructions or non-completion of speculatively executed or mispredicted instructions in a number of different ways in terms of managing the output of trace data associated with these instructions. However, in some embodiments, the tracing circuitry is configured to output a realignment trace data item. In some such embodiment the realignment trace data item is output in response to receipt from the data processing apparatus of a branch mispredict indicator. In other embodiments the realignment trace data item is output in response to receipt from the data processing apparatus of an abort indicator. In other embodiments the realignment trace data item is output in response to receipt from the data processing apparatus of an exception indicator. In other embodiments the realignment trace data item is output in response to receipt from the data processing apparatus of a cancel indicator. The use of the realignment trace data item in this way provides a convenient and rapid mechanism via which the diagnostic apparatus can keep track of when filtering of received trace data should be performed to take account of speculative execution and/or branch misprediction and/or out of order execution.

It will be appreciated that the present technique of independently outputting conditional instruction trace data items and conditional results trace data items in response to receipt from a data processing apparatus of a conditional result output indicator in potentially a different processing cycle from receipt of a conditional instruction observed indicator could be applied in any data processing apparatus whether or not it is capable of speculative or out-of-order execution. However, in some embodiments the tracing circuitry is configured to receive from the data processing apparatus a cancellation indicator indicating that one or more speculatively executed and traced instructions have been cancelled and the tracing circuitry is configured to generate, in response to the cancellation indication a realignment trace item. The realignment trace item that is output by the tracing circuitry informs the diagnostic tool which conditional instruction trace data items correspond to cancelled instructions and that these should be discarded.

In some such embodiments where the trace unit is configured to output a realignment trace data item, the tracing circuitry is configured to output any conditional instruction trace data items that have been received but not yet output prior to the output of the realignment trace data item. This avoids errors arising due to buffering of certain conditional instruction trace data items or from misguided concatenation of conditional instruction trace data items generated at different times where the times of generation span the output of the realignment trace data item.

In some embodiments the tracing circuitry is configured to output any waypoint trace data items that have been received but not yet output prior to output of the realignment trace data item.

In some embodiments where the tracing circuitry is configured to receive from said trace input interface, trace data relating to conditional branch instructions and load/store instructions and wherein said tracing circuitry is configured to generate a waypoint indicator denoting that a corresponding instruction corresponds to either a conditional branch or a load/store instruction and wherein the instruction observed indicator is used by the data processing apparatus to indicate execution of a conditional instruction other than a conditional branch instruction and wherein the tracing circuitry is configured to output said conditional instruction trace data item associated with the instruction observed indicator and to output the waypoint indicator in the same trace data stream, the tracing circuitry is configured to output the realignment trace data item in response to said branch mispredict indicator such that the realignment trace data item is output after receipt of said branch mispredict indicator but before output of a subsequently occurring conditional instruction trace data item or waypoint indicator. However, it is a valid alternative to output the realignment trace data item before the branch mispredict indicator.

In other embodiments the tracing circuitry is configured to receive from the trace input interface, trace data relating to conditional branch instructions and load/store instructions and wherein the tracing circuitry is configured to generate a waypoint indicator denoting that a corresponding instruction corresponds to either a conditional branch or a load/store instruction and wherein said instruction observed indicator is used by said data processing apparatus to indicate execution of a conditional instruction other than a conditional branch instruction and wherein the tracing circuitry is configured to output a conditional instruction trace data item associated with the instruction observed indicator and the waypoint indicator in the same trace data stream, the tracing circuitry is configured to output the realignment trace data item in response to the exception indicator such that the realignment trace data item is output after receipt of said exception indicator but before output of a subsequently occurring conditional instruction trace data item or waypoint indicator.

In some embodiments the conditional instruction trace data items are generated for a subset of said at least one instruction observed indicators depending upon contents of the current program status register table.

According to a second aspect the present invention provides a data processing apparatus comprising: data processing circuitry for performing data processing operations in response to execution of program instructions; and a trace output interface configured to independently output to a trace unit an instruction observed indicator indicating execution of a conditional instruction and a result output indicator indicating output of a result by said data processing circuitry in response to execution of said conditional instruction.

Providing data processing circuitry capable of outputting an instruction observed indicator associated with a conditional instruction and to independently output the corresponding result output indicator facilitates separate tracing of execution of conditional instructions and tracing of the output of the corresponding conditional results. This provides a convenient mechanism via which to trace execution of conditional instructions such as conditional non-branch instructions and reduces the buffering requirements by enabling the conditional instruction execution and the corresponding conditional results to be independently traced.

In some embodiments of the data processing apparatus the instruction observed indicator is output by said data processing apparatus in a first processing cycle and said result output indicator is output by said data processing apparatus in a second processing cycle, different from said first processing cycle.

In some such embodiments the data processing circuitry is configured to perform at least one of speculative execution and out-of-order execution of a sequence of program instructions. Separate tracing of conditional instruction execution and tracing of output of conditional results is particularly useful where speculative execution and out-of-order execution is a possibility due to the complexities of correlating conditional instructions with corresponding conditional results in such systems.

According to a third aspect the present invention provides a diagnostic apparatus configured to receive a trace data stream comprising conditional instruction trace data items and conditional result trace data items wherein said conditional result trace data items are distinct from said conditional instruction trace data items in said received trace data stream, said diagnostic apparatus comprising: diagnostic circuitry configured to process said conditional instruction trace data items and said conditional result trace data items with reference to an image of program instructions executed by said data processing apparatus in order to generate said trace data stream, said diagnostic circuitry being configured to use said image of program instructions to determine program instructions executed by said data processing apparatus.

Provision of a diagnostic apparatus capable of receiving conditional result trace data items which are distinct from conditional instruction trace data items in a received trace data steam provides for more efficient tracing of conditional instructions. Furthermore, the ability of the diagnostic circuitry to make use of an image of program instructions executed by a data processing apparatus and to determine program instructions executed by the data processing apparatus, even in cases where there is not a one-to-one correspondence between conditional instruction trace data items and conditional result trace data items. This improves the capacity of the diagnostic apparatus to cope with compressed trace data streams by providing it with the ability to deduce the existence of conditional instruction trace data items via an analysis of conditional result trace data items with reference to the image of the program instructions.

In some embodiments of the diagnostic apparatus according to the present invention, the diagnostic apparatus is configured to receive from a trace unit in a trace data stream, waypoint trace items each indicating that one of a branch instruction, a load instruction and a store instruction has been executed by the data processing apparatus. The trace data stream received by the diagnostic apparatus additionally comprises conditional instruction trace data items and conditional result trace data items and the received ordering of the waypoint trace items and the conditional instruction trace data items differs from an execution ordering of the corresponding waypoint instructions and conditional instructions.

In some such embodiments the diagnostic apparatus comprises a waypoint buffer for buffering received waypoint trace items and a conditional instruction buffer for buffering the received conditional instruction trace items. This makes it simpler for the diagnostic apparatus to resolve an appropriate ordering of the waypoint trace items and the conditional instruction trace data items and to reconcile the received ordering with an ordering implied by the image of the program instructions that is analysed by the diagnostic circuitry.

In some such embodiments the diagnostic circuitry is configured to permute the received ordering to obtain the execution ordering by independently analysing entries in the waypoint buffer and entries in the conditional instruction buffer with reference to the program instruction image.

In some embodiments of the diagnostic apparatus according to the present technique, if the diagnostic circuitry encounters a conditional instruction in the program image but a conditional instruction trace item is not currently present in the conditional instruction buffer then the diagnostic circuitry is configured to delay further processing of the corresponding execution thread of the program image until the conditional trace item appears in the conditional instruction buffer. This ensures efficient correlation between the sequence of instructions in the program image and the information received by the diagnostic circuitry. This provides the diagnostic circuitry with the flexibility to cope with receipt and analysis of a compressed trace data stream which some of the trace information must be reconstructed with reference to the program image.

According to a fourth aspect the present invention provides a method of generating items of trace data indicative of processing activities of a data processing apparatus based on information received from said data processing apparatus, said method comprising: receiving from said data processing apparatus at least one instruction observed indicator indicating execution of a conditional instruction and at least one result output indicator indicating output by said data processing apparatus of a result of executing said at least one conditional instruction; processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus.

According to a fifth aspect the present invention provides a method of generating within a data processing apparatus, items of trace data indicative of processing activities of a data processing apparatus, said method comprising: performing data processing operations in response to execution of program instructions; and independently outputting to a trace unit an instruction observed indicator indicating execution of a conditional instruction and a result output indicator indicating output of a result by said data processing circuitry in response to execution of said conditional instruction.

According to a sixth aspect the present invention provides a diagnostic method for processing trace data generated by a data processing apparatus, said method comprising: receiving a trace data stream comprising conditional instruction trace data items and conditional result trace data items wherein said conditional result trace data items are distinct from said conditional instruction trace data items in said received trace data stream; processing said conditional instruction trace data items and said conditional result trace data items with reference to an image of program instructions executed by said data processing apparatus in order to generate said trace data stream; and using said image of program instructions to perform a correlation between said conditional instruction trace data items and said conditional result trace data items to determine processing steps performed by said data processing apparatus.

Further aspects and features of at least embodiments of the present invention are defined in the appended claims. Features of the dependent claims may be combined with features of the independent claims as appropriate, and in combinations other than those explicitly set out in the claims.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 schematically illustrates Current Program Status Register table of the of the trace unit of FIG. 1 in more detail;

FIG. 3A is a table that schematically illustrates tracing and marking associated with execution of a sequence of four program instructions;

FIGS. 3B, 3C and 3D are tables showing which CPSR values are traced and which c-results keys are generated when exactly the same sequence of four instructions as in the table of FIG. 3A is executed out-of-order rather than in-order;

FIG. 5 is a table that schematically illustrates execution of three conditional instructions (ADDEQ, ADDNE, ADDVS) where the conditional results are evaluated after decoding of the third conditional instruction and shows the conditional result payload and the CPSR table actions corresponding to each instruction decode stage;

FIG. 6A is a table that schematically illustrates a case where updates for a conditional instruction tag B must not cause a new c-atom key to be generated for an ADDNE instruction immediately following instruction cancellation events;

FIG. 6B is a table that schematically illustrates that, in contrast to the situation in FIG. 6A, it is not always correct to use the same c-atoms key after conditional instructions are cancelled;

FIGS. 6C, 6D and 6E describe an alternative technique to the technique described with reference to FIGS. 3A to 3D, in which a two-state CPSR table is maintained;

FIGS. 7A to 7D are tables that schematically illustrates how waypoint and c-atoms are handled within that same trace data stream;

FIGS. 9A to 9C are tables that schematically illustrate concatenation of waypoints and conditional instruction trace data items;

FIGS. 11A to 11C schematically illustrate the relative positioning of a realignment trace data item in a trace data stream;

FIGS. 12A and 12B are tables that schematically illustrate how conditional instruction execution is implied based on conditional result trace data;

FIG. 13 is a table that schematically illustrates a trace data sequence similar to the sequence of FIG. 12B, but in which the values stored in the "last-c-atom-generated-key" register and the "last-c-atom-output-key" register are shown;

FIG. 16 illustrates examples of condition flags and condition states used in the processors designed by ARM Limited of Cambridge, UK;

FIG. 17 illustrates an example of identifiers for identifying particular sets of values of the condition flags;

FIG. 20 illustrates an example of a trace stream generated in the method of FIG. 18 and an example of the analysis of the trace stream according to the method of FIG. 19;

FIG. 21 illustrates an example of a sequence of program instructions in which multiple condition updating instructions occur in succession without any intervening conditional instructions;

FIG. 24 illustrates an example of a trace stream generated in the method of FIG. 19 and an example of the analysis of the trace stream according to the method of FIG. 20;

FIG. 27 illustrates an example of generating a trace stream using the method of FIG. 25 and an example of analysing the trace stream using the method of FIG. 26.

DESCRIPTION OF THE PREFERRED EMBODIMENTS

Figure 1:
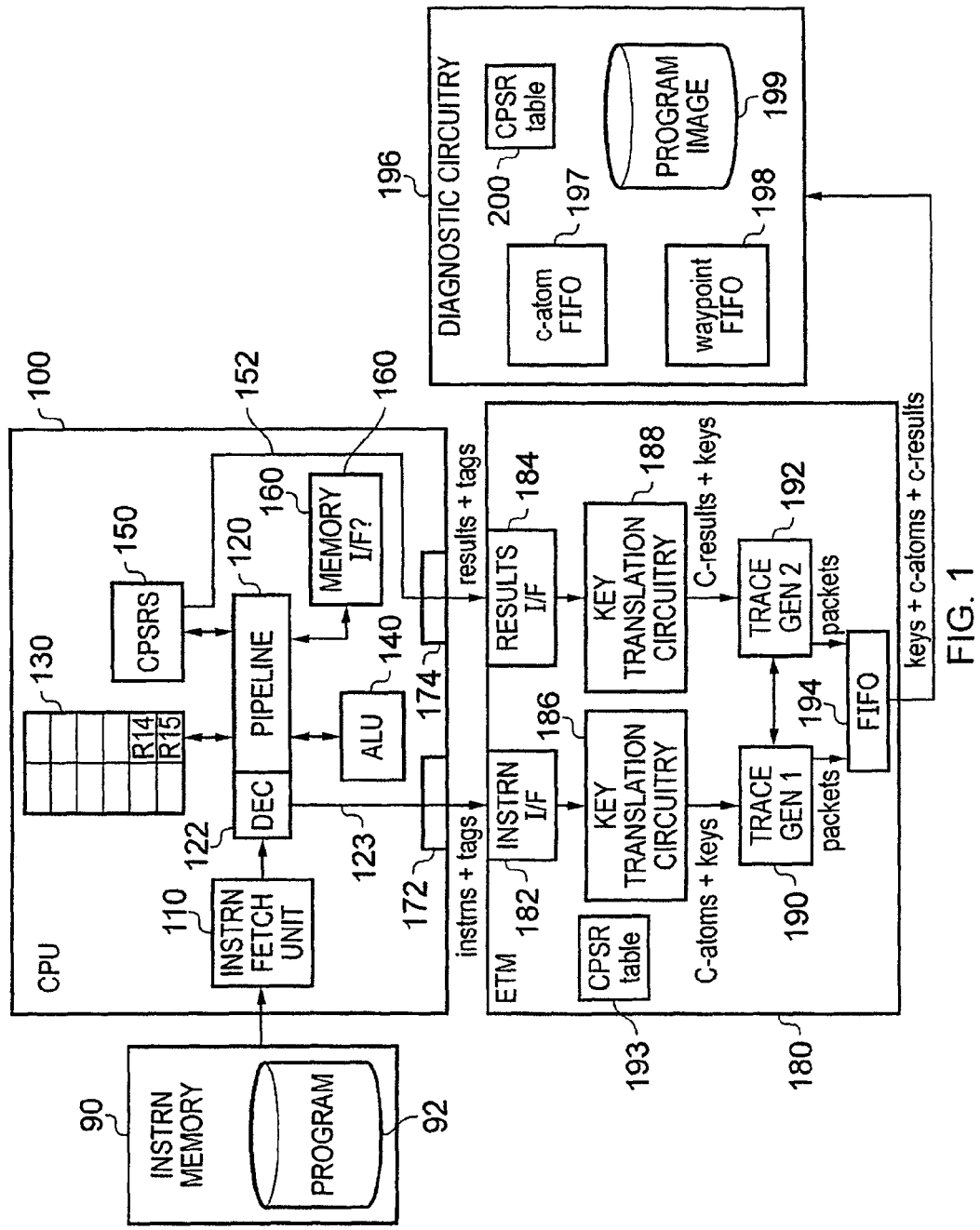
FIG. 1 schematically illustrates a data processing system according to an embodiment of the present invention.

FIG. 1 schematically illustrates a data processing system according to an embodiment of the present invention. The data processing system comprises: an instruction memory 90; a central processing unit (CPU) 100; an embedded trace macro cell (ETM) 180 containing tracing, circuitry; and diagnostic circuitry 196 for analysing output of the embedded trace macro cell 180.

The central processing unit 100 comprises: an instruction fetch unit 110; a pipeline 120 including a decode stage 122; a set of registers 130; an arithmetic logic unit (ALU) 140; a set of current program status registers (CPSR) 150; a memory interface 160; an instruction output interface 172; and a results output interface 174.

The instruction fetch unit 110 fetches instructions from a computer program 92 stored in the instruction memory 90 and supplies those fetched instructions to the decode stage 122 of the pipeline 20. The CPU central processing unit 100 illustrated in FIG. 1 is an ARM pipelined data processor. The pipeline 120 allows several operations associated with execution of program instructions to be undertaken substantially simultaneously rather than serially and thus increases throughput of instructions. The instruction fetch stage performed by the instruction fetch unit 110 can be considered to be an integral part of the pipeline 120. The decode stage 122 of the pipeline 120 involves decoding of registers from the register bank 130 that are to be used for execution of the particular instruction that has most recently been fetched. The CPU 100 is configured to perform speculative execution and out-of-order execution of program instructions.

Following the decode stage, the instruction proceeds to an execute stage of the pipeline (not shown) where registers from the register bank 130 are read and the arithmetic logic unit 140 is used to execute the instruction. A final stage of the pipeline 120 involves writing back to the register bank result(s) of the execution of the instruction.

The CPU 100 comprises the register bank 130, which has a plurality of registers each having a fixed-length. The register bank 130 incorporates a set of general purpose registers for use during execution of the program instructions. Note that ARM data processing instructions such as arithmetic operations, comparisons, logical operations and data movement operations work only on registers and not in memory, because the ARM architecture is a load/store architecture. Also contained within the register bank 130 is a dedicated program counter (not shown) that indexes a program instruction currently being fetched. Further registers included within the CPU are a set of dedicated current program status registers (CPSR) 150 and a set of dedicated saved program status registers (SPSR) (not shown). In the FIG. 1 embodiment, Register R14 of the register bank 130 is the link register whilst register R15 is the program counter. Specific instructions allow access to the current program status registers (CPSRs) 150. The current program status registers 150 each comprise a set of four condition code flags Z, V, C and M. These will be described in more detail with reference to FIG. 2 below.

In addition to the four condition code flags, the CPSRs 150 further comprise "mode bits" that define the current processor mode and interrupt disable bits. The link register R14 of the register bank 130 stores the return address for when so-called "Branch with Link" program instructions are executed. The return address is calculated from the program counter in R15. To enable execution flow of a program to return from a linked branch, the contents of the link register R14 are copied into the program counter register R15. The current values of the flags Z, V, C and M, which are stored in the CPSRs correspond to certain conditions used to determine whether or not conditionally executed instructions should be executed. Whilst most instruction sets allow only branch instructions to be executed conditionally, the ARM architecture allows many instructions to be conditionally executed because many ARM instructions contain a condition field that determines whether or not the CPU 100 will execute them.

The contents of the CPSRs 150 are used to assess whether or not a condition specified by an instruction's condition field has been satisfied. The ability to execute any kind of instruction conditionally allows for very dense in-line code without branches. The removal of the need for inclusion of many branch instructions in program code makes instruction execution more efficient because branches simply typically stall the pipeline 120. The time penalty of not executing several conditional instructions (where the specified condition is not satisfied) is typically less than the overhead of the branch instruction or subroutine call that would otherwise be required. To execute an instruction conditionally, the instruction is simply post-fixed with the appropriate condition. For example, in the ARM instruction set, a non-conditional ADD instruction takes the form "ADD r0, r1, r2", but to execute this conditionally on the condition that the zero flag Z is set, this instruction can be changed to "ADDEQ r0, r1, r2". The memory interface 160 is used to load data from and store data to memory.

As shown in FIG. 1, a first path 123 is provided from the decode stage 122 of the pipeline 120 to the instruction output interface 172 of the CPU 100 and to the instruction input interface 182 of the ETM 180. Typically conditional instructions are traced from the decode stage 122 of the processor, whilst the corresponding conditional results are traced from the ALU 140. A second path 152 connects the CPSRs 150 of the CPU 100 to the results output interface 174 of the CPU 100 and in turn to the results input interface 184 of the ETM 180. There is also a path connecting the CPSRs 150 to the pipeline 120. Thus it can be seen that the CPU 100 has one output interface 172 for conditional instructions and a further different output interface 174 for the corresponding conditional results 174. It will be appreciated that not all instructions will be conditional instructions, but the embodiment of FIG. 1 is particularly focusing on illustration of execution and tracing of conditional instructions.

The embedded trace macro cell 180 is a trace unit that provides real-time instruction trace and data trace for the CPU 100. The ETM 180 generates trace information that is used by the diagnostic circuitry 196 to reconstruct the execution of all or part of the computer program 92 stored in the instruction memory 90. The ETM 180 comprises both an instruction interface 182 for receiving conditional instruction observed indicators from the CPU 100 and a results interface 184 for receiving the corresponding conditional result indicators from the CPU 100. The indication of an instruction will not in general indicate that it definitely will execute because the indication may be taken from an early stage of the pipeline and it will not be known until many processing cycles later if the instruction will fully execute. The CPU 100 independently outputs conditional instruction observed indicators via the instruction interface 172 and conditional result output indicators via the trace results interface 174. A given conditional instruction observed indicator is output in a first processing cycle of the CPU 100, whilst the corresponding conditional result output indicator is output in a second, different processing cycle of the CPU. Accordingly, the timing of receipt of conditional instruction observed indicators from at the instruction interface 182 of the tracing circuitry 180 is different from the timing of receipt of the corresponding conditional result output indicators at the results interface 184. The CPU 100 outputs both the conditional instruction observed indicators and conditional result output indicators with associated "tags" identifying the particular register within the CPSRs 150 associated with the conditional instruction in question.

For each conditional instruction, the corresponding conditional result output indicator contains a payload that allows the diagnostic circuitry 196 to determine the pass/fail status of the conditional instruction. This payload is one of 1. a pass/fail result;
2. a partial CPSR value;
3. a full CPSR value (note that some implementations will never output a partial CPSR value); and
4. some other output.

Note that not all conditional instructions have a corresponding trace output, rather, only a subset of conditional instructions have a corresponding trace output (conditional result output indicator). If an instruction observed indicator is output by the CPU instruction interface 172 corresponding to a given conditional instruction then the ETM 180 generates a so-called "c-atom" in relation to that conditional instruction and the c-atom corresponds to a trace output (instruction observed indicator output by CPU 100) of the conditional instruction. When a corresponding conditional result output indicator is output to the results interface 184 via the results output interface 174 of the CPU this is denoted a "c-result". Thus the ETM instruction interface 182 receives conditional instruction observed indicators and their corresponding tags (typically, but not always, identifying associated CPSR 150 registers) whilst the ETM results interface 184 receives conditional result output indicators and their corresponding tags.

The ETM 180 comprises instruction key translation circuitry 186 that receives input form the ETM instruction interface 182 and is configured to convert the conditional instruction observed indicator and the corresponding tag to a c-atom. Similarly, the ETM 180 comprises results key translation circuitry 188, which is connected to the ETM results interface 184 and is configured to convert the conditional result output indicators and the corresponding tags received from the results interface 184 to c-results and corresponding keys. The conditional instruction observed indicators received by the ETM instruction interface 182 comprise both a tag representing an associated CPSR register of the CPU and a condition type such as EQ (equal to), MI (minus) or LT (less than). The conditional results output indicators received via the ETM results interface 184 comprise associated tags (again usually representing an associated CPSR register of the CPU 100) and a results payload. The tag system is used by the CPU 100 to keep track of which instruction observed indicator (c-atom) corresponds to which result output indicator (c-result). The instruction key translation circuitry 186 and result key translation circuitry 188 convert the core tags to trace keys, which follow a pre-defined sequence, by using a table of trace keys indexed by the core tags. Since it is possible that trace keys may clash when conditional result output indicators are evaluated late, special keys are used to resolve this issue. When keys are renamed to be sequential there is a possibility that the next sequential key is the same value as an earlier instruction execution indicator (c-atom) for which the result output indicator (c-result) has not yet been output. In this case the sequential key is not used because to do so would result in two result output indicators having the same key for different instruction execution indicators. Instead, a special key is used with a value that is never used as a sequential key. There is a 1:1 mapping between special keys and tags. For example, if there are 8 tags there could be 16 sequential keys and 8 special keys.

Output of the instruction key translation circuitry 186 is supplied to first trace generation circuitry 190 which converts the incoming c-atoms and corresponding keys to packets of instruction trace data. Similarly, the results key translation circuitry 188 supplies c-results and corresponding keys to the second set of trace generation circuitry 192, which generates conditional results trace packets as output. Both the conditional instruction trace packets (comprising packetised c-atoms and associated keys) and the conditional result trace packets (comprising packetised c-results and corresponding keys) are output to a FIFO 194 for storage. Data stored in the FIFO 194 is supplied to the diagnostic circuitry 196. The two sets of key translation circuitry 186, 188 effectively translate core tags (identifying associated CPSR registers for conditional instructions and results) to tracing circuitry keys in a type of renaming operation. This will be described in more detail below with reference to some specific examples.

The diagnostic circuitry 196 uses the received trace data to reconstruct execution events in the CPU 100. In order to do so, the diagnostic circuitry 196 has access to a computer program image 199 corresponding to a replica of the computer program 92, instructions of which are being executed by the CPU 100. Use of this program image 199 allows the diagnostic circuitry to analyse the program code to determine, for example, where in the sequence of instruction execution branch instructions occur. On receipt of the trace data, the diagnostic circuitry 196 stores the conditional instruction trace data (corresponding to instruction observed indicators output by CPU 100) in a c-atom FIFO 197 and stores trace data specifically related to conditional branch instructions and conditional load/store instructions in a waypoint FIFO 198. As will be described below, "c-atoms" are used to trace all conditional instructions except for conditional branches and "waypoints" are used to trace conditional branches or unconditional load/store instructions. However, in some cases, for example for conditional load/stores, a single instruction is both a waypoint and a c-atom.

As shown in FIG. 1, the ETM 180 comprises a corresponding CPSR table 193 and the diagnostic circuitry 196 also comprises a CPSR table 200. These two CPSR tables 193, 200 are used to track which CPSR results should be traced when instructions are executed out of order. In some circumstances, multiple CPSR values will be traced in order to follow a single flag setting instruction. An example CPSR table 193 is illustrated in more detail in FIG. 2. Note that the CPSR table 193 (see FIG. 2) comprises CPSR state entries (or CPSR flag marks) rather than the condition code flags as used by the processor.

As shown in FIG. 2, the CPSR table 193 is configured to store a two-bit (three state) value in relation to each CPSR condition code flag. The four CPSR condition flags are the Z-flag, the V-flag, the C-flag and the N-flag. The Z-flag indicates a zero result from an ALU flag; the V-flag indicates an ALU operation overflow occurred during execution of the instruction; the C-flag indicates that the ALU operation resulted in a carry, for example the result comprised a number of bits in excess of the register-width; and the N-flag indicates that there was a negative result (minus sign) from the ALU flag.

In the CPSR table 193 of FIG. 2, there are markers corresponding to three different states. The states are as follows:
1. Bit-value 00 not traced and not marked;
2. Bit value 01 to be traced and marked; and
3. Bit value 11 traced and marked.

The states stored in the CPSR Table 193 of the ETM are used by the instruction key translation circuitry 186 and the result key translation circuitry 188 to determine when the next trace key in a sequence should be generated and applied in the tag to key conversion process. Recall that the core tags that are output together with both the conditional instruction and the conditional result typically identify the particular CPSR being used by that particular instruction, in this case one of the six possible CPSR registers: CPSR A; CPSR B; CPSR C; CPSR D; CPSR E or CPSR F. Furthermore one of the four possible flag states (Z, V, C or N) for each of the six CPSR registers is specified. Also stored in the table are key values used when instruction trace data is generated. When a result trace data is generated a lookup is made in the table to determine the key to be used.

FIG. 3A is a table that schematically illustrates in-order execution of a sequence of four program instructions including three different conditional add instructions: ADDEQ; ADDNE; and ADDVS. The example of FIGS. 3A to 3D shows that two different CPSR condition code flags (i.e. flag marks) are traced in a CPSR table, which stores only a single state in relation to each CPSR value In the table of FIG. 3A, the first instruction executed is a comparison instruction CMP, which results in all marker bits being cleared to zero because the comparison is the operation upon which the result of which the subsequent conditional instructions depend. That is, execution or otherwise of the subsequent three conditional instructions depends on the execution result of the CMP. The first conditional instruction is an ADDEQ instruction, which is an addition operation dependent upon whether the comparison resulted in an exact equality. This conditional instruction uses the Z flag of the CPSR and thus the Z marker in the CPSR table is set to one upon execution of the add ADDEQ instruction. Thus the CPSR including the Z flag is traced. Next an ADDNE instruction is executed, which also uses the Z flag since it corresponds to an add operation being performed only if the outcome of the comparison is an inequality. Thus upon execution of the ADDNE instruction by the CPU 100 (see FIG. 1), the marker bits are unchanged. Finally an ADDVS instruction is executed that uses the V flag of the CPSR corresponding to overflow, so that when this instruction is executed, the V marker is set to one and the Z marker remains set. Thus at the end of the execution of the four instructions of FIG. 3A, the CPSR 150 is traced including both the V flag and the Z flag.

FIGS. 3B, 3C and 3D are tables showing which CPSR values are traced and which c-results keys are generated when exactly the same sequence of four instructions as in the table of FIG. 3A is executed, but executed out-of-order rather than in-order. In this case there are three different possible outcomes depending upon the timing and the capabilities of the executing CPU 100. In the table of FIG. 3B the conditional results are available quickly and thus a different trace key is used for the second c-atom. All three add conditional instructions have the same conditional instruction tag in the FIG. 3B case because whether or not they are conditionally executed all depends on the outcome of the same comparison instruction CMP (first instruction of the sequence of four). A c-atoms keys of "0" is generated when the first conditional add instruction, the ADDEQ is encountered, because this depends on the Z-flag. No new c-atoms key is generated for the subsequent ADDNE instruction because this depends on the same Z-flag as the preceding instruction. However a second c-atom key of "1" is allocated to the ADDVS instruction, which depends upon a different CPSR flag i.e. the V-flag. The conditional result for the first conditional instruction (ADDEQ) instruction becomes available in the cycle immediately after decoding of the ADDEQ as shown in the FIG. 3B table and this conditional result tag of A was converted to a C-result key of zero whose payload is the Z flag. The conditional result of the ADDVS instruction becomes available in the cycle immediately after the instruction is decoded and this results in generation of a second c-result key having a value of "1" and a payload of the V flag.

FIG. 3C shows execution of the same four instructions of FIG. 3A in an out-of order processor where the conditional results take longer to evaluate (due to capabilities of CPU 100) than in the case of FIG. 3B. In this case, the first conditional result tag output the cycle after decoding of the ADDVS instruction (fourth instruction in the sequence of four). Accordingly, in this case, the same c-result key of "0" is used for both the c-atom corresponding to the ADDEQ instruction (uses Z flag) and the c-atom corresponding to the ADDVS (uses V flag) instruction because they will both share a single c-result key of "0" having a payload of both the Z flag and the V flag.

The table of FIG. 3D is a final example for out-of order execution outcome for the instruction sequence of FIG. 3A. In this case the conditional results become available in the out-of-order processor after two later instructions (CMP and SUBEQ) outside the sequence of four (CMP, ADDEQ, ADDNE, ADDVS) are fully resolved by the CPU 100. A conditional instruction tag for the SUBEQ instruction is "B" whereas the conditional instruction tag for the three preceding conditional instructions (ADDEQ, ADDNE, ADDVS) is "A", reflecting the fact that the condition upon which these three instruction depend is the first CMP whereas the condition upon which the SUBEQ depends is the second CMP. It can be seen that the conditional result tag B precedes the conditional result tag A and thus the conditional instruction SUBEQ is fully resolved prior to resolution of the preceding three conditional instructions having the conditional instruction tag A. Note that each time a CMP instruction is decoded (instruction upon which other conditional instructions depend) there is a change to the CPSR and a hence a there is a corresponding change to the conditional instruction tag. Thus, in the table of FIG. 3D, the result for the conditional instruction tag "A" arrives after (i.e. in a subsequent processing cycle to) the conditional result for the conditional instruction tag "B". The payload of the conditional result B is the Z flag whereas the payload of the conditional result tag A is both the Z flag and the V flags.

The separate tracing of conditional instructions and the conditional results according to embodiments of the present invention enables better throughput of trace results. This is apparent from FIG. 3D, because in previously known systems trace data items associated with all five of the conditional instructions in the table of FIG. 3D would have to be buffered until the conditional result tagged by "A" was ready for output. By way of contrast, according to embodiments of the present invention, the c-atoms and keys corresponding to all four instructions can be output as they are generated since c-atoms and corresponding keys can be output in different processing cycles. The ETM CPSR table 193 is used to determine when c-results are required (corresponding to received C-atoms) and which CPSR flags should be traced.

This technique is useful in reducing the number of flag values traced when the CPU 100 is configured to be able to calculate partial CPSR values and to resolve conditional instructions even when not all of the CPSR flags are known. A partial CPSR result is one where not all of the flags in the CPSR are known. For example, an ADDEQ instruction only needs the Z flag to be resolved, so a partial CPSR result containing the Z flag is sufficient to resolve the result for the conditional instruction. It can be seen in the examples of FIGS. 3B, 3C and 3D, from the "c-result key" column and the "c-atoms key" column that in some cases the next trace key value in the sequence is used whereas in other cases the same trace key value is used corresponding to different conditional instructions. In order to determine when the next trace key in a sequence should be used, the states stored in the CPSR table are used. When a c-atom is generated corresponding to an instruction (indicating that execution of that instruction by the CPU 100 has commenced) then the flag states of the CPSR are looked up using the conditional instruction tag as an index because the tag identifies the particular CPSR associated with that conditional instruction. The Current Program Status Register marked bits are looked up and used as described below with reference to FIGS. 22 and 25. There are different sets of bits for each CPSR.

Returning now to the first embodiment of FIGS. 3B, 3C and 3D, the ETM CPSR table 193 stores the three states: (i) not traced; (ii) to be traced; and (iii) traced. In this embodiment, in order to determine when the next trace key (c-atoms key) in the sequence should be used, the states stored in the CPSR table 193 are used and when a c-atom is generated by the ETM instruction key translation circuitry 186, the flag states are looked up using the corresponding conditional instruction tag (generated by the CPU) as an index. The manner in which trace keys are allocated is summarised in the table below.

| FLAG STATES VALUE | ACTION |
|---|---|
| None of flag states are "to be traced" | Use next trace key value |
| One or more flag states are "to be traced" | Use same trace key value as for most recent Conditional instruction trace data item (c-atom) |

As shown in this table, when none of the flag state values are indicated as "to be traced" in the ETM CPSR table 193 then a next trace key value (c-atoms key) in the sequence is allocated. Whereas if one or more of the flag states of the particular CPSR corresponding to the c-atom tag are "to be traced" then the same trace key value (c-atoms key) is used as for the most recent c-atom.

Figure 4:
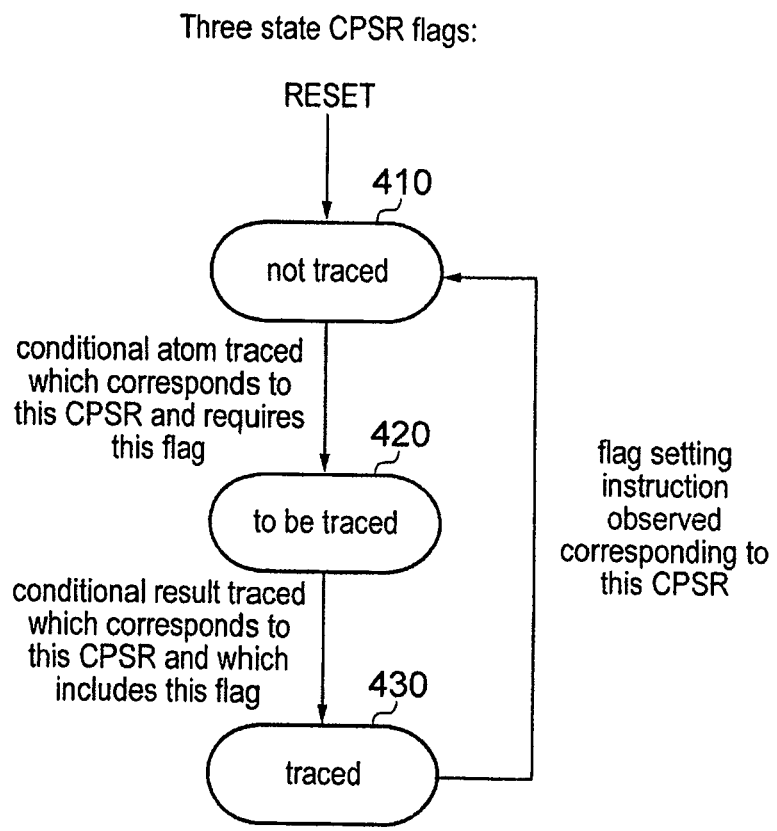
FIG. 4 is a state machine that schematically illustrates the three state CPSR flags for the CPSRs 150 of FIG. 1

FIG. 4 is a state machine that schematically illustrates the three state CPSR state flags for the CPSRs 150 of FIG. 1. The system is first reset and then at stage 410 a given CPSR state flag is set to a "not traced" state. In the event that a conditional atom is traced which corresponds to the given CPSR and requires the associated CPSR state flag then the CPSR state flag changes for "not traced" state 410 to a "to be traced" state 420. The CPSR state flag remains in this state until a conditional result corresponding to the given CPSR and including the associated flag is traced whereupon, the given CPSR state flag changes to a "traced" state 430. The CPSR state flag remains in this traced state 430 until a flag setting instruction corresponding to the given CPSR is observed, in which case a transition is made from the "traced" state 430 back to the "not traced" state 410.

The table of FIG. 5 revisits the example of FIG. 3C above, i.e. the execution of three conditional instructions (ADDEQ, ADDNE, ADDVS) where the conditional results are evaluated after decoding of the third conditional instruction. FIG. 5 is an example of the three state system of FIG. 4. The table if FIG. 5 shows, in addition to the conditional instruction tag, c-atoms key and conditional result tag (also shown in FIG. 3C), the conditional result payload (second column from right), the CPSR table actions corresponding to each instruction decode stage (right-most column).

Looking at the entries in the FIG. 5 table, upon decoding of the CMP instruction (whose execution result determines whether conditions attached to the subsequent three conditional instructions are satisfied) all states for tag A are set to "not traced". Next, upon decoding of the ADDEQ instruction, the conditional instruction tag A is output and a c-atoms key of "0" is output, then in the ETM CPSR table 193, "CPSR A" is looked up (see FIG. 2) and it is seen that none of the four flags are "to be traced" so a new group is started. A c-atom is required because the state of the flag Z for tag A (CPSR A)

was set to be "not traced". Next, due to decoding of the conditional instruction ADDEQ, the state of flag Z for tag A is set as "to be traced". Upon decoding of the ADDNE instruction (consecutively to the decoding of ADDEQ), since this instruction will be conditionally executed based upon the opposite condition (not equal to) relative to the condition attached to the ADDEQ instruction (equal to), this will also depend on the condition code flag Z, which has already been tagged at the preceding decoding stage. Accordingly, the state of flag Z from tag A is already set "to be traced" and no new c-atom is required. Recall that a new trace key value is only used if none of the flags of the relevant CPSR are set to be traced.

When the ADDVS instruction is in the decode stage a further c-atoms key of "0" is output because the Z flag is already set "to be traced" and a new group has not started. However, a c-atom is required in this case (unlike the case of the ADDNE instruction) because the state of flag "V" for tagged CPSR A was not previously set "to be traced". Accordingly, the state of flag V for CPSR A (se FIG. 2) is set "to be traced". Next, the CPU 100 indicates that the flag Z is valid but the flag V is not valid. However, it is known by looking at CPSR table 193 that both the Z and V flags are required to resolve the three preceding conditional instructions (ADDEQ, ADDNE, ADDVS), so the conditional result cannot yet be traced in full. When a conditional result becomes available, indicated by the output of the conditional result tag A, which has a conditional result payload of both the Z and V flags, the CPU 100 indicates that both the Z and the V flags are valid. The ETM CPSR table 193 tells us that these two flags are all that is required in order to trace the conditional results can. Accordingly, the state of Z and V flags for tag A (CPSR A) are set to the "traced" state. Note that the Z and V flags both need to be valid to trace the conditional results.

A look up of the ETM CPSR table 193 is necessary to ensure that the correct c-atom and c-result correlation can be achieved after a cancel instruction is issued by CPU 100. FIGS. 6A and 6B are tables providing examples of whether or not a new group (i.e. a new c-atoms key) should be started for the three state CPSR flag system of FIG. 4. The table of FIG. 6A schematically illustrates a case where updates for a conditional instruction tag B must not cause a new c-atom key to be generated for an ADDNE instruction immediately following instruction cancellation events. In the table of FIG. 6A, when the ADDEQ instruction is in the decode stage, the Z-bit flag for tag A (CPSR A) is set "to be traced". A second CMP instruction following a branch instruction (third instruction in FIG. 6A table) results in a different CPSR (i.e. CPSR B) so conditional instruction tag B is allocated to the following conditional instruction SUBEQ. Furthermore, a different c-atoms key is generated for SUBEQ because none of the flag states corresponding to CPSR B are currently set "to be traced". The conditional result tag for conditional instruction tag B is output in the cycle subsequent to decoding of the SUBEQ instruction, so a c-result key of "1" is output, matching the SUBEQ c-atoms key of "1".

Next in FIG. 6A, the instructions CMP and SUBEQ are both cancelled, although the associated c-result key and the c-atoms key of "1" are still present in the trace stream. However, when the ADDNE instruction is decoded, the conditional instruction tag returns to a value of A (previously used for ADDEQ) and a c-atoms key of "0" (i.e. not a new key) is required because this ADDNE instruction is still associated with the most recent non-cancelled comparison operation CMP which corresponds to the conditional instruction tag A.

FIG. 6B shows an alternative example that illustrates, in contrast to the situation in FIG. 6A, it is not always correct to use the same c-atoms key after conditional instructions are cancelled. In the example of FIG. 6B, if the ADDNE instruction (decoded after the mispredicted branch cancellation) did not start a new key then its result, corresponding to conditional result tag B, would apply to both the ADDNE and the ADDEQ instructions, which is incorrect because they are both associated with different "CMP" instructions. The difference between the table of FIG. 6B and the table of FIG. 6A is in the case of table of FIG. 6B, the second CMP was not cancelled (only the branch instruction and any instructions after the branch prior to receipt of the cancellation request are cancelled) so a new conditional instruction tag and a new c-atoms key is in fact required in this case. In FIG. 6B there is a non-conditional instruction "SUB" after the branch instruction.

FIGS. 6C, 6D and 6E describe an alternative technique to the technique described with reference to FIGS. 3A to 3D. In this alternative technique a two-state CPSR table is maintained. According to this alternative embodiment, the current CPSR is handled differently to the other CPSRs in the table. Recall that in FIG. 2, there are six different CPSRs each having an associated set of four condition flag states (giving a total of 24 different table entries). In the alternative embodiment of FIGS. 6C-E, the current CPSR is handled such that we need only have two states per flag for the current CPSR. However, these two states mean different things. FIGS. 6C and 6D show how the two state CPSR table (just one bit per flag for the current CPSR) and the in-flight bits (one bit per flag of every CPSR) correspond to the three states of the state diagram of FIG. 4. FIG. 6E is an example of a use of the in-flight bits.

If the CPU 100 is not able to present partial CPSR results but can only present full CPSR results then it is not necessary to store state for each flag in the CPSR table. Instead, a single bit can be stored for each of the CPSRs indicating if any CPSR is "to be traced" i.e. that the result is "in flight" in the CPU pipeline 120.

In the FIG. 6C-E embodiment (unlike the FIG. 2 embodiment of the CPSR table) each CPSR tag has a single bit (denoted "in flight" bits), which indicate if a future "c-result" is expected. The CPSR table for the current CPSR with two states for each CPSR flag together with the "in flight" values correspond to the three states of the state diagram of FIG. 4. The table of FIG. 6C explains how these in-flight bits are used and maintained. In response to a c-atom being output by the ETM instruction key translation circuitry 186, an in-flight bit corresponding to the conditional instruction tag (denoted "RH tag" in FIG. 6C) is set. If a conditional result is received by the second trace generation circuitry 192 from the ETM result key translation circuitry 188, if the in-flight bit corresponding to the conditional result tag (denoted "LH tag" in FIG. 6C) is set, then the c-result is output in the trace data stream via the FIFO 194 and the bit is then cleared. The in-flight bits are used to determine when a previous c-result has been received for a previous c-atom with the same tag (i.e. corresponding to the same CPSR). When a c-atom is generated corresponding to an instruction, the in-flight bit is looked up using the associated conditional instruction trace data item tag (output by CPU 100) as an index.

The table of FIG. 6D shows how trace keys are generated by the ETM instruction key translation circuitry 186 (see FIG. 1) in this embodiment. In particular if the in-flight bit value corresponds to a value of "0" meaning that the result is not in flight, then the next trace key value is used. If on the other hand the in-flight bit value has a value of "1" indicating that the conditional result is in flight, then the same trace key value is used as was used for the most recent c-atom.

Thus the three states of the state diagram of FIG. 4 are tracked via two data stores:

(1) The in-flight table of FIG. 6D with one bit (two states) for every flag of every CPSR. These indicate if flags need to be traced when emitted by the data processing apparatus i.e. which bits of the results are needed to reconstruct the result of the corresponding earlier conditional instruction.

(2) The CPSR table for the current CPSR which has two states (marks) for each flag of one CPSR (the current CPSR) indicating if the conditional instruction is traced as a c-atom or not.

The table of FIG. 6E revisits the example of FIG. 3A and shows how the in-flight tags are set when the rules of FIG. 6C and FIG. 6D are implemented. In the example of FIG. 6E, the conditional result corresponding to the three conditional instructions ADDEQ, ADDNE and ADDVS becomes available after the instruction ADDVS has been decoded (similarly to the case of FIG. 3C). When the first c-atom is output in the trace (FIG. 6E table) corresponding to the same row as the row in which the instruction ADDEQ is decoded, then the in-flight bit for tag A is looked up and it is found that the result is "0" (not in flight), so a new group is started with a new trace key value. In this case c-atoms key="0".

When the next c-atom is generated at the same stage as the instruction ADDVS being in decode, then the in-flight bit for conditional instruction tag A is again looked up, because the instructions ADDEQ and ADDVS share the same conditional instruction tag. In this case, the result is a "1" (indicating in-flight) so a new group is not started and the same trace key value is used as for the most recent c-atom. Thus the c-atoms key for the instruction of ADDVS is also "0". When the conditional result tag A is output at the stage after the decoding of ADDVS, then the in-flight bit for tag A is cleared. This bit clearance indicated that the results corresponding to the conditional instruction tag A have been resolved so are no longer "in-flight" in the core pipeline.

FIGS. 7 to 11 schematically illustrate how conditional branch instructions are separated from other conditional instructions in the same trace stream and treated slightly differently. In particular, conditional branch instructions and (unconditional) load/store instructions are traced using so called "waypoints" whilst all other conditional instructions are traced using the "c-atoms" as described above. It is known to use waypoints to trace conditional branches and to indicate which branches are taken and not taken. This is described in detail in the granted U.S. Pat. No. 7,707,394 assigned to ARM Limited.

Waypoints can be used to represent not just conditional branch instructions, but also load/store instructions. U.S. Pat. No. 7,707,394 explains how sequences of waypoints are detected and output together in a trace data stream so that the single trace data item represents a plurality of waypoints. Core tags can be associated with the waypoints in a similar way to the way in which, according to embodiments of the present invention, tags are associated with c-atoms (conditional instruction observed indicators) by the CPU 100 described above. These core tags are renamed by the ETM to form trace keys that follow a predetermined order. Due to the fact that the trace keys follow a predetermined order, there is no strict requirement to output the keys together with the waypoints.

In fact, the waypoints output in the trace data stream are labelled by one of two values, as indicated in the table of FIG. 7A. As shown in this table, "E" labels a waypoint that corresponds to either: (a) a conditional branch instruction for which the branch was actually taken when the program instructions were observed; or (b) a load/store instruction. For these "E" waypoints a trace key is incremented by one. However, for conditional branch instructions that are not actually taken when the program is observed, the trace key is incremented by one and these waypoints are labelled by "N". In the above description of FIGS. 1 to 6, the output of c-atoms is described with reference to all conditional instructions. However, in some embodiments, rather than outputting a c-atom for all conditional instructions, conditional branch instructions are singled out and treated differently. In particular, instead of outputting a c-atom flagging execution of the conditional branch instruction, instead a waypoint is output in the trace data stream with an associated "E" or "N" status as indicated in the table of FIG. 7A.

As described above, a plurality of waypoints can be compressed (or concatenated) to form a single trace data output item and a plurality of c-atoms can be compressed in a similar way. As described above, c-atoms are also subject to sequence detection and tag-to-key translation in the ETM 180.

However, it should be noted that c-atoms differ from waypoints in an important way. In particular, sequences of waypoint, keys always increment by one, but for c-atoms although C-atom keys sometimes increment, other times they do not increment at all. In particular, when one or more CPSR flag states of the particular tagged CPSR (A, B, C, D, E or F of FIG. 2) are "to be traced", then the same trace key value as for the most recent c-atom in the sequence is used and in this case the c-atom key does not increment by one. This can be encoded using two different types of c-atom as illustrated in the table of FIG. 7B.

The FIG. 7B table shows that conditional instructions (with the exception of conditional branches) are characterised as follows: —conditional instructions (except for conditional branches) where the trace key (c-result key) does not change between the previous c-atom and a subsequent c-atom are denoted "P0"; and conditional instructions (except for conditional branches) where the trace key (c-result key) is incremented by one are denoted "P1".

Thus, for example, if we denote the c-result keys of a sequence of c-atoms as: 0, 1, 2, 2, 3, 4, 5, 5, 6
This can be encoded as follows: P1, P1, P1, P0, P1, P1, P1, P0, P1.

It should be clear that, at the points in the sequence where the c-atoms key does not increment (i.e. where there are two consecutive "2"s and two consecutive "5"s), a P0 is output upon the second repetition of the same trace key and otherwise a P1 is output. These P1 and P0 trace elements can be compressed (or concatenated) in a similar way to E elements and N elements for waypoints. The compression for E and N waypoints is previously know and is described in detail in U.S. Pat. No. 7,707,394. The fact that, according to embodiments of the present invention, c-atoms, c-results for conditional instructions and waypoints can be output by the tracing circuitry in different processing cycles means that c-atoms can be output independently and subsequently correlated with the corresponding c-results using a key system. This enables c-atoms to be compressed independently from c-results and waypoints yet output together in the same trace data stream. This provides improved efficiency by enabling independent compression of waypoints, c-atoms and c-results.

The table of FIG. 7C shows waypoint events and c-atoms generated by the tracing circuitry of the ETM 180 according to execution events in the CPU 100 with successive lines in the table representing successive and sequential processing cycles. The right-most column of the table of FIG. 7C shows corresponding trace data output. The order of generation of the trace data output items is indicated by the successive rows of the table. The first trace output corresponds to compressed waypoint trace output "EEEN". Notably, this is output subsequent to generation of a P1 c-atom between the last of the three Es and the N. The next trace data output corresponds to compressed c-atoms "P111" and again these are output as three consecutive c-atoms despite the three occurrences of P1 being interspersed in the output sequence two N waypoints. The third trace output corresponds to "P110", which correlate with the successive P1, P1 and P0 output in the "c-atoms generated" column. Prior to output of these three c-atoms P1, P1, P0, two "N" waypoints have been output, but these waypoints not yet been indicated in the trace output. A final trace output corresponds to "NNNE", which reflects the remaining waypoints output prior to the P1, P1 and P0 and also the final waypoint E generated at the end of the sequence.

As shown in FIG. 1, the diagnostic circuitry receives the trace data output and separates the compressed c-atoms into the c-atom FIFO 197 and traces the compressed waypoints into the waypoint FIFO 198. As a result of the changes to the ordering as a result of the compression of the trace output shown in the table of FIG. 7C, the diagnostic tool 196 of FIG. 1 effectively obtains an ordering different to the execution order when it decodes the trace output from the ETM 180. In this particular example of FIG. 7C the trace output ordering is:
E, E, E, N, P1, P1, P1, P1, P1, P1, P0, N, N, N, E. The diagnostic circuitry 196 makes use of the program image 199 to reorder these compressed waypoints and compressed c-atoms to restore them to a correct execution order. The diagnostic tool 196 does this by working through the program image to identify all of the branches. Each branch is associated with an E or N waypoint, which inherently gives "branch taken" or "branch not taken" information that allows the diagnostic tool 196 to determine exactly which instructions in the program image were taken and which conditional branch instructions were not taken according to the conditions prevailing in the CPU 100 at the time. As the diagnostic circuitry 196 follows this thread corresponding to the waypoints, on trawling through the program it will also encounter conditional non-branch instructions by reference to the program image 199 and each of these conditional non-branch instructions is associated in order with a c-atom in the received trace data stream. However, note that although many conditional instructions result in generation of a c-atom there is a subset of conditional instructions that do not result in the generation of a c-atom, for example, the ADDNE of FIG. 3B.

The table of FIG. 7D explains how the diagnostic circuitry 196 treats waypoints and c-atoms upon receipt from the ETM 180 and places them into the separate c-atom and waypoint FIFOs 197 and 198. The table explains for each instruction type encountered, when following the thread of execution via the program image 199, the action taken by the diagnostic circuitry when it encounters a particular type of instruction. On encountering a branch instruction an E or N is taken from the waypoint FIFO 198. On encountering a load/store instruction again either an E or an N is taken from the waypoint FIFO 198. When a conditional branch instruction is encountered no corresponding c-atom will be generated because this is a special case dealt with by waypoints (instead of c-atoms), so either an E or an N is taken from the waypoint FIFO 198. Conditional load/store instructions are waypoints (due to being load/store) and can also be c-atoms (due to being conditional), but for a non-conditional load/store there is no corresponding c-atom, so in this case an E is taken from the waypoint queue because it is known that load/store never correspond to an N waypoint (not taken branch). However, in the case of a conditional load/store, a P0 or a P1 is also taken from the c-atom FIFO 197. All "other conditional instructions" (i.e. other than conditional branches and conditional load/stores) fall into the category covered by generation of c-atoms and in this case either a P0 or a P1 is taken from the waypoint FIFO. Since generated c-atoms and generated waypoints are stored in-order in the c-atom FIFO 197 and the waypoint FIFO 198, so the order of removal from these entities from the FIFOs reflect the program execution order.

Figure 8:
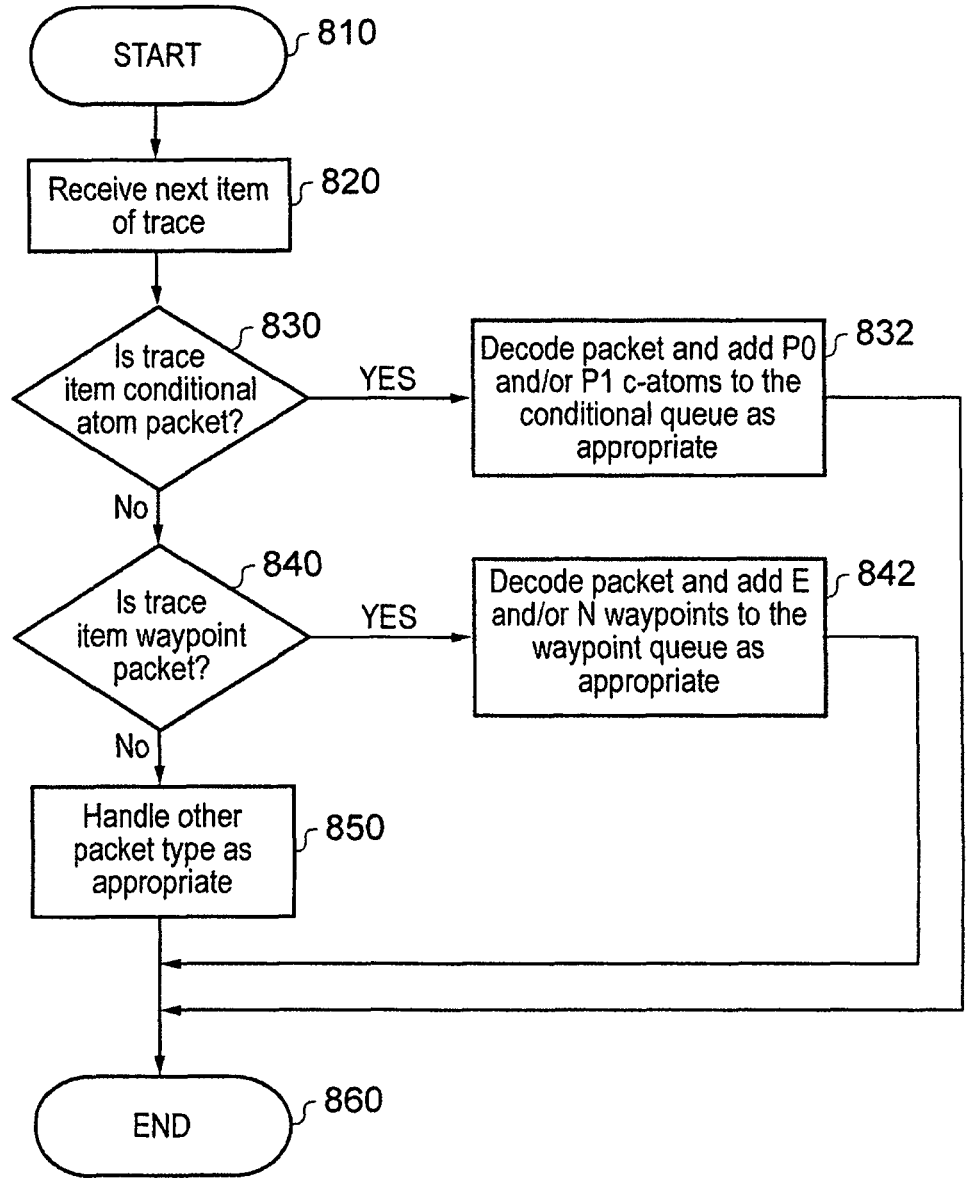
FIG. 8 is a flow chart that schematically illustrates actions taken by the diagnostic circuitry of FIG. 1 upon receipt of a trace data stream containing both conditional atom packets and waypoint packets.

FIG. 8 is a flow chart that schematically illustrates actions taken by the diagnostic circuitry 196 upon receipt of a trace data stream containing both conditional atom packets and waypoint packets. The process beings at stage 810 where receipt of the trace data items at the diagnostic circuitry 196 starts. Subsequently, at stage 820, the diagnostic circuitry 196 receives the next item of trace data and then progresses to stage 830 where it is determined whether trace item is a conditional atom (c-atom) packet. If the trace item is in a fact a c-atom packet then the process proceeds to stage 832 where the packet is decoded and P0 and/or P1 c-atoms are added to the c-atom FIFO 197 as appropriate. The process then proceeds to stage 860 where it ends.

On the other hand, if it is determined at stage 830 that the particular trace data item is not a c-atom packet then process proceeds to stage 840, where it is determined if the trace item is a waypoint packet. If the trace item is in fact a waypoint packet then the process proceeds to stage 842 where the packet is decoded and E and/or N waypoints are added to the waypoint FIFO 198 as appropriate. Then the process proceeds to the end stage 860. However, if at stage 840 it is determined that the trace data item is not a waypoint packet, which means that the trace item is neither a c-atom packet nor a waypoint packet, then the process proceeds to stage 850 where the other packet type will be handled as appropriate in a conventional manner and then the process ends at stage 860.

FIGS. 9A, 9B and 9C schematically illustrate what happens to trace output comprising compressed waypoints and compressed c-atoms in a CPU 100 capable of speculative out-of-order processing when there is a branch mispredict or when an abort occurs resulting in cancellation of one or more waypoints.

The table of FIG. 9A schematically illustrates how a problem can occur due to the compression of the waypoints and c-atoms in the event that at least one waypoint is cancelled because the diagnostic tool 196 will be unaware in this situation of how many conditional instructions were executed prior to the cancel event. Part way down the table of FIG. 9A there is an event whereby one waypoint (i.e. the preceding N) is cancelled and the trace output indicates that one waypoint has been cancelled but doesn't give any information with regard to the compressed c-atoms. Note that in the trace output the first two generated c-atoms P1, P1 have not yet been output in the trace stream, but a compressed c-atom trace output "output P111" is output subsequent to the cancellation. The "output P111" means that three c-atoms P1, P1, P1 have been generated. Since cancellation of the waypoint N in this case (but not necessarily) results in cancellation of the immediately subsequent c-atom P1, the diagnostic circuitry 196 will be unaware when the compressed c-atom output P111 is received after the "cancel 1" trace output that one of the "P1"s corresponding to the compressed "P111" trace output was in fact cancelled. Thus, although the diagnostic tool knows which waypoint was cancelled, it does not know which of the c-atoms was also cancelled as a consequence. In other words, the order of the c-atoms and the cancel event is lost due to compression, so that the diagnostic circuitry 196 does not know if the second P1 was before the cancel (in which case it was not architecturally executed) or after the cancel (in which case it was architecturally executed). Similarly if a mispredict occurs, which requires that a conditional instruction was not architecturally executed, but no waypoints were cancelled in the trace, the diagnostic circuitry 196 will not be aware that a conditional instruction was not executed. In order to address this and to prevent the compression of the waypoints and c-atoms resulting in the diagnostic circuitry 196 making incorrect assumptions in the event of instruction misprediction or cancellation, The following two rules are implemented:

I. In the event of a branch mis-predict, an abort or an exception or any other cancel instruction a realignment trace item is output along with the cancel trace indication (but for an exception the sequence must be cancel, exception then realignment);

II. All c-atoms already generated are output prior to the realignment trace item;

III. All waypoints already generated are output prior to the realignment trace item.

The re-alignment trace item indicates to the diagnostic circuitry 196 that any c-atoms in its c-atom FIFO 197 should be discarded because they correspond to cancelled instructions. The table of FIG. 9B gives one example of use of the realignment trace data item together with the cancelled trace data item. In this example, an N waypoint is cancelled in the same way as for the example in the table of FIG. 9A, the difference being that in this case, when the cancel indication is output in the trace data stream an indication of all of the c-atoms already generated prior to the cancel is indicated in the trace output. This corresponds to the "P11" trace output. Then the cancel indication "cancel 1" is output and then a "realignment" indication is output in the trace. In this case the ordering of the c-atoms and the cancel is maintained because the realignment flushes any buffered c-atoms and the realignment is always output with the cancel (either before or after). The ETM does not keep track of how many (if any) c-atoms have been cancelled because it does not store enough state to determine this. However, the diagnostic tool can work out which c-atoms have been cancelled.

FIG. 9C schematically illustrates the actions taken by the diagnostic circuitry 196 in response to receiving the trace output indicated in the table of FIG. 9B. The first column shows all of the trace data items received by the diagnostic circuitry 196. This is then sub divided into a waypoint queue (second column) and a conditional queue, i.e. c-atom queue (third column). The actions of the diagnostic circuitry 196 in response to receipt of the trace output is as indicated in the right-most column of the table. The first diagnostic circuitry action is to infer execution up to E. This is because instructions (other than waypoints and c-atoms) executed between all waypoints are inferred by the diagnostic circuitry 196. The diagnostic circuitry 196 cannot infer up to the waypoint N because a c-atom has not yet been received and a c-atom is expected at this point by the diagnostic circuitry 196 from its analysis of the program image 199. A "cancel 1" indication is received in the trace data stream after the compressed trace element P11 is received, so the diagnostic circuitry cancels everything up to and including the last waypoint i.e. the N waypoint. Following receipt of the realignment trace item, the c-atom FIFO 197 is flushed removing the P11 and P1 issued prior to the cancel and the P1 added to the conditional queue at the same time that the "cancel 1" is received. Following the realignment a compressed c-atom P1110 trace is received but the diagnostic circuitry is expecting from its analysis of the program image 199 to receive waypoints and no waypoints have been received, so no c-atoms can yet be processed by the diagnostic circuitry. The subsequent actions of the diagnostic circuitry involve inferring instructions in-between waypoints with reference to when c-atoms are and are not required. In this way, the actual execution sequence carried out by CPU 100 is reconstructed by the diagnostic circuitry 196. Note that load/store instructions can be conditional or non-conditional. Non-conditional load/store instructions are treated as E atoms, so an E-atom is taken from the waypoint queue. If the load/store instruction is conditional then an E-atom is still taken from the waypoint queue but in addition a P0 or P1 is taken from the c-atom queue.

Figure 10:
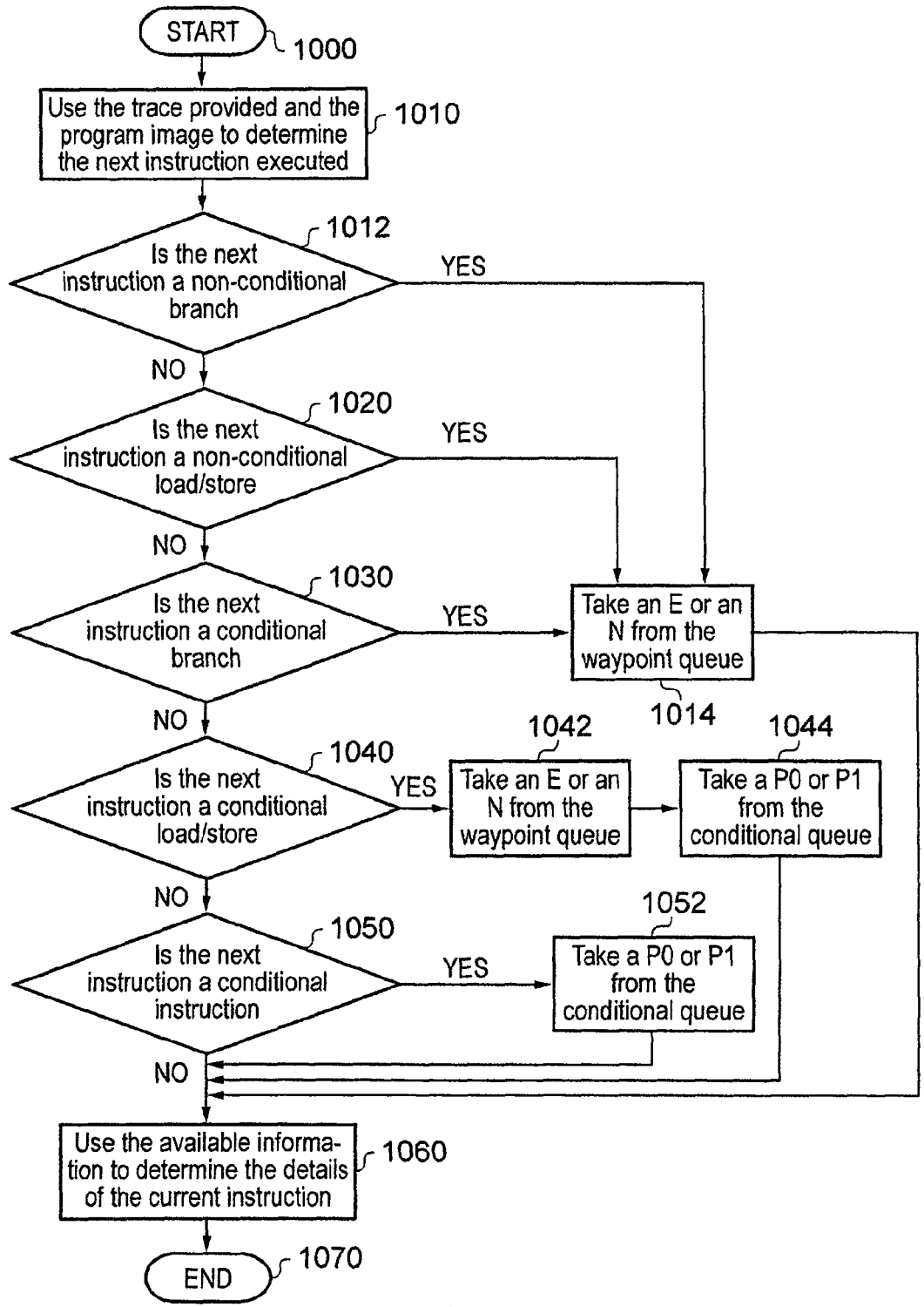
FIG. 10 is a flow chart that schematically illustrates actions taken by the diagnostic circuitry of FIG. 1 to analyse incoming trace data.

FIG. 10 is a flow chart that schematically illustrates actions taken by the diagnostic circuitry 196 to analyse incoming trace data. In particular, the flow chart of FIG. 10 describes how the diagnostic circuitry removes c-atoms and waypoints from the c-atom FIFO 196 and the waypoint FIFO 198 in performing the analysis of the execution stream. The process starts at stage 1000 and proceeds directly to stage 1010 where the incoming trace data is received and the program image 199 is used to determine the next instruction executed. The process then proceeds to stage 1012 where it is determined whether or not the next instruction is a non-conditional branch. If the next instruction is in fact a non-conditional branch, then the process proceeds to stage 1014 where either an "E" or an "N" is taken from the waypoint FIFO 198. Then the process proceeds to stage 1060 where the available information is used to determine the details of the current instruction and subsequently proceeds to the end stage 1070 until the next trace data item is received.

If on the other hand at stage 1012 of FIG. 10 it is determined the next instruction is not a non-conditional branch instruction, then the process proceeds to stage 1020 where it is determined if the next instruction is a non-conditional load/store instruction (unconditional). If the instruction is in fact a non-conditional load/store instruction then the process proceeds, to stage 1014 where an E or an N is taken from the waypoint FIFO 198 and then the process proceeds to stage 1060 and subsequently end stage 1070. If at stage 1020 it is determined that the next instruction is not a non-conditional load/store instruction, then the process proceeds to stage 1030 where it is determined whether or not the instruction is a conditional branch. If the instruction is in fact a conditional branch then the process proceeds to stage 1014 and an E or an N is taken from the waypoint FIFO 198 and then the process proceeds to stage 1060 and 1070 where the process ends. If, on the other hand, at stage 1030 it is determined that the next instruction is not a conditional branch then the process proceeds to stage 1040 where it is determined whether or not the next instruction is a conditional load/store. If the next instruction is in fact a conditional load/store then the process proceeds to stage 1042 where an E or N is taken from the waypoint FIFO 198 and then the process proceeds to stage 1044 where either a P0 or a P1 is taken from the c-atom FIFO 197. Thus for conditional load/store instructions an item is taken from each of the waypoint queue and the c-atom queue. Then the process proceeds to stage 1060 and 1070.

If at stage 1040 the instruction is found not to be a conditional load/store then the process proceeds to stage 1050 where it is determined whether or not the instruction is a conditional instruction. If the instruction is a conditional instruction then a P0 or P1 is taken from the c-atom queue 197 and then the process proceeds to stage 1060 where details of the current instruction are determined and then ends at stage 1070. However, if the next instruction is not a conditional instruction then process proceeds from stage 1050 directly to stage 1060 where the available information is used to determine the details of the current instruction. But in this case, the current instruction is none of a non-conditional branch instruction, a non-conditional load/store instruction, a conditional branch instruction, a conditional load/store instruction or a conditional instruction.

FIGS. 11A, 11B and 11C are examples of relative orderings of output in a trace data stream of a cancel trace indication, a mispredict trace indication, an exception trace indication and a realignment trace indication.

In the case of the example of FIG. 11A, the first waypoint E corresponds to a branch mispredict and a realignment trace item is placed after the mispredict but before the next waypoint or c-atom.

In the case of FIG. 11B the second waypoint i.e. the second "E" corresponds to a branch that mispredicts. A realignment trace item is placed after the mispredict but before the next waypoint or c-atom (in this particular example, before the next waypoint E).

In the example of FIG. 11C an abort occurs between the first and second waypoints "E" and "E" (first and third trace items in the sequence). In this case an exception is thrown and the realignment trace item is placed after the exception but before the next waypoint or c-atom. Note that in this case the c-atom P1 (second trace item in sequence) is generated between the two waypoints E and E between which the abort occurs, but the realignment item should still be placed after the exception.

FIGS. 12 to 14 schematically illustrate how a trace data stream comprising c-atoms can be compressed by removing conditional atoms that can be implied by the conditional results. Removal of subset of c-atoms from the trace data stream in this way can be used to improve efficiency of the tracing process. Although not all conditional instructions result in generation of c-atoms, there is often a one-to-one correspondence between c-atoms and c-results and every c-result must have at least one corresponding c-atom. This means that in many cases the diagnostic circuitry 196 can imply the presence of c-atoms when a subsequent c-result is encountered without the c-atoms actually having to be included in the trace data stream. Thus if the diagnostic circuitry 196 receives a c-result with a c-result key corresponding to a c-atom (i.e. c-atom key) that has not been received by the diagnostic circuitry then the diagnostic circuitry 196 can deduce the existence of that c-atom. If the c-results are out of order, then the diagnostic circuitry 196 can deduce the existence of other c-atoms in order to keep c-atoms in order. C-atoms can be deduced by the diagnostic circuitry 196 later than when they would otherwise appear and hence c-atoms and waypoints may change order. However, this does not matter because, as previously discussed, the c-atoms and waypoints stored in the c-atom FIFO 197 and the waypoint FIFO 198 can in any case be placed in the correct order by the diagnostic circuitry 196 with reference to the program instruction sequence in the program image 199.

FIG. 12A schematically illustrates a table comprising an example of a trace data stream in which a series of c-atoms (i.e. trace data items corresponding to execution of the instructions) are implied based on the output of c-results keys output by the results key translation circuitry 188 of FIG. 1. In this example, a sequence of five P1 c-atoms are generated but not output by the ETM 180. Similarly the c-atoms keys denoted in the table by "RH key" are also generated by the ETM but are not output. This can be viewed as buffering of the c-atoms. When a c-result is output an imply bit represents those buffered c-atoms. However, the corresponding conditional result keys are in fact output by the results key translation circuitry 188. It will be clear from the trace which c-atoms are associated with the c-result although key values are not given explicitly. Although the full c-atom information is not output the c-results packet effectively contains information with regard to c-results. The c-atoms are highly compressed (down to 1 bit). The fourth column of the table of FIG. 12A schematically illustrates which c-atom keys are implied by the diagnostic circuitry 196 based upon the received c-result keys. In this case the correspondence is a straightforward one in which the c-results 0, 1 and 2 are implied directly corresponding to the c-result keys. However, the c-result key 4 is output before the c-result key 3, so when the diagnostic circuitry 196 receives the c-result key 4, it implies that the c-atom key 3 has also been generated although the corresponding result has not yet be output. Indeed, from the "c-result LH key output" column of the FIG. 12A table, it can be seen that the c-result key 3 is generated immediately after the c-result key 4. Thus to imply the c-atom keys 3 and 4 together was in fact correct. Notably, in the example of the table if FIG. 12A, the generated c-atoms comprise only P1 atoms and not P0 atoms. Recall that for P1 c-atoms the trace key is always incremented by one whereas for P0 atoms the trace key does not change. It follows that whilst P1 c-atoms can be implied by the presence of c-results, the same is not true of P0 atoms. In fact P0 c-atoms cannot be deduced by the presence of c-results so all P0 c-atoms need to be output in the trace and cannot be buffered.

There are another two special situations where it is inappropriate to rely upon buffering of output of c-atoms by the ETM 180 and implication of the corresponding c-atoms from the c-results by the diagnostic circuitry 196. The first of these two situations is in the case of a realignment trace item where all c-atoms known before the realignment must be output by the ETM 180 despite the fact that subsequent c-results could in principle be used to imply them. This is to ensure the correct relative ordering of waypoints and c-atoms by the diagnostic circuitry 196 is deduced.

A further situation where it is inappropriate to buffer output of c-atoms and to imply the existence of c-atoms from received c-result keys is where the c-atoms themselves have been allocated a c-atom key by the instruction key translation circuitry 186 that it is not strictly sequential, for example the use of special keys.

There are also certain cases where a c-result output by the ETM 180 and received by the diagnostic circuitry 196 must not be used to imply further c-atoms. The following three situations are examples of such cases, where the diagnostic circuitry cannot differentiate between:

1. The same c-result key being used twice;
2. N c-atoms are buffered where N=number of sequential trace keys.

In fact the c-result output by the ETM 180 is required to contain information that informs the diagnostic circuitry 196 whether or not c-atoms should be implied from the corresponding c-result. In the embodiment of FIG. 1, this information with regard to whether or not c-atoms should be implied for a given c-result is a straightforward yes/no condition and the precise number of c-atoms to imply is not specified explicitly to the diagnostic circuitry 196.

FIG. 12B is a table that schematically illustrates an example of a trace data stream in which some c-atom keys are implied from corresponding c-results and in which four different c-atom trace keys are employed. Because only four c-atom trace keys can be used after all of the keys have been exhausted then there is a wraparound of the keys. In particular, it can seen that the c-atom key sequence progresses as 0, 1, 2, 3 and then returns back to 0 corresponding to the fifth P1 c-atom generated but not output. Furthermore, in the example of FIG. 12B the fifth, sixth and seventh P1 c-atoms that are generated but not output correspond to a mispredict so these three c-atoms are not actually executed and hence the corresponding c-results and c-result key are never output.

C-results contain at least three pieces of information:
1. The key associated with the conditional result either explicitly or relative to the most c-result;
2. A payload that allows the diagnostic circuitry 196 to determine a pass/fail status of the conditional instruction (i.e. to determine whether or not the conditional instruction was actually executed); and
3. Whether or not a corresponding c-atom can be implied based on that c-result and this is a straightforward two bit indicator i.e. imply yes or imply no.

In order to apply the imply-yes or imply-no information, the ETM 180 is configured to keep track of the c-atoms that were generated by the instruction key translation circuitry 186 but whose output to the diagnostic circuitry 196 was buffered. The ETM 180 determines what each c-result is and which, if any, of the c-atoms can be implied by the c-result. If no c-atoms are implied by the c-results then the c-result is marked as imply-no, otherwise it is marked as imply-yes by the ETM 180. This is achieved using two registers.

A "last-c-atom-generated-key" register comprises the key of the most recently generated but not output c-atom. An exception to this is where the most recently generated but not output c-atom had a special key. A separate "last-c-atom-output-key" register records the trace key of the most recent of either: (i) an explicitly output c-atom; or (ii) c-atom implied by the c-result.

When a c-result is generated the corresponding c-result key is tested to see if it is in the range (last c-atom-output-key)< (c-result LH key)<=(last-c-atom-generated-key). When applying this test modulus maths must be used and the handling of modulus maths is well known to those skilled in the art. If the c-result key is in fact in this defined range then an imply-yes is output as part of the c-result by the ETM 180.

FIG. 13 is a table that schematically illustrates a trace data sequence similar to the sequence of FIG. 12B, but in which the values stored in the "last-c-atom-generated-key" register and the "last-c-atom-output-key" register are shown in the second and third columns from right respectively. The right-hand column of the table of FIG. 13 gives an indication of whether the test (i.e. the imply-yes) defined by the above equation has been met or not. Note that due to the use of only four trace keys and due to the wraparound of the keys, a key of "3" can be considered to be less than a key of "0" because of the repeating key sequence of 0, 1, 2, 3, 0, 1, 2, 3, ... where for example the first "3" is before the second "0". The implied c-atom key marked 3* in the "implied c-atom RH keys" column of the FIG. 13 table, is implied shortly after the output of realignment item and in this case the c-atoms with keys of 0, 1, 2 are not implied because they have been explicitly output due to the preceding mispredict, where the three P1 c-atoms corresponding to c-atom keys 0, 1 and 2 were not executed.

For the c-result key of "2" that is output in the second from last row of FIG. 13, the c-atom with key 2 corresponding to the c-results key 2 is not implied because it has already been implied by an earlier c-result and hence the test whose outcome is specified in the right-hand column of FIG. 13 is not met. For the c-result key output in the last row of the table of FIG. 13 a corresponding c-atoms with a key 1 is not implied because it has already been explicitly output the column entitled "explicitly output c-atoms keys". FIG. 13 shows that c-atom keys 0, 1, 2 are explicitly output as a result of the mis-prediction and c-atom keys 0 and 1 are explicitly output due to the occurrence in the trace data stream of the P0 c-atom (third form last generated c-atom in left-most column of table) for which the implication of c-atoms from corresponding c-results is not permitted.

C-atoms are explicitly output for the following reasons:
Before a realignment trace item is output (e.g. due to a mis-predict or exception)
If a P0 c-atom type is used (where the trace key does not increment by definition)
if special key is used which does not follow the normal sequential ordering of the keys and is used for very late c-results.

When c-atoms are explicitly output, the "last-c-atom-output-key" register can be used to determine which c-atoms should be output. For instance, in the case of realignment trace item, the first c-atom to be explicitly output is a value of the "last-c-atom-output-key plus one" register and the last to be output is the value of the last-c-atom-generated-key. C-atoms with keys in between should also be output.

Figure 14A:
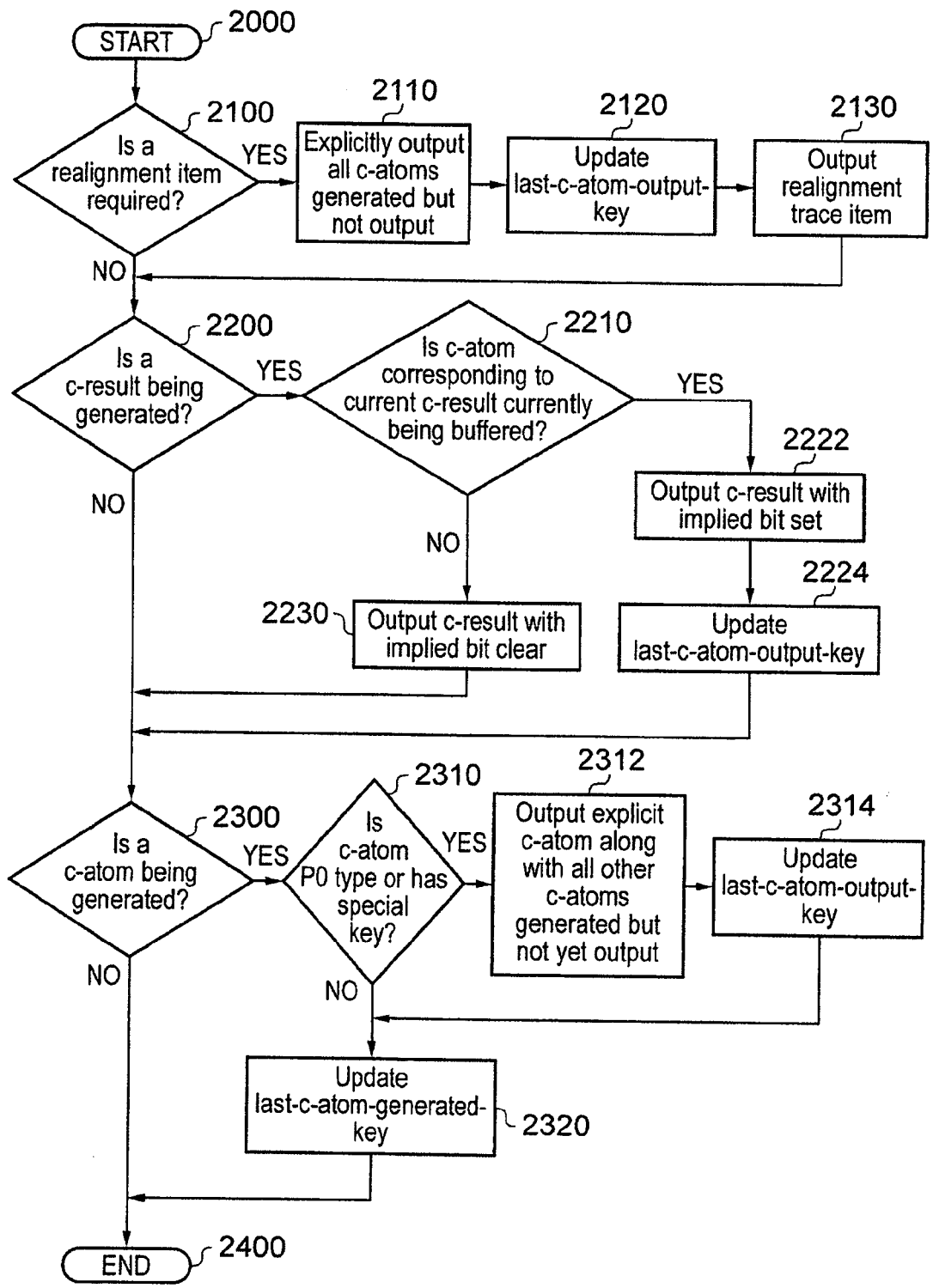
FIG. 14a is a flow chart that schematically illustrates actions of the ETM of FIG. 1 in outputting the trace stream and implementing a trace compression scheme where certain c-atoms are generated but buffered.

FIG. 14a is a flow chart that schematically illustrates actions of the ETM 180 in outputting the trace stream and implementing a trace compression scheme where certain c-atoms are generated but not output (i.e. buffered) relying upon the ability of the diagnostic circuitry 196 to imply c-atoms from corresponding c-results. In other words, the flow chart of FIG. 14a schematically illustrates how the ETM 180 acts to compress the output trace data stream via removal of a subset of c-atoms from the trace data stream.

The process starts at stage 2000 and then progresses to stage 2001, where it is determined whether or not a realignment trace data item is required. If a realignment trace item is required then the process proceeds to stage 2110 where the ETM 180 explicitly outputs all c-atoms generated but not output. The process then proceeds to stage 2120 where the last-c-atom-output-key is updated and then to stage 2130 where the realignment trace data item is actually output into the trace data stream and the process then returns to the vertical flow and progresses to stage 2200. If on the other hand at stage 2100 it is determined that a realignment trace data item is not required, then the process proceeds directly to stage 2200 without proceeding along the horizontal branch compressing stages 2110, 2120 and 2130.

At stage 2200 it is determined whether or not a c-result is currently being generated. If no c-result is being generated then the process proceeds directly to stage 2300. On the other hand, if it is determined at stage 2200 that a c-result is in fact currently being generated then the process proceeds to stage 2210 where it is determined if the c-atom corresponding to the current c-result is currently being buffered. One example of such a test is to determine if the key corresponding to the c-result being generated satisfies the test: (last c-atom-output-key)<(c-result LH key)<=(last-c-atom-generated-key). In other words, if a key corresponding to the conditional instruction trace data item currently being generated is greater than a key corresponding to said most recently output conditional instruction trace data item and is less than or equal to a key corresponding to said most recently generated conditional instruction trace data item. Since values of the keys wrap around when a maximum value is reached for the test to work properly, the key comparison observes modulo arithmetic.

If it is determined at stage 2210 that the c-atom corresponding to the c-result is not currently being buffered then the process proceeds to stage 2230 where the c-result just generated is output with the implied bit being cleared indicating that no c-atoms should be implied by the diagnostic circuitry 196 based on this particular c-result. If on the other hand it is found at stage 2210 that the c-atom corresponding to the current c-result is currently being buffered, then the process proceeds to stage 2222 where the c-result is output with the implied bit set indicating that the diagnostic circuitry 196 should imply a corresponding c-atom from the c-result. After outputting the c-result with the implied bit set the process proceeds to stage 2224 where the value of the last-c-atom-output-key is updated in the appropriate register and then the process proceeds to stage 2300.

At stage 2300 it is determined whether or not a c-atom is being generated. If a c-atom is not being generated then the process ends at stage 2400. If on the other hand, a c-atom is being generated then the process proceeds to stage 2310 where it is determined if the c-atom is of type P0 rather than P1 or if it corresponds to a special key. If the c-atom is not one of these exception types then the process proceeds to stage 2320 and the last-c-atom-generated key is updated and then the process ends at stage 2400. However, if the c-atom does correspond to a special key or is of type P0, then process proceeds to stage 2312 where the c-atom being generated is caused to be output explicitly along with all other c-atoms that have been generated but not yet output. Then the process proceeds to stage 2314 where the last-c-atom-output key is updated. The process then proceeds to stage 2320 where the last-c-atom-generated key is updated and then ends at stage 2400.

Figure 14B:
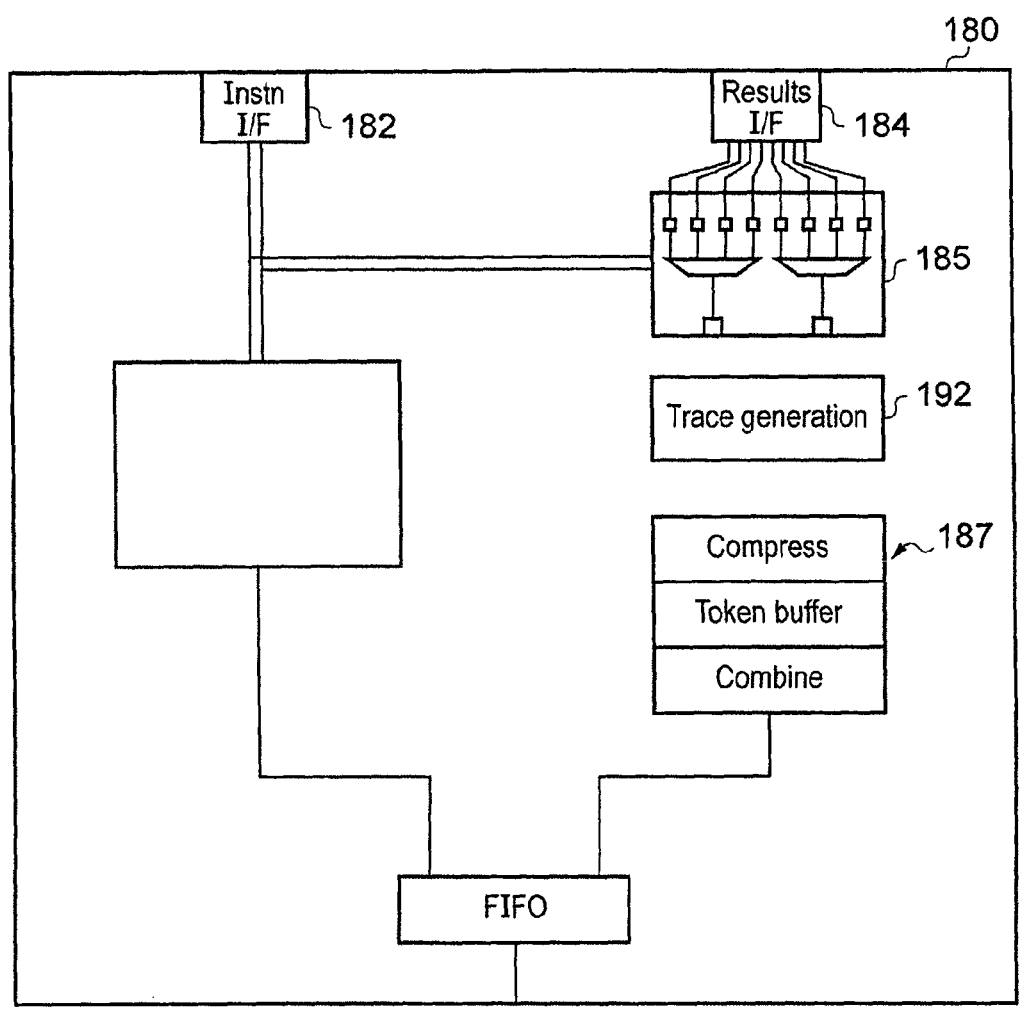
FIG. 14b schematically illustrates a trace unit according to an embodiment of the present invention.

FIG. 14b illustrates a trace unit 180 according to an embodiment of the present invention. It is similar to the trace unit shown in FIG. 1 and the same reference numerals are used where appropriate. It has an additional condition code or CPSR value storage buffer 185 and a token buffer 187 with associated compress and combine circuitry.

The data sent from the results interface 184 comprises the CPSR values from each updated CPSR register along with additional data. As there are in this embodiment 8 CPSR registers on CPU 100, there are 8 possible sets us that can be received in a single cycle. Rather than inputting these all to trace generation circuitry 192 in a single cycle which would require the trace generation circuitry 192 to process these which would be costly, these are buffered in CPSR value storage buffer 185. Thus, they can be steadily output over time. In this embodiment in each clock cycle two sets of CPSR values are output. These may be randomly selected or a particular set of CPSR values may need to be output if an updated set of CPSR values for that CPSR is to be received at the input. This is to ensure the correct ordering of conditional atom trace data items and conditional results trace data items in the trace stream.

In this regard the receipt at the instruction interface 182 of the conditional instruction observed indicators from decode of the processing apparatus with associated "tags" identifying the particular CPSR register to be updated by an instruction provides an advance indication of which CPSR registers are to be updated. In the case that CPSR values for which valid values are currently stored in buffer 185 are to be received these valid values are selected for output so that the storage location is free to store the new data that will subsequently be received.

When they are output they are processed by the trace generation circuitry 192 which generates trace data items. As in this embodiment two conditional instruction observed indicators can be received in any one cycle, at most two sets of CPSR values may need to be evicted and thus, the output of two sets of CPSR values per cycle is sufficient to maintain the correct values stored in the buffer 185 and means that the trace generation circuitry 195 needs only to have sufficient processing power to process two sets of values per cycle.

In this embodiment there is additional circuitry 187 for receiving trace data items generated by trace generation circuitry 192, this circuitry compresses common trace data items to form tokens which are compressed representations of these trace data items and these are stored in the token buffer. They can then later be combined together and several can be output as a single trace item. Typically the smallest trace packet is 8 bits long and packets are often multiples of 8 bits, while tokens are typically much smaller, so they several can be combined into one packet for output.

Examples of common conditional results trace data items that can be represented by tokens are:

Those containing one of the more common CPSR values. Some CPSR values are significantly more common than others. For instance the following value is very common N-clear, Z-clear, C-set, V-clear.

Those where the key contained in the conditional results trace data item is one more than the previous such key.

It is convenient if these are stored in the buffer for as long as possible to provide more opportunities for combining different tokens into single packets. However, the buffer only has a limited size and thus, they must be output either when the buffer becomes full or when an item is received for which there is no token available (perhaps it is an uncommon item that it is not efficient to compress). In the latter case in order to maintain the order, the buffer is cleared by outputting all the values and then the received non-compressed item is output.

Typically these tokens are held in the buffer for as long as possible as then the possibilities for combining different tokens within a single trace item are greater.

Figure 22:
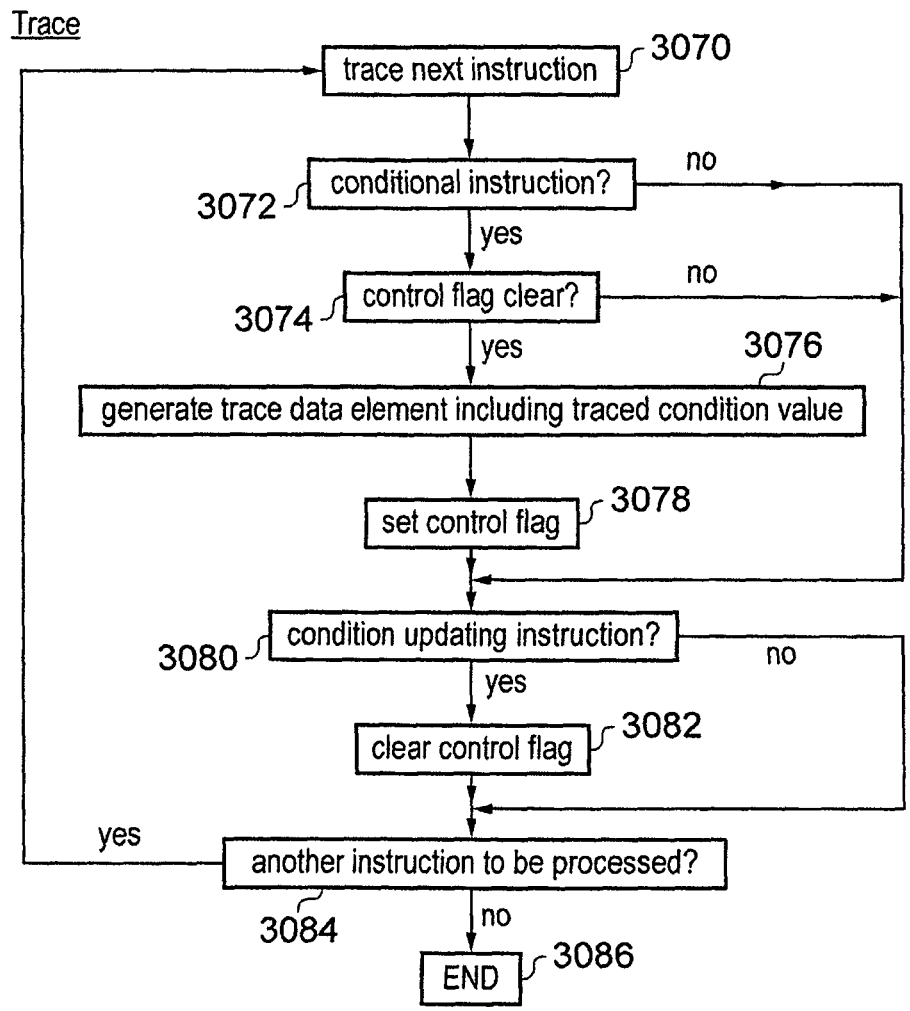
FIG. 22 illustrates a method of tracing the values of the condition flags upon execution of a conditional instruction.
Figure 25:
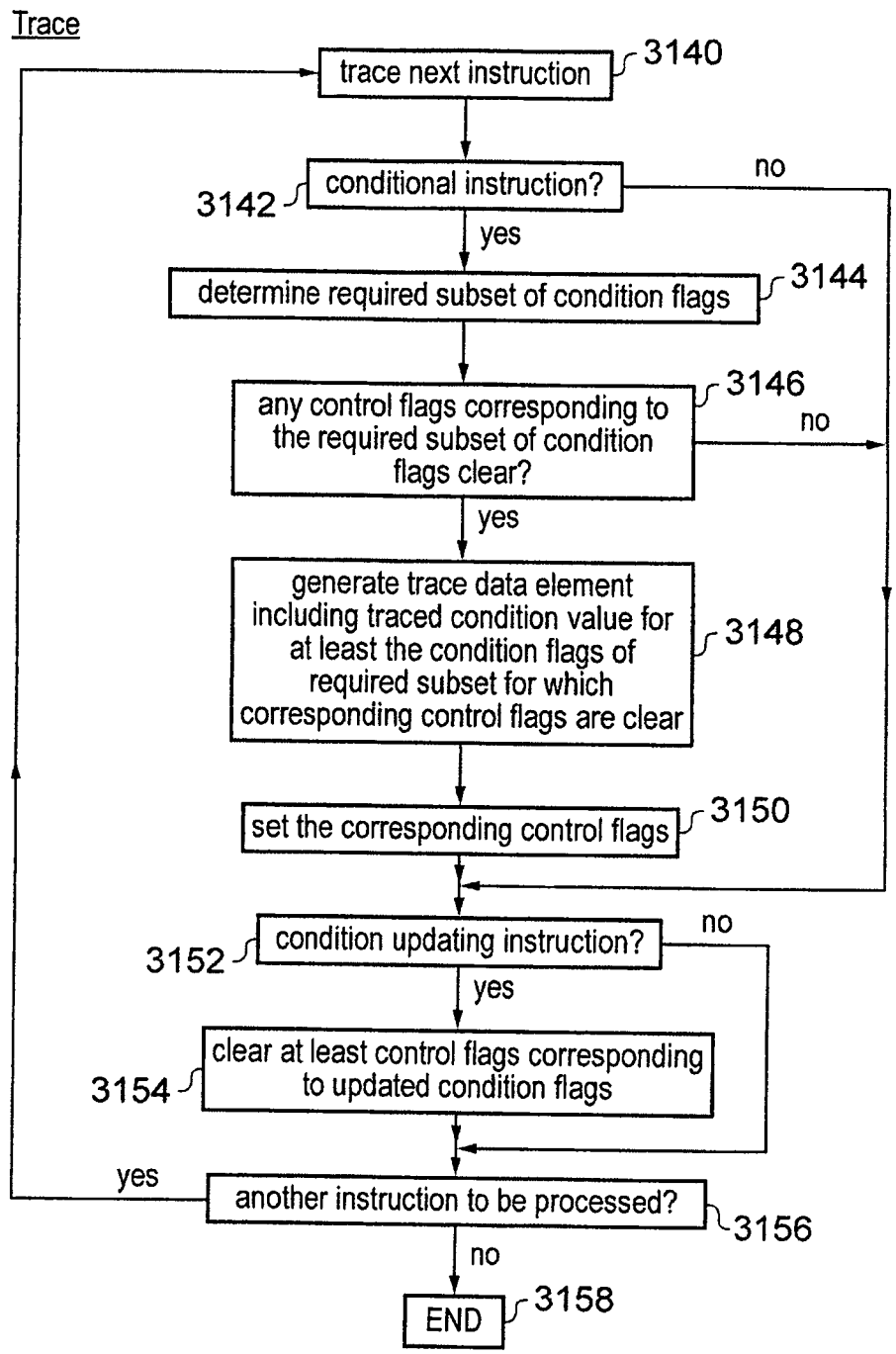
FIG. 25 illustrates a method of tracing the values of at least a required subset of condition flags upon execution of a conditional instruction.

The description of FIGS. 15 to 27 are part of co-pending GB patent application 1100505.5 entitled "Processing Apparatus, Trace Unit and Diagnostic Apparatus" with inventors John Michael Horley, Simon John Craske, Michael John Gibbs and Paul Anthony Gilkerson from which priority is claimed. FIGS. 15-27 below are thus provided for illustrative purposes and for further explaining the buffering of conditional result trace data items (c-atoms) and the fact that not all conditional instructions have corresponding c-atoms. They also help to illustrate how CPSR marked bits are used as described in FIGS. 3A to 3D. FIGS. 22 and 25 are particularly relevant in this regard.

Figure 15:
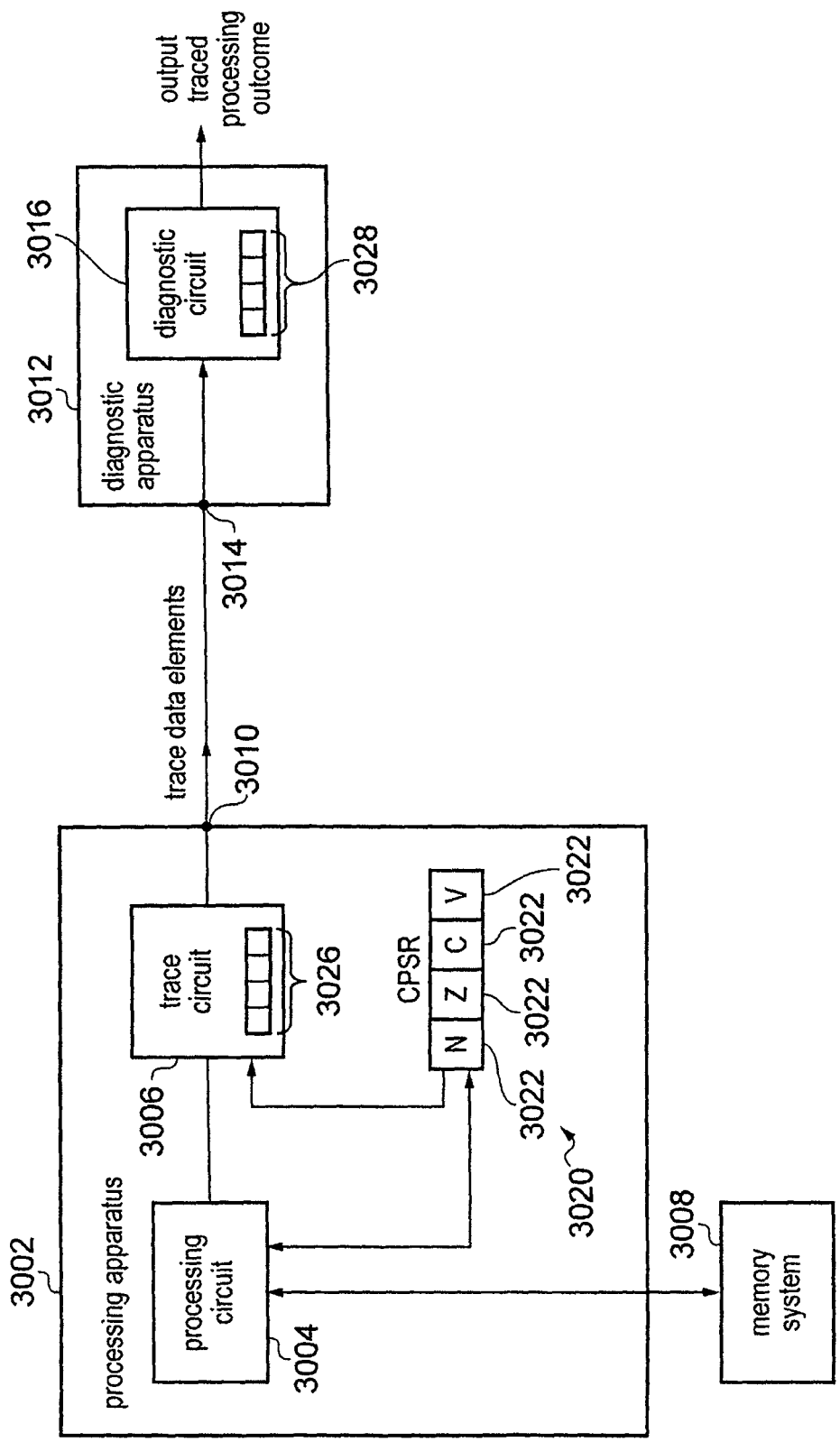
FIG. 15 schematically illustrates a processing apparatus, trace circuit and diagnostic apparatus.

FIG. 15 illustrates a processing apparatus 3002 comprising a processing circuit 4 for performing processing operations in response to program instructions. The processing apparatus 3002 is provided with a memory system 3008 which comprises one or more cache units or memory units for storing program instructions to be executed by the processing circuit 3004 and/or data to be processed by the processing circuit 3004.

The processing apparatus 3002 includes a trace circuit 3006 for monitoring the processing operations performed by the processing circuit 3004. The trace circuit 3006 generates trace data elements indicating characteristics of the processing operations performed by the processing circuit 3004. The trace circuit 3006 outputs the generated trace data elements over an output port 3010. The trace circuit 3006 need not be implemented on the same integrated circuit as processing circuit 3004 and in some embodiments may be provided as a separate trace unit.

A diagnostic apparatus 3012 is provided for analysing the trace data elements generated by the trace circuit 3006. The diagnostic apparatus 3012 receives the trace data elements over an input port 3014. The diagnostic apparatus 3012 also receives an indication of which program instructions were executed by the processing circuit 3004. This indication may be provided by the trace circuit 3006 indicating in the trace stream which instructions were executed. Alternatively, the diagnostic apparatus 3012 may be provided with an address indicating the location within the memory system 3008 of the first program instruction that was executed by the processing circuit 3004. The diagnostic apparatus 3012 may also be provided with a memory (not illustrated in FIG. 15) for storing a corresponding copy of the program that was executed by the processing circuit 4. The diagnostic apparatus 3012 analyses step-by-step the instructions that were executed by the processing circuit 3004, and determines processing outcomes of the instructions based on the information included in the stream of trace data elements.

The trace data elements need not be output directly from the trace circuit 3006 to the diagnostic apparatus 3012 but may be, for example, stored in a memory or other storage device and then accessed from the storage device by the diagnostic apparatus 3012 when desired. The diagnostic apparatus 3012 may be, for example, a general purpose computer programmed to execute a trace analysis method.

The processing apparatus 3002 has a storage location, for example a condition status register (CPSR) 3020, for storing one or more condition flags 3022 indicating respective conditions of the processing apparatus 3002. In the processors designed by ARM Limited of Cambridge, UK, the condition flags 3022 may include NZCV (Negative, Zero, Carry, oVerflow) flags for indicating whether a processing result is negative, zero, required a carry, or caused an overflow. FIG. 17 illustrates various condition states which can be indicated by different combinations of the condition flags 3022 in the condition status register 3020.

It will be appreciated that the storage location for storing the condition flags 3022 need not be a condition status register 3020 but may also be a storage location within the memory system 3008, or any other kind of storage location.

The processing circuit 3004 may be responsive to at least one condition updating instruction to update one or more of the condition flags 3022 in the condition status register 3020. For example, a compare instruction may compare two data values and update the flags in dependence on the comparison, for example to indicate whether the values were equal or whether one value was less than or greater than the other value. Any instruction which causes the condition flags 3022 to be updated may be considered to be a condition updating instruction. For example, in the ARM instruction set architecture, the TST, TEQ, CMP and CMN instructions are examples of condition updating instructions.

The processing circuit 4 may also be responsive to at least one conditional instruction which is associated with a given condition. When a conditional instruction is executed, then the values of the condition flags 3022 are compared with the given condition. If the condition flags 3022 satisfy the condition, then an associated processing operation is performed. If the condition is not satisfied, then the associated processing operation is not performed (alternatively, for some kinds of conditional instruction a different processing operation to the associated processing operation may be performed if the condition is not satisfied).

For example, a conditional add instruction ADDEQ is associated with the EQ condition. FIG. 16 indicates that the EQ condition is satisfied if the Z flag is set. When the conditional add instruction ADDEQ is executed, then if the Z flag is set then the associated add operation will be performed, while if the Z flag is not set then the add operation will not be performed.

The processing outcome of the conditional instruction cannot be determined from the instruction stream alone, since the instruction stream contains no information for determining whether the condition was satisfied. Therefore, the trace circuit 3006 is responsive to at least one selected instruction to generate a trace data element including a traced condition value indicative of the values of the condition flags 3022. The diagnostic apparatus 3012 can use the traced condition value included in the trace data element to determine whether the condition was satisfied, and therefore can determine the processing outcome of the corresponding conditional instruction.

The trace circuit 3006 maintains one or more control flags 3026 for monitoring whether or not the values of the condition flags 3022 have been traced. The trace circuit 3006 may select whether or not to trace the condition flag values on execution of a given instruction based on the current values of the one or more control flags 3026. In one embodiment, the trace circuit 6 includes a single control flag 3026 (see the embodiment of FIGS. 22-24 as described below), while in another embodiment the trace circuit 3006 includes multiple control flags 3026 each corresponding to one of the condition flags 3022 (see the embodiment described below with respect to FIGS. 25-27).

The diagnostic circuit 3016 maintains a corresponding set of control flags 3028, which are used in a corresponding way to the control flags 3026 of the trace circuit 3006 to determine whether or not a trace data element including a traced condition value is expected to be provided in the trace stream for a given program instruction.

The traced condition value within the trace data elements may be indicated in different ways. In one example, the trace circuit 3006 may include the actual values of at least a subset of the condition flags 3022 in the trace data element. Where a conditional instruction is dependent on only a subset of the condition flags 3022, then the trace circuit 3006 may include just the relevant subset of condition flag values, or may include all of the condition flags 3022.

Alternatively, the trace circuit 3006 may include in the trace data element an identifying code indicating a particular combination of values of the condition flags 3022. This may provide an efficient encoding if some combinations of condition values are more common than others. For example, FIG. 17 shows an example in which a 2-bit identifier is used for three of the condition states (for example the state in which the C flag is set, the state in which the N flag is set, and the state in which the Z and C flags are set). A 4-bit identifier is then used for three more of the different condition states. If one of the other combinations of condition flag values is required then a separate indication of the current condition flag values may be provided in the trace data element, using a different encoding to the scheme shown in FIG. 17.

It will be appreciated that the encoding of the identifiers, and the selection of which condition states are represented by a particular identifier, is only an example. Nevertheless, this example demonstrates that the total amount of trace data can be reduced by allocating the identifiers having the fewest bits to the condition states which arise most frequently. For example, if the processing apparatus 3002 is in one of the three condition states having a 2-bit identifier for 70% of the time, in one of the three states having a 4-bit identifier for 29% of the time, and in one of the other states for 1% of the time (and those other states are represented by an 8-bit identifier, say), then the average number of bits used to identify the current condition state would be 2*0.7+4*0.29+8*0.01=2.64 (the asterisk * indicates a multiply sign). Hence, the average number of bits included in the trace stream to indicate the current condition state would be less than the 4 bits that would be used if the trace data element simply included the current values of the condition flags.

The trace circuit 6 may trace the values of the condition flags 3022 at different instructions of the program being executed by the processing circuit 4. The trace circuit 3006 may select one or more selected instructions for triggering generation of a trace data element including condition flag indicating values. The selected instruction may be a conditional instruction, but may also be another instruction.

Figure 18:
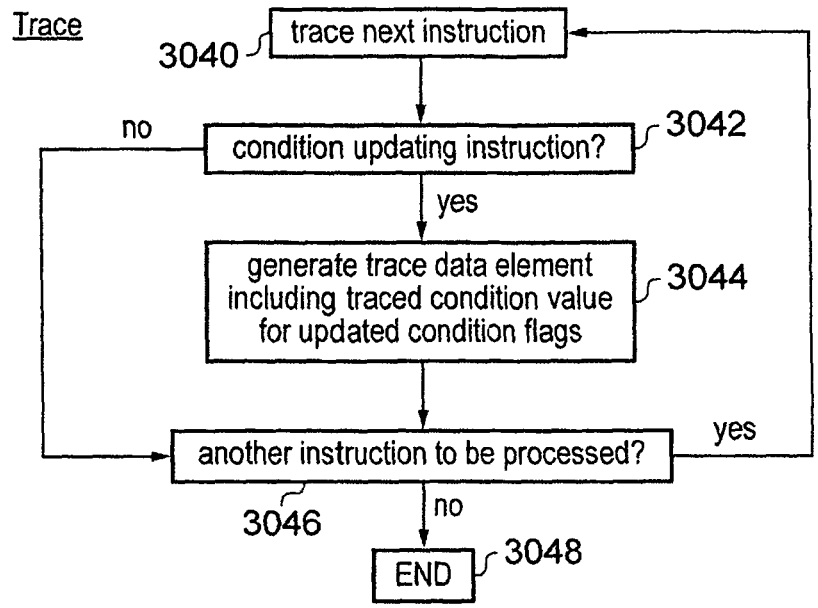
FIG. 18 illustrates a method of tracing the values of condition flags upon execution of a condition updating instruction.
Figure 19:
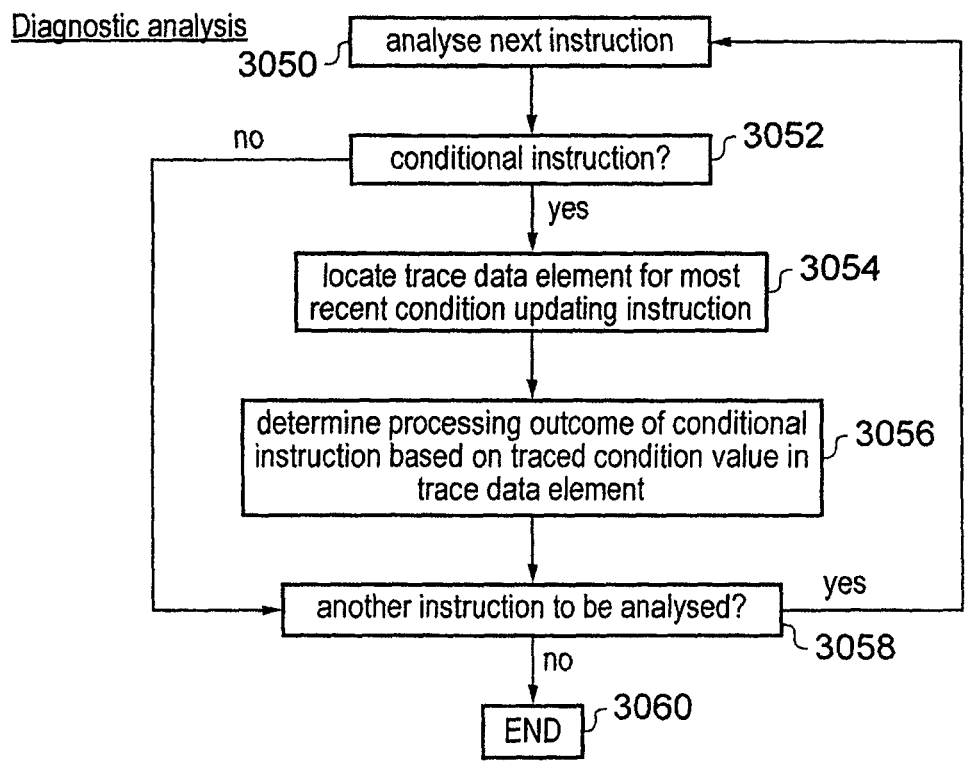
FIG. 19 illustrates a corresponding method of analysing trace data generated in the method of FIG. 18.

For example, FIGS. 18-20 show an example in which a trace data element including a traced conditional value is generated upon execution of a condition updating instruction. FIG. 18 shows a method of generating trace data in response to operations of the processing circuit 3004. At step 3040, the processing circuit 3004 processes a next instruction of the program being executed, and the trace circuit 3006 monitors the processing of that instruction by the processing circuit 3004. At step 3042, the trace circuit 3006 determines whether or not the instruction being executed by the processing circuit 3004 is a condition updating instruction. If the instruction is a condition updating instruction, then at step 3044 the trace circuit 3006 generates and outputs a trace data element including a traced condition value indicating the updated value of the condition flags 3022 resulting from execution of the condition updating instruction. On the other hand, if the instruction was not a condition updating instruction then step 3044 is omitted. At step 3046, it is determined whether or not there is another instruction to be processed by the processing circuit 3004. If there is another instruction, then the method returns to step 3040, while otherwise if there are no instructions left then the method ends at step 3048.

FIG. 19 illustrates a corresponding diagnostic method for analysing the trace stream produced by the trace circuit 3006 using the method of FIG. 19. The diagnostic apparatus 3012 receives an indication of which instructions were executed by the processing circuit 3004. At step 3050, the diagnostic circuit 3016 analyses a next instruction indicated as being executed by the processing circuit 3004. At step 3052, the diagnostic circuit 3016 determines whether or not the next instruction is a conditional instruction. If the instruction is a conditional instruction, then at step 3054 the diagnostic circuit 3016 locates in the trace data stream a trace data element associated with the most recent condition updating instruction that was indicated in the indication of program instructions. At step 3056 the diagnostic circuit 3016 determines the processing outcome of the conditional instruction based on the traced condition value included in the located trace data element. For example, the diagnostic circuit 3016 can use the traced condition value to determine whether or not the condition associated with the conditional instruction was satisfied and accordingly whether or not the associated operation was performed or not. If at step 3052 the next instruction was determined not to be a conditional instruction then steps 3054 and 3056 are omitted. At step 3058, it is determined whether or not there is another instruction to be analysed. If there is another instruction, then the method returns to step 3050, while if there are no more instructions then the method ends at step 3060.

FIG. 20 illustrates an example of the generation of a trace stream according to the method of FIG. 18 and the analysis of the trace stream according to the method of FIG. 19. FIG. 20 shows a set of program instructions that were executed by the processing circuit 3004. When a branch instruction is executed then a trace data element is generated indicating whether or not the branch was taken. When a condition updating instruction (e.g. CMP) is encountered, then according to step 3044 of FIG. 18 a trace data element is generated including a traced condition value CPSR. When analysing the trace stream, then the diagnostic apparatus can use the traced condition value to determine the processing outcomes of any following conditional instructions (for example, the instructions MOVNE, MOVEQ, and ADDHI shown in FIG. 20).

Some instructions may be both a condition updating instruction and a conditional instruction. For example, the program instruction at memory location 2100 in FIG. 20 is a conditional compare instruction CCMPNE for controlling the processing circuit 3004 to determine whether or not the current values of the condition flags 3022 satisfy the not equal (NE) condition (see FIG. 16). If the not equal condition is satisfied, then the processing circuit 3004 performs a comparison operation and updates the condition flags 3022 based on the comparison result. As the CCMPNE instruction is a conditional instruction, then the diagnostic circuit 3016 determines the processing outcome of the CCMPNE instruction based on the traced condition value included in the trace stream at the most recent update of the condition flags (i.e. the CPSR value included for the compare instruction CMP at memory location 2000). If the NE condition is satisfied upon execution of the CCMPNE instruction, then the CCMPNE instruction is also a condition updating instruction and so the trace circuit 3006 generates a trace data element for instruction CCMPNE including a traced condition value indicating the updated values of the condition flags 3022. This trace data element can be used for determining the outcomes of any subsequent conditional instructions.

Alternatively, in some examples the CCMPNE instruction may be considered as a condition updating instruction regardless of whether the NE condition was satisfied, and thus a trace data element indicating the values of the condition flags could always be generated for the CCMPNE instruction. This could be useful if the NE condition has not yet been calculated at the time of tracing.

The technique shown in FIGS. 18-20 can be useful when a single condition updating instruction is followed by a chain of conditional instructions all dependent on the same set of condition values, because in this case a small amount of trace data is sufficient to determine the outcomes of several following instructions.

However, in some situations there may be many condition updating instructions which occur in succession without any intervening conditional instructions which use the updated values of condition flags. For example, in FIG. 21 a sequence of program instructions includes a number of compare CMP and bit test TST instructions which result in a condition flag update, but the first four of these instructions update the flags without those updated values ever being used by a conditional instruction. In such a situation it can be more efficient to generate the trace data element including the traced condition value upon execution of a conditional instruction (for example, as described below with reference to FIGS. 22-24 and 25-27). In the example shown in FIG. 21 then the trace data element could be generated when the conditional instruction MOVNE is executed, rather than on each condition update.

It will be appreciated that a mixture of these techniques may be possible and so some trace units may generate traced condition values both on execution of a condition updating instruction and on execution of a conditional instruction.

FIG. 22 shows a trace method in which the condition flags 3022 are traced on execution of a conditional instruction. In this embodiment, the trace circuit 3006 maintains a control flag 3026 for determining whether or not to trace the values of the condition flags 3022. The control flag 3026 has a "clear" state and a "set" state (for example, the "clear" state may be the control flag 3026 having a 0 value and the "set" state may be the control flag 3026 having a 1 value, or vice versa).

At step 70 of FIG. 22, the trace circuit 3006 monitors the processing circuit 3004 executing a next instruction. At step 3072, the trace circuit 3006 determines whether or not that instruction is a conditional instruction. If the instruction is a conditional instruction, then at step 3074 the trace circuit 3006 determines whether or not the control flag is clear. If the control flag is clear, then at step 3076 the trace circuit 3006 generates and outputs a trace data element including a traced condition value which indicates the current state of the condition status register 3020. Then, at step 3078 the control flag is set. On the other hand, if at step 3074 the control flag was set, then steps 3076 and 3078 are omitted. If at step 3072 the instruction was determined not to be a conditional instruction, then steps 3074 to 3078 are omitted.

Then, at step 3080, it is determined whether or not the next instruction is a condition updating instruction. Note that some instructions may be both a conditional instruction and a condition updating instruction. If the instruction is a condition updating instruction, then at step 3082 the control flag is cleared. Otherwise, step 3082 is omitted. Then at step 3084, it is determined whether or not there is another instruction to be processed by the processing circuit 3004. If there is another instruction, then the method returns to step 3070. If there are no more instructions, then the method ends at step 3086.

Some pseudocode for implementing the method of FIG. 22 is indicated below (the term "marker" indicates the control flag 3026):

On an instruction:
  If instruction is conditional:
    If marker is clear:
      Trace the CPSR
      Set marker
  If instruction updates the CPSR:
    Clear marker The method of FIG. 22 helps to reduce the amount of trace data since the trace circuit 3006 generates a trace data element including a traced condition value on the first conditional instruction which occurs following a condition updating instruction. For subsequent conditional instructions then there is no need to trace the condition value because a previous conditional instruction already has an associated trace data element which contains information indicating the state of the condition flags 3022.

Figure 23:
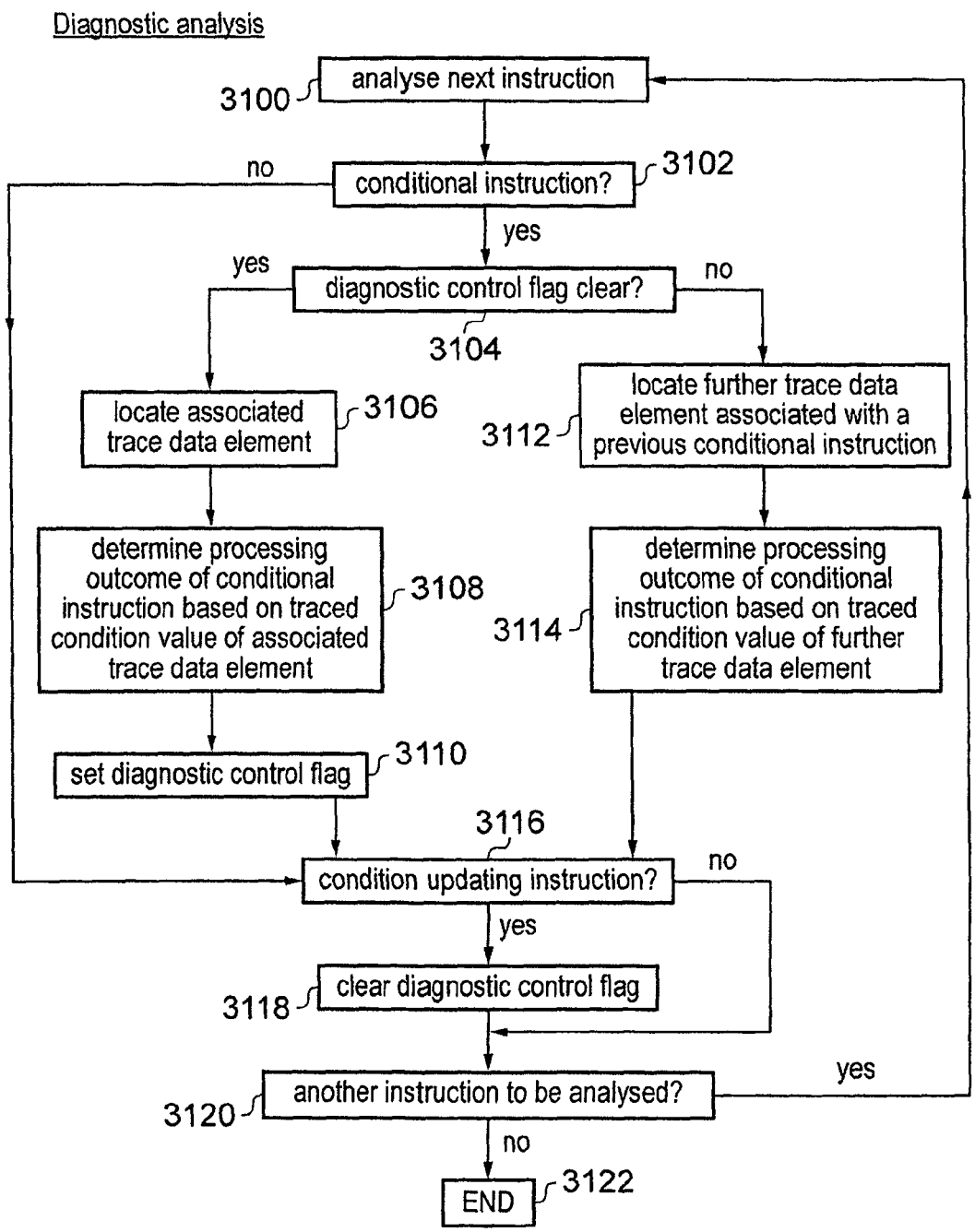
FIG. 23 illustrates a corresponding method of analysing trace data produced in the method of FIG. 22.

FIG. 23 shows a corresponding diagnostic method for analysing the trace stream produced in the method of FIG. 22. The diagnostic apparatus 3012 has a control flag 3028 having "clear" and "set" states corresponding to the states of the control flag 3026 of the trace circuit 3006. At step 3100, the diagnostic circuit 3016 analyses the next instruction included in the indication of the program instructions processed by the processing circuit 3004. At step 3102, it is determined whether or not there is an indication of a conditional instruction. If the instruction is a conditional instruction, then at step 3104 it is determined whether or not the diagnostic control flag 3028 is clear. If the diagnostic control flag is clear, then at step 3106 the diagnostic circuit 3016 locates an associated trace data element for that conditional instruction and at step 3108 determines a processing outcome of the conditional instruction based on the traced condition value included in the associated trace data element. At step 3110, the diagnostic control flag is placed in the "set" state.

On the other hand, if at step 3104 the diagnostic control flag was not clear, then the method proceeds to step 3112 at which a further trace data element is located by the diagnostic circuit 3016. The further trace data element is a data element associated with a previously analysed conditional instruction. At step 3114, the diagnostic circuit 3016 determines the processing outcome of the currently analysed conditional instruction based on the traced condition value included in the further trace data element generated for the previously analysed conditional instruction. If at step 3102, the instruction was determined not to be a conditional instruction, then steps 3104 to 3114 are omitted.

Then, at step 3116 it is determined whether or not the instruction being analysed is a condition updating instruction. The instruction may be both a conditional instruction and a condition updating instruction. If the instruction is a condition updating instruction then at step 3118 the diagnostic control flag 3028 is cleared, while if the instruction is not a condition updating instruction then step 3118 is omitted. At step 3120, it is determined whether or not there is another instruction to be analysed. If there is another instruction, then the method returns to step 3100, while otherwise the method ends at step 3122.

Thus, the diagnostic circuit uses a diagnostic control flag 3028 corresponding to the control flag 3026 of the trace circuit 3006 to determine whether or not an associated trace data element is expected to be included in the trace stream for a given conditional instruction. If there is such an associated trace data element then the processing outcome of the conditional instruction can be determined based on the traced condition value included in the associated trace data element. If there is no associated trace data element, then there will be a trace data element associated with a previous conditional instruction that will contain a traced condition value enabling the processing outcome of the current conditional instruction to be determined. When a condition updating instruction is encountered, then the diagnostic control flag 3028 is cleared to indicate that the next conditional instruction will be expected to have an associated trace data element.

FIG. 24 illustrates an example of the application of the method of FIGS. 22 and 9 to the stream of program instructions shown in FIG. 20. Again, the branch taken result of the branch instruction at memory location 1600 is traced. In response to execution of the condition updating instruction CMP stored at memory location 2000, then the trace circuit 3006, according to step 3082 of FIG. 22, clears its control flag 26. In a similar way, when the diagnostic circuit 3016 analyses the instructions then it will respond to an indication of the condition updating instruction CMP by clearing its diagnostic control flag 3028, according to step 3118 of FIG. 23.

When the trace circuit 3006 encounters the conditional instruction MOVNE stored at memory location 2004, then the trace circuit 3006 determines that the control flag 3026 is currently in the cleared state, and so at step 3076 of FIG. 22 a trace data element is generated including a traced condition value CPSR. The control flag is then set, according to step 3078 of FIG. 22. In a corresponding way, when analysing the instructions, the diagnostic circuit 3016 will detect an indication of the conditional instruction MOVNE at memory location 2004 and will then respond to the diagnostic control flag 3028 being clear by locating the associated trace data element in the trace stream and determining the processing outcome of the MOVNE instruction based on the traced condition value included in the trace data element. The diagnostic circuit 3016 then sets the diagnostic control flag 3028 at step 3110 of FIG. 23.

Then, for subsequent conditional instructions at memory locations 2008 and 200C, the trace circuit 3006 detects that the control flag 3026 is in the set state, and so does not generate a corresponding trace data element. In a corresponding way, the diagnostic circuit 16 detects that the diagnostic control flag 3028 is in the set state, and so following steps 3112 and 3114 of FIG. 23 locates the trace data element associated with the previous conditional instruction stored at memory location 2004. The diagnostic circuit 3016 determines the processing outcome of the instructions at memory locations 2008 and 200C based on the previous trace data element for the instruction at memory location 2004.

In this way, a trace stream can be generated in which the first conditional instruction to be executed following an update of the condition flags 3022 triggers generation of a trace data element including a traced condition value.

Figure 26:
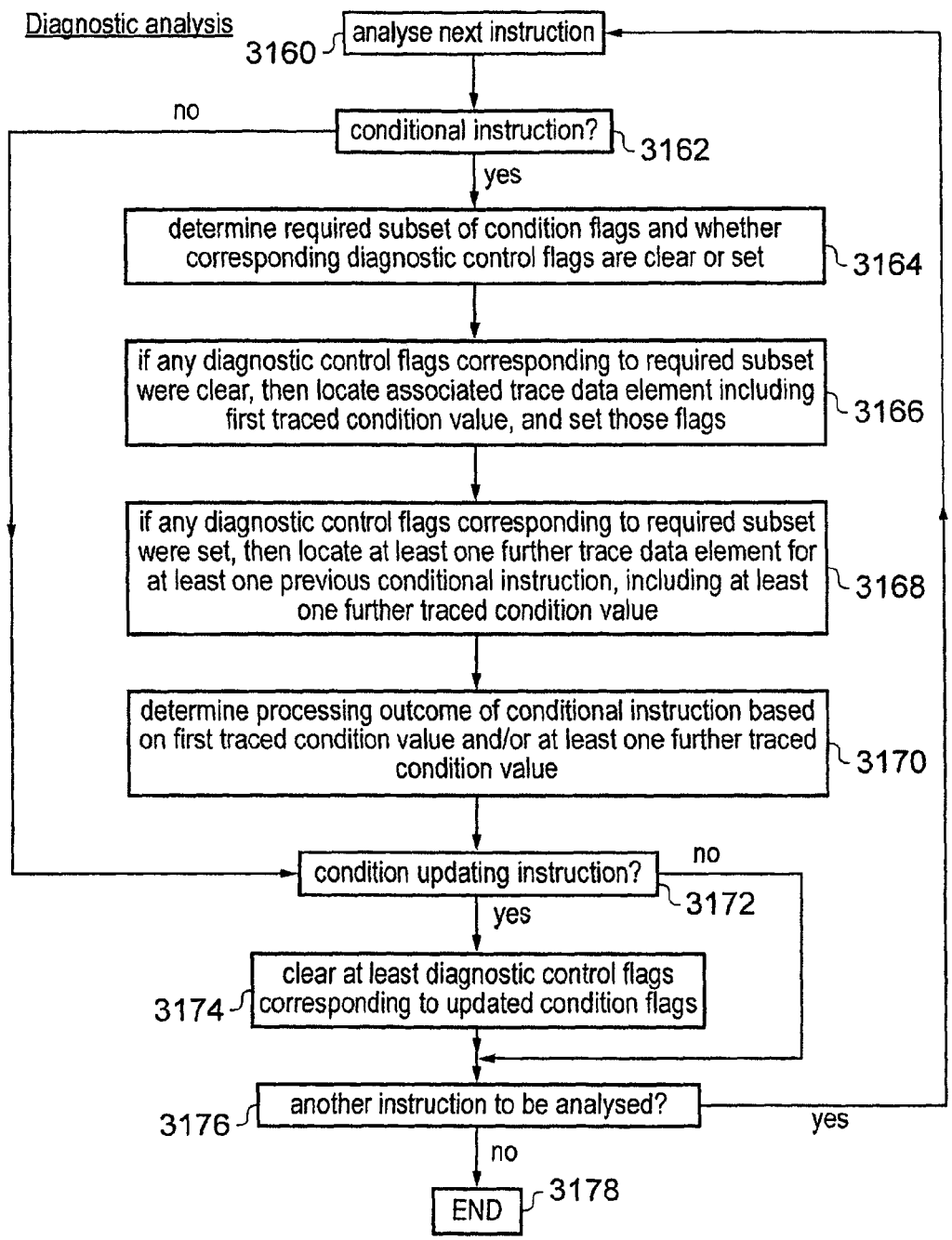
FIG. 26 illustrates a corresponding method of analysing trace data generated in the method of FIG. 25.

FIGS. 25-27 show an embodiment in which the trace circuit 3006 monitors which condition flags 3022 have already been traced, and when generating a trace data element for a conditional instruction traces the additional condition flags required by that conditional instruction which have not already been traced. This method makes use of a plurality of control flags 3026 each corresponding to a respective one of the condition flags 3022. Each control flag 3026 has a "clear" state and a "set" state. The diagnostic circuit 3016 has a corresponding group of diagnostic control flags 3028 also having a "clear" state and a "set" state.

FIG. 25 illustrates a method of tracing the operations of the processing circuit 3004. At step 3140, the processing circuit 3004 executes a next instruction and the execution of this instruction is monitored by the trace circuit 3006. At step 3142, it is determined whether or not the instruction is a conditional instruction. If the instruction is a conditional instruction, then at step 3144 the trace circuit 3006 determines the subset of the condition flags 3022 that is required for determining the outcome of the conditional instruction. For example, for each condition shown in FIG. 16, the corresponding flags indicated in the table are the required subset of condition flags. The HI condition, for example, requires the C and Z flags.

At step 3146, the trace circuit 3006 determines whether any of the control flags 26 corresponding to the required subset of condition flags 3022 are clear. If none of the control flags corresponding to the required subset of condition flags are clear, then the method proceeds to step 3152. If any one or more of the control flags that correspond to the required subset of condition flags are clear, then at step 3148 the trace circuit 3006 generates and outputs a trace data element including a traced condition value which indicates at least the condition flags 3022 of the required subset for which the corresponding control flags 3026 are clear. Optionally, the trace condition value may also indicate other condition flags, or may indicate all of the condition flags 3022. Then, at step 3150, the trace circuit 3006 sets the control flags corresponding to the condition flags that were indicated in the traced condition value. If at step 3142, the instruction was determined not to be a conditional instruction then steps 3144 to 3150 are omitted.

At step 3152, the trace circuit 3006 determines whether or not the instruction being executed by the processing circuit 4 is a condition updating instruction. If the instruction is a condition updating instruction then at step 3154 the trace circuit 3006 clears at least the control flags 3026 corresponding to condition flags 3022 that are updated as a result of the condition updating instruction. Optionally, at step 3154 the trace circuit 3006 may also clear other control flags 3026, or may clear all of the control flags 3026. If the instruction is not a condition updating instruction then step 3154 is omitted. At step 3156, it is determined whether or not there is another instruction to be processed by the processing circuit 3004. If there is such an instruction, then the method returns to step 3140. Otherwise, the method ends at step 3158.

Pseudocode for implementing the method of FIG. 25 is indicated below (the term "markers" refers to the control flags 3026):
On an instruction:
If instruction is conditional:
    If any markers for flags required by this instruction are clear:
        Trace at least the flags required
        Set markers for the required flags
If instruction updates the CPSR:
    Clear at least the markers for updated flags
Alternatively, the following pseudocode could be used to implement the method of FIG. 25:
On an instruction:
If instruction is conditional:
    If any markers for flags required by this instruction are clear:
        Trace at least the flags required
        Set markers for the traced flags
If instruction updates the CPSR:
    Clear at least the markers for updated flags FIG. 26 shows a method of analysing the trace stream generated by the method of FIG. 25. At step 3160, the diagnostic circuit 3016 analyses a next instruction indicated in the indication of the instructions executed by the processing circuit 3004. If at step 3162 it is determined that the next instruction is a conditional instruction, then at step 3164 the diagnostic circuit 3016 determines the required subset of condition flags for that instruction and determines whether the corresponding diagnostic control flags 3028 to the required subset of condition flags are clear or set. At step 3166, if step 3164 determined that any of the diagnostic control flags 3028 corresponding to the required subset of condition flags were clear, then the diagnostic circuit 3016 locates in the trace stream an associated trace data element including a first traced condition value. The first traced condition value indicates at least the values of the required subset of condition flags corresponding to clear diagnostic control flags 3028. The diagnostic circuit 3016 then sets the diagnostic control flags 3028 that are clear and correspond to a condition flag 3022 of the desired subset.

At step 3168, if step 3164 determined that any diagnostic control flags 3028 corresponding to the required subset of condition flags were set, then the diagnostic circuit 3016 locates at least one further trace data element for at least one previous conditional instruction. The further trace data element includes at least one further traced condition value indicating values of the condition flags corresponding to those diagnostic control flags that were set. Then, at step 3170 the diagnostic circuit 3016 analyses the first traced condition value and/or the at least one further traced condition value (defending on which traced condition values were accessed at steps 3166 and 3168) and then determines the processing outcome of the current conditional instruction based on those traced condition values. If at step 3162 the instruction was determined not to be a conditional instruction, then steps 3164 to 3170 are omitted.

At step 3172, the diagnostic circuit 3016 determines whether or not the next indicated instruction is a condition updating instruction. If the next instruction is a condition updating instruction then at step 3174 the diagnostic circuit 3016 clears at least the diagnostic control flags 3028 corresponding to condition flags 3022 that were updated as a result of execution of the condition updating instruction (the diagnostic circuit 3016 can determine which condition flags 3022 were updated based on a deduced processing outcome of the condition updating instruction). Optionally, at step 3174 the diagnostic circuit 3016 may also clear other of the diagnostic control flags 3028, or may clear all of the diagnostic control flags 3028. If at step 3172 the next instruction is not a condition updating instruction, then step 3174 is omitted. At step 3176, it is determined whether or not there is another instruction to be analysed. If there is another instruction then the method returns to step 3160 while otherwise the method ends at step 3178.

FIG. 27 illustrates an example of the application of the method of FIGS. 25 and 3012 to the stream of program instructions illustrated previously. In this example, it is assumed that all control flags 3026 and diagnostic control flags 3028 are cleared in response to a condition updating instruction, but as mentioned above it is also possible to provide an embodiment in which the trace circuit 3006 and diagnostic circuit 3016 clear only the control flags 3026, 3028 corresponding to condition flags 3022 that have been updated.

In FIG. 27, a branch taken result is indicated in the trace data element generated for a branch instruction. The branch taken result can be used by the diagnostic circuit 3016 to determine which instructions were executed by the processing circuit 3004.

On encountering a condition updating instruction CMP at memory location 2000, the trace circuit 3006 clears all the control flags 3026. Similarly, when the diagnostic circuit 3016 encounters the condition updating instruction CMP then it clears all of its diagnostic control flags 3028.

On execution of a conditional instruction MOVNE at memory location 2004, the trace circuit 3006 determines that for the "not equal" condition NE the required subset of condition flags is the Z flag (see FIG. 16). At step 3146 of FIG. 25, the trace circuit 3006 determines that the control flag 3026 corresponding to the Z condition flag is clear and so at step 3148 generates a trace data element including a traced condition value indicating the value of at least the Z flag. The control flag corresponding to the Z flag is then set at step 3150 of FIG. 25.

In a corresponding way, when analysing the trace stream the diagnostic circuit 3016 encounters the conditional instruction MOVNE at memory location 2004 and determines that the required subset of condition flags is the Z flag. At this point, the diagnostic control flag 3028 corresponding to the Z condition flag is clear and so the diagnostic circuit 3016 determines that there is an associated trace data element corresponding to the MOVNE instruction. The diagnostic circuit 3016 locates the associated trace data element, which includes a traced condition value indicating a value of the Z flag. The diagnostic circuit 3016 determines the processing outcome based on the traced condition value for the MOVNE instruction stored at memory location 2004. The diagnostic circuit 3016 then sets the diagnostic control flag 3028 corresponding to the Z flag.

When the trace circuit 3006 encounters the conditional instruction MOVEQ stored at memory location 2008, the trace circuit 3006 determines that the required subset of flags for determining whether the "equals" condition EQ is satisfied is again the Z flag (see FIG. 16). At step 3146 of FIG. 25, the trace circuit 3006 determines that the control flag corresponding to the Z flag is set and so omits steps 3148 and 3150 of FIG. 25 and does not generate a trace data element including a traced condition value. On analysing the trace stream, the diagnostic circuit 3016 can similarly detect that the diagnostic control flag 3028 corresponding to the Z flag is set. Therefore, the diagnostic circuit 3016 will at step 3168 of FIG. 26 locate the trace data element for the previous conditional instruction MOVNE stored at memory location 2004, and determine the outcome of the MOVEQ instruction based on the traced condition value included in the trace data element for the MOVNE instruction.

At memory location 200C there is a conditional add instruction ADDHI which is dependent on the HI condition. When this instruction is executed, the trace circuit 3006 determines that the required subset of condition flags is the C flag and the Z flag (see FIG. 16). The trace circuit 3006 determines the status of the corresponding control flags 3026 corresponding to the C and Z flags, and determines that the control flag 3026 corresponding to the Z condition flag is set, but the control flag 3026 corresponding to the C condition flag is still clear. Therefore, at step 3148 of FIG. 25, the trace circuit 3006 generates a trace data element including at least the value indicating the C flag. The control flag 3026 corresponding to the C condition flag is then set.

On analysing the trace stream, the diagnostic apparatus 3012 detects that the required subset of condition flags for the ADDHI instruction at memory location 200C is the C and Z flags. Since the diagnostic control flag 3028 corresponding to the C flag is clear, at step 3166 the diagnostic circuit 3016 will locate in the trace stream a trace data element associated with the ADDHI instruction that indicates the C flag value. At step 3168 of FIG. 26, the diagnostic circuit 3016 will also locate a further trace data element, because the diagnostic control flag 3028 for the Z condition flag was set at step 3164. In this example, the further trace data element is the trace data element generated for the MOVNE instruction at memory location 2004. At step 3170 of FIG. 26, the diagnostic circuit 3016 determines a processing outcome of the ADDHI instruction based on both the traced condition value included in the trace data element for the MOVNE instruction at memory location 2004 and the trace condition value included in the trace data element for the ADDHI instruction at memory location 200C.

In a similar way, the trace circuit 6 generates trace data and the diagnostic circuit 16 analyses the trace data for the subsequent instructions shown in FIG. 27.

While the above embodiments have described the control flags 26 and diagnostic control flags 3028 being cleared when the condition flags 3022 are updated, other events may also trigger the control flags 3026 or diagnostic control flags 3028 to be cleared. For example, an exception event may cause the control flags to be cleared. If the exception handler triggered by the exception event is being traced by the trace circuit 3006, then clearing the control flags 3026 on occurrence of an exception event ensures that the condition flags 3022 will be traced on initiation of the exception handler. Alternatively, if the exception handler is not being traced, then clearing the control flags 3026 on occurrence of the exception event can ensure that the condition flags 3022 will be traced following a return from exception handling.

Also, the trace circuit 3006 may periodically clear the control flags, so that a traced condition value is included periodically in the trace stream to provide a reference point for the diagnostic apparatus 3012. The diagnostic circuit 3016 can begin analysing the trace data at the reference point, since the traced condition value included at the reference point enables the state of the condition flags to be determined without requiring information from previous trace data elements. This is useful since the diagnostic circuit 3016 is able to jump directly to a region of the trace stream of interest rather than having to work through the entire trace stream to reach the region of interest.

Also, to improve processing performance some processors may perform speculative execution of instructions before it is known whether or not that instruction should actually be executed. Sometimes, one or more speculatively executed instructions should not in fact have been executed. On detecting a mis-speculation, the processor may reverse the results of any incorrectly executed instruction to recover the processor state arising before execution of the incorrectly executed instruction. It may be unknown to the trace circuit 3006 how many instructions were incorrectly executed. To ensure that the condition flag values resulting from correction of the mis-speculation can be determined from the trace stream, the trace circuit 6 may clear the control flags 3026 on detection of a mis-speculation.

For any of these events, the trace circuit 3006 may include in the trace stream information indicating that the control flags 3026 have been cleared. The diagnostic circuit 3016 may respond to this information by clearing the diagnostic control flags 3028.

FIGS. 22-27 illustrate embodiments in which a traced condition value indicating values of the condition flags 3022 is included in the trace stream to enable the outcome of a conditional instruction to be determined by the diagnostic apparatus 3012. However, these techniques may also be applied to embodiments where another kind of outcome indicating value (for instance, a pass/fail result) is included in the trace stream to enable the outcome of the conditional instruction to be determined.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A trace unit configured to generate items of trace data indicative of processing activities of a data processing apparatus, said trace unit comprising:
   a trace input interface for receiving from said data processing apparatus at least one instruction observed indicator indicating execution of a conditional instruction and at least one result output indicator indicating output by said data processing apparatus of a result of executing said at least one conditional instruction; and
   tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
   wherein said trace unit comprises a result output indicator buffer for storing a plurality of sets of result output indicators received from said data processing apparatus, said trace unit being configured to periodically select a stored set of results for output for processing to said tracing circuitry and in response to one of said instruction observed indicators indicating a conditional instruction referencing a set of result output indicators that said buffer currently store a valid value for, said trace unit is configured to select said currently stored valid set of result output indicators for output such that a new set of result output indicators can be stored.

2. A trace unit as claimed in claim 1,
   wherein said instruction observed indicator is received at said trace input interface in a first processing cycle and said result output indicator is received at said trace input interface in a second processing cycle, said second processing cycle being different from said first processing cycle.

3. A trace unit as claimed in claim 2, wherein said trace input interface receives from said data processing apparatus, an instruction tag corresponding to said instruction observed indicator and a result tag corresponding to said result output indicator.

4. A trace unit as claimed in claim 3, wherein said instruction tag and said result tag are output by said tracing circuitry.

5. A trace unit as claimed in claim 3, wherein;
   said data processing apparatus comprises at least one current program status register configured to store a respective set of condition code flag marks that are tested to determine whether a conditional instruction should be output and wherein said trace unit comprises a data store for storing a current program status register table listing a state associated with said at least one current program status register and at least a subset of said respective set of condition code flag marks; and
   said tracing circuitry is configured to perform a tag to key conversion operation in which said instruction tag associated with said instruction observed indicator is converted to an instruction key corresponding to said conditional instruction trace data item and said result tag associated with said result output indicator is converted to a result key corresponding to said conditional result trace data item and wherein said key conversion operation is performed depending upon said state stored in said current program status register table.

6. A trace unit as claimed in claim 5, wherein said tracing circuitry comprises trace compression circuitry configured to buffer output of at least one of said conditional instruction trace data items corresponding to a received instruction observed indicator whose occurrence can be inferred by said diagnostic apparatus from output by said trace unit of a corresponding one of said conditional result trace data items.

7. A trace unit as claimed in claim 6, wherein said tracing circuitry is configured to generate and output one of said result keys for said buffered conditional instruction trace data item and wherein said outputted result key is used by said diagnostic apparatus to infer output of said buffered conditional instruction trace data item.

8. A trace unit as claimed in claim 6, wherein said tracing circuitry is configured to monitor and maintain a buffering record indicating which of said received instruction observed indicators had output of a corresponding conditional trace data item buffered by said tracing circuitry.

9. A trace unit as claimed in claim 8, wherein said buffering record comprises a record of a most recently generated conditional instruction trace data item and a most recently output conditional instruction trace data item.

10. A trace unit as claimed in claim 9, wherein a conditional instruction trace data item is determined to have been buffered when a key comparison is performed to determine if a key corresponding to said conditional instruction trace data item is greater than a key corresponding to said most recently output conditional instruction trace data item and is less than or equal to a key corresponding to said most recently generated conditional instruction trace data item.

11. A trace unit as claimed in claim 9, wherein values of said key wrap around when a maximum value is reached and wherein said key comparison observes modulo arithmetic.

12. A trace unit as claimed in claim 5, wherein said tag to key conversion operation is performed such that when said trace unit receives one of said instruction observed indicators, said current program status register table is looked up using said instruction tag to identify an appropriate one of said current program status registers storing a relevant subset of condition code marks.

13. A trace unit as claimed in claim 12, wherein when said tracing circuitry performs said tag to key conversion operation by allocating a new key value to a newly generated conditional instruction trace data item when none of said relevant subset of condition code marks stored in said current program status register table indicate that they are to be traced and allocating a repetitive key value that repeats a most recently allocated key value to a newly generated conditional instruction trace data item when one or more of said subset of condition code marks stored in said current program status register table indicate that they are to be traced.

14. A trace unit as claimed in claim 13, wherein said tracing circuitry comprises trace compression circuitry configured to buffer output of at least one of said conditional instruction trace data items having said new key values whose occurrence can be inferred by said diagnostic apparatus from output by said trace unit of a corresponding one or more of said conditional result trace data items and wherein conditional instruction trace data items corresponding to said repetitive key values are not buffered.

15. A trace unit as claimed in claim 14, wherein said tracing circuitry is configured to supply said conditional result trace data items to said diagnostic apparatus with an indication of whether or not the corresponding one or more conditional instruction trace data items are permitted to be inferred by said diagnostic apparatus.

16. A trace unit as claimed in claim 15, wherein when said one or more conditional instruction trace data items are inferred from corresponding conditional result trace data items supplied to said diagnostic apparatus, said one or more conditional instruction trace data items are removed from said buffer of said trace compression circuitry and are not output by said tracing circuitry.

17. A trace unit a claimed in claim 14, wherein said one or more conditional instruction trace data items are permitted to be inferred if a corresponding conditional result key is the same as a conditional instruction key currently buffered by said buffer of said trace compression circuitry.

18. A trace unit as claimed in claim 13, wherein said tracing circuitry is configured to receive from said trace input interface, trace data relating to conditional or non-conditional branch instructions and load/store instructions and wherein said tracing circuitry is configured to generate a first type of waypoint indicator denoting that a corresponding instruction corresponds to either a taken conditional or non-conditional branch or a load/store instruction and a second type of waypoint indicator denoting that a corresponding instruction corresponds to a not taken conditional branch; and said instruction observed indicator is used by said data processing apparatus to indicate execution of a conditional instruction other than a conditional branch instruction and wherein said tracing circuitry is configured to output a conditional instruction trace data item corresponding to said instruction observed indicator and at least one of said first type of waypoint indicator and said second type of waypoint indicator in a same trace data stream and said tracing circuitry is configured to output a first type of conditional instruction trace data item corresponding to conditional instructions other than conditional branches where a corresponding instruction key is said repetitive key value and a second type of conditional instruction trace data corresponding to conditional instructions other than conditional branches where a corresponding instruction key is said new key value.

19. A trace unit as claimed in claim 13, wherein said tracing circuitry is configured to receive from said trace input interface, trace data relating to conditional or non-conditional branch instructions and load/store instructions and wherein said tracing circuitry is configured to generate a first type of waypoint indicator denoting that a corresponding instruction corresponds to either a taken conditional or non-conditional branch or a load/store instruction and a second type of waypoint indicator denoting that a corresponding instruction corresponds to a not taken conditional branch; and said result output indicator is used by said data processing apparatus to indicate execution of a conditional instruction other than a conditional branch instruction and wherein said tracing circuitry is configured to output a conditional result trace data item corresponding to said result output indicator and at least one of said first type of waypoint indicator and said second type of waypoint indicator in a same trace data stream and said tracing circuitry is configured to output a first type of conditional instruction trace data item corresponding to conditional branches where a corresponding instruction key is said repetitive key value and a second type of conditional instruction trace data corresponding to conditional branches where a corresponding instruction key is said new key value.

20. A trace unit according to claim 1, wherein said data processing apparatus comprises a plurality of current program status registers configured to store a respective set of condition code flag values that are indicative of how a conditional instruction is processed, said buffer comprising a storage location for storing one set of result output indicators corresponding to each of said plurality of current program status registers, each of said sets of result output indicators comprising at least some of said condition code flag values.

21. A trace unit according to claim 1, further comprising trace result combining circuitry for receiving said conditional result trace data items generated by said tracing circuitry and for generating a compressed representation of at least some of said conditional result trace data items and storing said compressed representations, and combining at least some of said compressed representations such that multiple compressed representations of trace data items are output as combined trace data items.

22. A trace unit according to claim 21, wherein said trace result combining circuitry is configured to generate and store said compressed representations and on receipt of a conditional result trace data item that cannot be compressed by said trace result combining circuitry to output said stored compressed representations of trace data items as combined trace data items and then to output said conditional result trace data item that cannot be compressed.

23. A trace unit as claimed in claim 1, wherein said tracing circuitry is configured to concatenate a plurality of said conditional instruction trace data items to form a concatenated conditional instruction trace data item and to output said concatenated conditional instruction trace data item to said diagnostic apparatus instead of outputting said plurality of conditional instruction trace data items.

24. A trace unit as claimed in claim 23, wherein said concatenated conditional instruction trace data item has a reduced trace bandwidth relative to said plurality of said conditional instruction trace data items.

25. A trace unit configured to generate items of trace data indicative of processing activities of a data processing apparatus, said trace unit comprising:
- a trace input interface for receiving from said data processing apparatus at least one instruction observed indicator indicating execution of a conditional instruction and at least one result output indicator indicating output by said data processing apparatus of a result of executing said at least one conditional instruction; and
- tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
- wherein said data processing apparatus comprises at least one current program status register configured to store a respective set of condition code flag marks that are tested to determine whether a conditional instruction should be output as said items of trace data and wherein said trace unit comprises a data store for storing a current program status register table listing a state associated with said at least one current program status register and at least a subset of said respective set of condition code flag marks.

26. A trace unit as claimed in claim 25, wherein said current program status register table is configured to store three different states in respect of each of said subset of condition code flags.

27. A trace unit as claimed in claim 26, wherein said three different states comprise: traced; to be traced; and not traced.

28. A trace unit as claimed in claim 25, wherein said three different states are tracked by maintaining an in-flight table having two states for each flag of each CPSR indicating which flags should be traced when emitted by said data processing apparatus and a current CPSR table storing at least two states for each flag of a current CPSR indicating whether or not a conditional instruction is to be traced as a conditional instruction trace data item.

29. A trace unit as claimed in claim 25, wherein said tracing circuitry uses said current program status register table to determine when said conditional result trace data items are required and which of said set of condition code flags should be traced.

30. A trace unit as claimed in claim 25, wherein said conditional instruction trace data items are generated for a subset of said at least one instruction observed indicators depending upon contents of said current program status register table.

31. A trace unit configured to generate items of trace data indicative of processing activities of a data processing apparatus, said trace unit comprising:
- a trace input interface for receiving from said data processing apparatus at least one instruction observed indicator indicating execution of a conditional instruction and at least one result output indicator indicating output by said data processing apparatus of a result of executing said at least one conditional instruction; and
- tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
- wherein said tracing circuitry is configured to receive from said trace input interface, trace data relating to conditional or non-conditional branch instructions and load/store instructions and wherein said tracing circuitry is configured to generate a first type of waypoint indicator denoting that a corresponding instruction corresponds to either a taken conditional or non-conditional branch or a load/store instruction and a second type of waypoint indicator denoting that a corresponding instruction corresponds to a not taken conditional branch.

32. A trace unit as claimed in claim 31, wherein said instruction observed indicator is used by said data processing apparatus to indicate execution of a conditional instruction other than a conditional branch instruction and wherein said tracing circuitry is configured to output a conditional instruction trace data item corresponding to said instruction observed indicator and at least one of said first type of waypoint indicator and said second type of waypoint indicator in a same trace data stream.

33. A trace unit as claimed in claim 31, wherein said result output indicator is used by said data processing apparatus to indicate execution of a conditional instruction other than a conditional branch instruction and wherein said tracing circuitry is configured to output a conditional result trace data item corresponding to said result output indicator and at least one of said first type of waypoint indicator and said second type of waypoint indicator in a same trace data stream.

34. A trace unit as claimed in claim 31, wherein said instruction observed indicator is used by said data processing apparatus to indicate execution of a conditional branch instruction and said result output indicator is used by said data processing apparatus to indicate execution of a conditional instruction other than a conditional branch instruction and wherein said tracing circuitry is configured to output a conditional instruction trace data item corresponding to said instruction observed indicator, a conditional result trace data item corresponding to said result output indicator and at least one of said first type of waypoint indicator and said second type of waypoint indicator in a same trace data stream.

35. A trace unit as claimed in claim 31, wherein said tracing circuitry is configured to concatenate a plurality of waypoint indicators to form a concatenated waypoint indicator for output to said diagnostic apparatus, said concatenated waypoint indicator comprising one of: a plurality of said first type of waypoint indicators; a plurality of said second type of waypoint indicators; and a combination of different types of waypoint indicators comprising at least one of said first type of waypoint indicator and at least one of said second type of waypoint indicator.

36. A trace unit configured to generate items of trace data indicative of processing activities of a data processing apparatus, said trace unit comprising:
- a trace input interface for receiving from said data processing apparatus at least one instruction observed indicator indicating execution of a conditional instruction and at least one result output indicator indicating output by said data processing apparatus of a result of executing said at least one conditional instruction; and
- tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;

wherein said tracing circuitry is configured to receive from said trace input interface, trace data relating to conditional or non-conditional branch instructions and load/store instructions and wherein said tracing circuitry is configured to generate a first type of waypoint indicator denoting that a corresponding instruction corresponds to a conditional branch predicted to be taken, a non-conditional branch predicted to be taken or a load/store instruction and a second type of waypoint indicator denoting that a corresponding instruction is predicted to be a not-taken conditional branch.

37. A trace unit configured to generate items of trace data indicative of processing activities of a data processing apparatus, said trace unit comprising:

a trace input interface for receiving from said data processing apparatus at least one instruction observed indicator indicating execution of a conditional instruction and at least one result output indicator indicating output by said data processing apparatus of a result of executing said at least one conditional instruction; and tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;

wherein said tracing circuitry is configured to concatenate a plurality of said conditional instruction trace data items to form a concatenated conditional instruction trace data item and to output said concatenated conditional instruction trace data item to said diagnostic apparatus instead of outputting said plurality of conditional instruction trace data items;

wherein said concatenated conditional instruction trace data item has a reduced trace bandwidth relative to said plurality of said conditional instruction trace data items; and said tracing circuitry is configured to output at least one of said concatenated conditional instruction trace data items and at least one of said concatenated waypoint indicators in a same trace data stream.

38. A trace unit configured to generate items of trace data indicative of processing activities of a data processing apparatus, said trace unit comprising:

a trace input interface for receiving from said data processing apparatus at least one instruction observed indicator indicating execution of a conditional instruction and at least one result output indicator indicating output by said data processing apparatus of a result of executing said at least one conditional instruction; and tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;

wherein said tracing circuitry is configured to output a realignment trace data.

39. A trace unit as claimed in claim 38, wherein said realignment trace data item is output in response to receipt from said data processing apparatus to a branch mispredict indicator.

40. A trace unit as claimed in claim 38, wherein said realignment trace data item is output in response to receipt from said data processing apparatus to an abort indicator.

41. A trace unit as claimed in claim 38, wherein said realignment trace data item is output in response to receipt from said data processing apparatus to an exception indicator.

42. A trace unit as claimed in claim 41, wherein said tracing circuitry is configured to receive from said trace input interface, trace data relating to conditional branch instructions and load/store instructions and wherein said tracing circuitry is configured to generate a waypoint indicator denoting that a corresponding instruction corresponds to either a conditional branch or a load/store instruction and wherein said instruction observed indicator is used by said data processing apparatus to indicate execution of a conditional instruction other than a conditional branch instruction and wherein said tracing circuitry is configured to output a conditional instruction trace data item associated with said instruction observed indicator and said waypoint indicator in a same trace data stream and wherein said tracing circuitry is configured to output said realignment trace data item in response to said exception indicator such that said realignment trace data item is output after receipt of said exception indicator but before output of a subsequently occurring conditional instruction trace data item or waypoint indicator.

43. A trace unit as claimed in claim 38, wherein said realignment trace data item is output in response to receipt from said data processing apparatus to a cancel indicator.

44. A trace unit as claimed in claim 38, wherein said tracing circuitry is configured to output any conditional instruction trace data items that have been received but not yet output prior to output of said realignment trace data item.

45. A trace unit as claimed in claim 38, wherein said tracing circuitry is configured to output any waypoint trace data items that have been received but not yet output prior to output of said realignment trace data item.

46. A trace unit as claimed in claim 38, wherein said tracing circuitry is configured to receive from said trace input interface, trace data relating to conditional branch instructions and load/store instructions and wherein said tracing circuitry is configured to generate a waypoint indicator denoting that a corresponding instruction corresponds to either a conditional branch or a load/store instruction and wherein said instruction observed indicator is used by said data processing apparatus to indicate execution of a conditional instruction other than a conditional branch instruction and wherein said tracing circuitry is configured to output said conditional instruction trace data item associated with said instruction observed indicator and to output said waypoint indicator in a same trace data stream and wherein said tracing circuitry is configured to output said realignment trace data item in response to said branch mispredict indicator such that said realignment trace data item is output after receipt of said branch mispredict indicator but before output of a subsequently occurring conditional instruction trace data item or waypoint indicator.

47. A trace unit configured to generate items of trace data indicative of processing activities of a data processing apparatus, said trace unit comprising:
- a trace input interface for receiving from said data processing apparatus at least one instruction observed indicator indicating execution of a conditional instruction and at least one result output indicator indicating output by said data processing apparatus of a result of executing said at least one conditional instruction; and
- tracing circuitry for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
- wherein said tracing circuitry is configured to receive from said data processing apparatus a cancellation indication indicating that one or more speculatively executed and traced instructions have been cancelled and wherein said tracing circuitry is configured to generate in response to said cancellation indication a realignment trace item, said realignment trace item being output by said tracing circuitry to inform said diagnostic apparatus that at least one previously received conditional instruction trace item should be discarded.

48. A diagnostic apparatus configured to receive a trace data stream comprising conditional instruction trace data items and conditional result trace data items wherein said conditional result trace data items are separate from said conditional instruction trace data items in said received trace data stream, said diagnostic apparatus comprising:
- diagnostic circuitry configured to process said conditional instruction trace data items and said conditional result trace data items with reference to an image of program instructions executed by said data processing apparatus in order to generate said trace data stream, said diagnostic circuitry being configured to use said image of program instructions, conditional instruction trace data items and said conditional result trace data items to determine program instructions executed by said data processing apparatus;
- wherein the diagnostic apparatus is configured to receive from a trace unit in a trace data stream, waypoint trace items each indicating that one of a branch instruction, a load instruction and a store instruction has been executed by said data processing apparatus said trace data stream additionally comprising said conditional instruction trace items and said conditional result trace items and wherein a received ordering of said waypoint trace items and conditional instruction trace data items differs from an execution ordering of corresponding waypoint instructions and conditional instructions.

49. A diagnostic apparatus as claimed in claim 48, wherein said diagnostic apparatus comprises a waypoint buffer for buffering said received waypoint trace items and a conditional instruction buffer for buffering said received conditional instruction trace items.

50. A diagnostic apparatus as claimed in claim 49, wherein said diagnostic circuitry is configured to permute said received ordering to obtain said execution ordering by independently analysing entries in said waypoint buffer and entries in said conditional instruction buffer with reference to said program instruction image.

51. A diagnostic apparatus as claimed in claim 49, wherein if said diagnostic circuitry encounters a conditional instruction in said program image but a conditional instruction trace item is not currently present in said conditional instruction buffer then said diagnostic circuitry is configured to delay further processing of a corresponding execution thread of said program image until said conditional trace item appears in said conditional instruction buffer.

52. A method of generating items of trace data indicative of processing activities of a data processing apparatus based on information received from said data processing apparatus, said method comprising:
- receiving from said data processing apparatus at least one instruction observed indicator indicating execution of a conditional instruction and at least one result output indicator indicating output by said data processing apparatus of a result of executing said at least one conditional instruction; and
- processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
- storing a plurality of sets of result output indicators received from said data processing apparatus in a buffer; and
- periodically selecting a stored set of results for output for processing to said tracing circuitry, and in response to one of said instruction observed indicators indicating a conditional instruction referencing a set of result output indicators that said buffer currently store a valid value for, selecting said currently stored valid set of result output indicators for output such that a new set of result output indicators can be stored.

53. The method as claimed in claim 52,
wherein said instruction observed indicator is received in a first processing cycle and said result output indicator is received in a second processing cycle, said second processing cycle being different from said first processing cycle.

54. A diagnostic method for processing trace data generated by a data processing apparatus, said method comprising:
- receiving a trace data stream comprising conditional instruction trace data items and conditional result trace data items wherein said conditional result trace data items are separate from said conditional instruction trace data items in said received trace data stream;
- processing said conditional instruction trace data items and said conditional result trace data items with reference to an image of program instructions executed by said data processing apparatus in order to generate said trace data stream;
- using said image of program instructions to perform a correlation between said conditional instruction trace data items and said conditional result trace data items to determine processing steps performed by said data processing apparatus; and wherein the receiving step receives in the trace data stream, waypoint trace items each indicating that one of a branch instruction, a load instruction and a store instruction has been executed by said data processing apparatus, said trace data stream additionally comprising said conditional instruction trace items and said conditional result trace items and wherein a received ordering of said waypoint trace items and conditional instruction trace data items differs from an execution ordering of corresponding waypoint instructions and conditional instructions.

55. A trace unit configured to generate items of trace data indicative of processing activities of a data processing apparatus, said trace unit comprising:
   means for receiving from said data processing apparatus at least one instruction observed indicator indicating execution of a conditional instruction and at least one result output indicator indicating output by said data processing apparatus of a result of executing said at least one conditional instruction; and
   means for processing said at least one instruction observed indicator and said at least one result output indicator and configured to generate from said at least one instruction observed indicator and said at least one result output indicator corresponding conditional instruction trace data items and conditional result trace data items and to independently output said conditional instruction trace data items and said conditional result trace data items enabling separate trace analysis of conditional instructions and corresponding conditional results by a diagnostic apparatus;
   wherein said trace unit comprises a result output indicator buffer means for storing a plurality of sets of result output indicators received from said data processing apparatus, said trace unit being configured to periodically select a stored set of results for output for processing to said means for processing and in response to one of said instruction observed indicators indicating a conditional instruction referencing a set of result output indicators that said buffer means currently store a valid value for, said trace unit is configured to select said currently stored valid set of result output indicators for output such that a new set of result output indicators can be stored.

56. A diagnostic apparatus configured to receive a trace data stream comprising conditional instruction trace data items and conditional result trace data items wherein said conditional result trace data items are separate from said conditional instruction trace data items in said received trace data stream, said diagnostic apparatus comprising:
   means for processing said conditional instruction trace data items and said conditional result trace data items with reference to an image of program instructions executed by said data processing apparatus in order to generate said trace data stream, said means for processing being configured to use said image of program instructions, conditional instruction trace data items and said conditional result trace data items to determine program instructions executed by said data processing apparatus;
   wherein the diagnostic apparatus is configured to receive from a trace unit in a trace data stream, waypoint trace items each indicating that one of a branch instruction, a load instruction and a store instruction has been executed by said data processing apparatus said trace data stream additionally comprising said conditional instruction trace items and said conditional result trace items and wherein a received ordering of said waypoint trace items and conditional instruction trace data items differs from an execution ordering of corresponding waypoint instructions and conditional instructions.

* * * * *